US009654670B2

(12) United States Patent
Horita et al.

(10) Patent No.: US 9,654,670 B2
(45) Date of Patent: May 16, 2017

(54) COLOR CONVERSION TABLE CREATION DEVICE AND METHOD, PROGRAM, AND RECORDING MEDIUM

(71) Applicant: FUJIFILM Corporation, Tokyo (JP)

(72) Inventors: Shuhei Horita, Tokyo (JP); Takahiro Mishima, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/144,635

(22) Filed: May 2, 2016

(65) Prior Publication Data
US 2016/0248942 A1   Aug. 25, 2016

Related U.S. Application Data

(63) Continuation of application No. PCT/JP2014/080184, filed on Nov. 14, 2014.

(30) Foreign Application Priority Data

Nov. 15, 2013 (JP) .................................. 2013-237297
Nov. 15, 2013 (JP) .................................. 2013-237298
(Continued)

(51) Int. Cl.
*H04N 1/00*   (2006.01)
*H04N 1/60*   (2006.01)
*G06K 15/02*  (2006.01)

(52) U.S. Cl.
CPC ......... *H04N 1/6055* (2013.01); *G06K 15/027* (2013.01); *G06K 15/1878* (2013.01);
(Continued)

(58) Field of Classification Search
None
See application file for complete search history.

(56) References Cited

U.S. PATENT DOCUMENTS 6,963,426 B2 * 11/2005 Odagiri ................ H04N 1/6033
358/1.9
7,626,723 B2 * 12/2009 Yamada ............... H04N 1/6058
358/1.9
(Continued)

FOREIGN PATENT DOCUMENTS

JP   H 07-505511 A   6/1995
JP   2003-058353 A   2/2003
(Continued)

OTHER PUBLICATIONS

Japanese Office Action dated Sep. 15, 2016 in Application No. 2014-214299.
(Continued)

*Primary Examiner* — Scott A Rogers
(74) *Attorney, Agent, or Firm* — McGinn IP Law Group, PLLC

(57) ABSTRACT

A color conversion table creation device includes an image reading unit, a first color conversion unit color-converting read image data using a first color conversion table indicating a correspondence relationship between signal values obtained by the image reading unit and chromaticity values, a second color conversion unit color-converting document image data into print image data using an input and output color conversion tables, an image association unit performing an association process for a positional relationship between each piece of read image data of a printed matter obtained according to print image data and a target printed matter or each piece of read chromaticity value image data converted into chromaticity values and the document image data, and a color conversion table creation unit creating a color conversion table to be used in the second color conversion table based on differences between chromaticity values of the target printed matter and printed matter.

53 Claims, 32 Drawing Sheets

(30) Foreign Application Priority Data

| Aug. 27, 2014 | (JP) | ................................ | 2014-172738 |
| Aug. 27, 2014 | (JP) | ................................ | 2014-172739 |
| Oct. 21, 2014 | (JP) | ................................ | 2014-214299 |
| Oct. 21, 2014 | (JP) | ................................ | 2014-214300 |

(52) U.S. Cl.
CPC ..... *H04N 1/00023* (2013.01); *H04N 1/00034* (2013.01); *H04N 1/00045* (2013.01); *H04N 1/00068* (2013.01); *H04N 1/6019* (2013.01); *H04N 1/6033* (2013.01)

(56) References Cited

U.S. PATENT DOCUMENTS

| 7,986,447 | B2* | 7/2011 | Bang | .................... | H04N 1/6033 |
| | | | | | 345/600 |
| 8,040,561 | B2* | 10/2011 | Horita | ................. | B41F 33/0036 |
| | | | | | 358/1.9 |
| 8,184,349 | B2* | 5/2012 | Yamazoe | ............ | H04N 1/6033 |
| | | | | | 358/1.9 |

| 2003/0034983 | A1 | 2/2003 | Muramoto |
| 2013/0027759 | A1 | 1/2013 | Nakamura |
| 2013/0293904 | A1 | 11/2013 | Shimizu |

FOREIGN PATENT DOCUMENTS

| JP | 2007-081494 | A | 3/2007 |
| JP | 2009-222784 | A | 10/2009 |
| JP | 2013-030996 | A | 2/2013 |
| JP | 2013-232868 | A | 11/2013 |
| WO | WO 93/20648 | A1 | 10/1993 |

OTHER PUBLICATIONS

Japanese Office Action dated Sep. 15, 2016 in Application No. 2014-214300.
International Search Report (ISR) (PCT Form PCT/ISA/210), in PCT/JP2014/080184, dated Feb. 3, 2015.
Written Opinion of ISA/JPO (PCT/ISA/237) in PCT/JP2014/080184 and English Translation thereof.

\* cited by examiner

CORRESPONDENCE DATA OF DOCUMENT IMAGE
(CM) AND CHROMATICITY VALUES (Lab)

| ID | C | M | Lab | |
|---|---|---|---|---|
| 1 | 20 | 90 | 50,60,-13 | ● |
| 2 | 24 | 66 | 60,36,-17 | ◉ |
| 3 | 35 | 35 | 71,9,-20 | ◐ |
| 4 | 47 | 23 | 72,-4,-26 | ◑ |
| 5 | 10 | 15 | 89,6,-8 | ○ |

FIG. 14

| ID | C | M | TARGET Lab | PRINT Lab | DIFFERENTIAL Lab |
|---|---|---|---|---|---|
| 1 | 20 | 90 | 50,60,−13 | 49,61,−13 | +1,−1,0 |
| 2 | 24 | 66 | 60,36,−17 | 59,40,−15 | +1,−4,−2 |
| 3 | 35 | 35 | 71,9,−20 | 71,12,−23 | 0,−3,+3 |
| 4 | 47 | 23 | 72,−4,−26 | 73,−7,−21 | −1,+3,−5 |
| 5 | 10 | 15 | 89,6,−8 | 90,6,−6 | −1,0,−2 |

| ID | C | M | Lab | WEIGHT |
|---|---|---|---|---|
| 1 | 20 | 90 | 50,60,-13 | 1 |
| 2 | 24 | 66 | 60,36,-17 | 1 |
| 3 | 35 | 35 | 71,9,-20 | 10 |
| 4 | 47 | 23 | 72,-4,-26 | 1 |
| 5 | 10 | 15 | 89,6,-8 | 1 |

| ID | C | M | TARGET Lab | PRINT Lab | DIFFERENTIAL Lab | WEIGHT |
|---|---|---|---|---|---|---|
| 1 | 20 | 90 | 50,60,-13 | 49,61,-13 | +1,-1,0 | 1 |
| 2 | 24 | 66 | 60,36,-17 | 59,40,-15 | +1,-4,-2 | 1 |
| 3 | 35 | 35 | 71,9,-20 | 71,12,-23 | 0,-3,+3 | 10 |
| 4 | 47 | 23 | 72,-4,-26 | 73,-7,-21 | -1,+3,-5 | 1 |
| 5 | 10 | 15 | 89,6,-8 | 90,6,-6 | -1,0,-2 | 1 |

COLOR CONVERSION TABLE CREATION DEVICE AND METHOD, PROGRAM, AND RECORDING MEDIUM

CROSS-REFERENCE TO RELATED APPLICATIONS

The present application is a Continuation of PCT International Application No. PCT/JP2014/080184 filed on Nov. 14, 2014 claiming priorities under 35 U.S.C §119(a) to Japanese Patent Applications No. 2013-237297 filed on Nov. 15, 2013, No. 2013-237298 filed on Nov. 15, 2013, No. 2014-172738 filed on Aug. 27, 2014, No. 2014-172739 filed on Aug. 27, 2014, No. 2014-214299 filed on Oct. 21, 2014 and No. 2014-214300 filed on Oct. 21, 2014. Each of the above applications is hereby expressly incorporated by reference, in their entirety, into the present application.

BACKGROUND OF THE INVENTION

1. Field of the Invention

The present invention relates to a color conversion table creation device and a color conversion table creation method, a program, and a recording medium, and particularly relates to a color conversion technique for image data applied to color reproduction using a printer.

2. Description of the Related Art

In the field of printing, a color conversion process of image data is performed using a color conversion table such as an International Color Consortium (ICC) profile for performing color reproduction of a target with a printing device. The ICC profile is normally created based on color measurement results of a color chart printed and output for each printing device.

JP2013-30996A discloses an image processing device capable of matching color tones of two printed matters without using a color chart. According to JP2013-30996A, each of a reference printed matter output by a first image output device which is a reference printer and a user printed matter output by a second image output device which is a user printer is read by a scanner to calculate color tone conversion parameters from a correspondence relationship of both color component values thereof, to correct an output image of the second image output device by using the obtained color tone conversion parameters, to thereby reproduce the same color tones as the color tones of the reference printed matter.

SUMMARY OF THE INVENTION

In order to realize a color management system (CMS) using an ICC profile, an input profile indicating a target of color reproduction and an output profile indicating color reproduction of a printing device are necessary. The input profile is referred to as a target profile, and the output profile is referred to as a printer profile.

However, in actual printing work, there is a case where only document image data and a color sample printed matter are provided from a client who is a requester and color matching of a printed matter and the color sample printed matter is necessary. Here, there is a case where the color sample printed matter has an unobvious origin with respect to printing conditions in which printing is performed. That is, a target profile or the like necessary for printing of document image data is unknown, and thus, a current color sample printed matter provided from the client becomes a color reproduction target. In such a case, it is necessary that an operator for make-up or printing manually performs correction of image data or adjustment of printing conditions, and it is necessary that match in color is performed through trial and error, which needs a large amount of time and effort.

A technique disclosed in JP2013-30996A is a technique of calculating a color tone parameter for each of RGB color components read by a scanner, and performing color correction through one-dimensional conversion for each of the RGB color components using a color tone conversion parameter for each color component. It is considered that such a related art technique is sufficient for correction of a color tone difference corresponding to an individual difference between printer devices, but in a case where printing characteristics of a reference printer (first image output device) that outputs a reference printed matter and a second image output device which is a user printer are significantly different from each other, the degree of freedom in color correction is not sufficient, and the color correction accuracy may deteriorate.

Furthermore, the color tone conversion parameter in the technique disclosed in JP2013-30996A is based on a relationship obtained by sequentially changing the correspondence of color components in respective devices of the first image output device (printer 1), the scanner, and the second image output device (printer 2), as described in FIG. 4 of JP2013-30996A. That is, the color tone conversion parameters disclosed in JP2013-30996A are not basically a color profile and are used for individual conversion (see FIG. 4 in JP2013-30996A), which does not provide versatility.

In order to solve the above-mentioned problems, an object of the invention is to provide a color conversion table creation device, a color conversion table creation method, a program and a recording medium capable of solving at least one of the plural problems and enhancing color reproduction accuracy. Another object of the invention is to provide a color conversion table creation device, a color conversion table creation method, a program, and a recording medium capable of solving at least one of the plural problems, simplifying an adjustment operation of color matching of a printed matter with respect to a target printed matter which is a color reproduction target, and enhancing color reproduction accuracy.

In order to achieve the objects, the following aspects are provided.

According to a first aspect of the invention, there is provided a color conversion table creation device comprising: an image reading unit that reads a target printed matter and a printed matter printed by a printing device to acquire read image data indicating a read image of each of the target printed matter and the printed matter; a first color conversion unit that converts, using a first color conversion table indicating a correspondence relationship between a signal value in a first color space acquired by the image reading unit and a chromaticity value in a second color space which is a device-independent color space, the signal value in the first color space into the chromaticity value in the second color space; a second color conversion unit that color-converts document image data into print image data using an input color conversion table and an output color conversion table; an image association unit that performs an association process for a positional relationship between printed matter read image data indicated by the signal value in the first color space obtained by reading the printed matter printed by the printing device according to the print image data by the image reading unit and the document image data and an association process for a positional relationship between target printed matter read image data indicated by the signal value in the first color space obtained by reading the target printed matter by the image reading unit and the document image data, or performs an association process for a positional relationship between printed matter read chromaticity value image data obtained by converting a signal value of the printed matter read image data into a chromaticity value in the second color space by the first color conversion unit and the document image data and an association process for a positional relationship between target printed matter read chromaticity value image data obtained by converting a signal value of the target printed matter read image data into a chromaticity value in the second color space by the first color conversion unit and the document image data; and a color conversion table creation unit that creates a color conversion table used in the second color conversion unit from a correspondence relationship between the document image data indicated by a signal value in a third color space which is a device-dependent color space, and a chromaticity value of the target printed matter and a chromaticity value of the printed matter obtained through processes in the image association unit and the first color conversion unit, based on a difference between the chromaticity value of the target printed matter and the chromaticity value of the printed matter.

A configuration in which the color conversion process using the first color conversion unit is performed after the image association process in the image association unit is performed with respect to the read image data obtained by the image reading unit may be used, or a configuration in which the image association process in the image association unit is performed after the color conversion process using the first color conversion unit is performed may be used.

The term "chromaticity value" means a value of a color indicated by table color coordinates in a device-independent color space, which is not limited to an XYZ table color system.

According to the first aspect of the invention, after the same color reproduction as in the target printed matter is performed, in a state where an optimal profile to be applied to the second color conversion unit is unknown, by color-converting the document image data using the input color conversion table and the output color conversion table which are provisional (temporary) profiles, it is possible to obtain the print image data. By performing printing using the printing device according to the print image data, by reading the obtained printed matter using the image reading unit, and by performing the processes in the image association unit and the first color conversion unit, it is possible to obtain the chromaticity value of the printed matter. On the other hand, with respect to a given target printed matter, by performing reading using the image reading unit, and by performing the processes in the image association unit and the first color conversion unit, it is possible to obtain the chromaticity value of the target printed matter. Further, it is possible to create the color conversion table that changes the provisional profile to an appropriate profile based on the difference between the chromaticity value of the target printed matter and the chromaticity value of the printed matter.

Since the multi-dimensional color conversion can be performed by the second color conversion unit using the color conversion table created in the first aspect of the invention, it is possible to achieve color correction with a higher degree of freedom, and to achieve color matching with higher accuracy, compared with a configuration in which color correction is performed using a one-dimensional correspondence relationship for each color component in the related art.

Furthermore, according to the first aspect of the invention, it is possible to perform color management using an ICC profile, and to provide a technique having versatility.

As a second aspect of the invention, in the color conversion table creation device according to the first aspect of the invention, the color conversion table creation unit may create the color conversion table used in the second color conversion unit by correcting the input color conversion table or the output color conversion table based on the correspondence relationship between the document image data, the chromaticity value of the target printed matter, and the chromaticity value of the printed matter.

The input color conversion table regulates a multi-dimensional correspondence relationship between the third color space and the second color space, and the output color conversion table regulates a multi-dimensional correspondence relationship between the second color space and a color space (third color space which is a device-dependent color space) suitable for being supplied to the printing device. According to the second aspect of the invention, by correcting the input color conversion table or the output color conversion table based on the difference between the chromaticity value of the target printed matter and the chromaticity value of the printed matter, it is possible to obtain a multi-dimensional color conversion table after correction.

As a third aspect of the invention, in the color conversion table creation device according to the first or second aspect of the invention, the color conversion table creation unit may create a color correction table for correcting an output value of the input color conversion table based on the correspondence relationship between the document image data, the chromaticity value of the target printed matter, and the chromaticity value of the printed matter.

According to the third aspect of the invention, it is possible to provide a configuration in which the input color conversion table and the output color conversion table which are provisionally set are used as they are, without being changed, and an output value of the input color conversion table is corrected using the color correction table and is transmitted to an input of the output color conversion table. Furthermore, in an actual color conversion process in the second color conversion unit, it is possible to integrate a series of conversion processes such as conversion using the input color conversion table→conversion using the color correction table→conversion using the output color conversion table into a single multi-dimensional color conversion table.

As a fourth aspect of the invention, the color conversion table creation device according to any one of the first to third aspects of the invention may further comprise an input color conversion table database in which a plurality of input color conversion tables having different color reproduction characteristics is stored; and an input color conversion table selection unit that performs a process of selecting one input color conversion table to be applied to the second color conversion unit from the plurality of input color conversion tables stored in the input color conversion table database based on the correspondence relationship between the document image data and the chromaticity value of the target printed matter.

For example, the input color conversion table selection unit may be configured to calculate a color difference between the read chromaticity value with respect to the document image signal and the chromaticity value regulated in each input color conversion table stored in the input color conversion table database, and to select the input color conversion table so that an average value (referred to as "average color difference") of color differences or a maximum value (referred to as "maximum color difference") of color differences becomes a minimum.

According to the fourth aspect of the invention, it is possible to use a relatively good color conversion table as the input color conversion table used in first printing. Thus, it is possible to achieve desired color reproduction in a relatively short time.

As a fifth aspect of the invention, the color conversion table creation device according to any one of the first to fourth aspects of the invention may further comprise: a color measurement unit that performs color measurement with respect to a color measurement target which is at least one of the target printed matter, the printed matter, or a color sample which is different from the target printed matter and the printed matter to acquire a colorimetric value of the color measurement target; and a color measurement target image signal acquisition unit that includes at least one of a color measurement target document image signal acquisition unit that acquires a document image signal corresponding to a position on the document image data of which a colorimetric value is acquired by the color measurement unit or a color measurement target read image signal acquisition unit that acquires a read image signal corresponding to the position on the read image data of which the colorimetric value is acquired by the color measurement unit.

It is preferable to use a spectral colorimeter as the color measurement unit. According to the fifth aspect of the invention, it is possible to reduce an error of the chromaticity value detected from the read image obtained by the image reading unit, to thereby enhance color matching accuracy.

As a sixth aspect of the invention, the color conversion table creation device according to the fifth aspect of the invention may further comprise a chromaticity value replacement unit that replaces a chromaticity value corresponding to the position on the document image data of which the colorimetric value is acquired by the color measurement unit with the colorimetric value acquired by the color measurement unit, with respect to a color conversion result by the first color conversion unit.

As a seventh aspect of the invention, the color conversion table creation device according to the fifth aspect or the sixth aspect of the invention further comprise: a first color conversion table database in which a plurality of color conversion tables capable of being applied as the first color conversion table is stored; and a first color conversion table selection unit that selects one color conversion table from the plurality of color conversion tables stored in the first color conversion table database. The plurality of color conversion tables may include a color conversion table indicating a correspondence relationship between a reading signal and a chromaticity value of the image reading unit for each combination of types of coloring materials and base materials to be used in creation of a printed matter in the printing device, and the first color conversion table selection unit may select one color conversion table from the plurality of color conversion tables based on a correspondence relationship between the read image signal corresponding to the position on the document image data of which the colorimetric value is acquired by the color measurement unit and the colorimetric value acquired by the color measurement unit.

For example, the first color conversion table selection unit may be configured to calculate the color difference between the chromaticity value of the read image signal obtained with reference to the color conversion table stored in the first color conversion table database and the colorimetric value obtained by the color measurement unit, and to select the color conversion table in which the average color difference or the maximum color difference becomes a minimum from the first color conversion table database.

According to the seventh aspect of the invention, it is possible to further increase the accuracy of the chromaticity value calculated from the read image using the image reading unit.

As an eighth aspect of the invention, the color conversion table creation device according to any one of the fifth to seventh aspects of the invention may further comprise a first color conversion table correction unit that corrects the first color conversion table based on the correspondence relationship between the read image signal corresponding to the position on the document image data of which the colorimetric value is acquired by the color measurement unit and the colorimetric value acquired by the color measurement unit.

According to the eighth aspect of the invention, it is possible to make the chromaticity value acquired by the image reading unit close to the colorimetric value obtained by the color measurement unit, to thereby enhance the accuracy of the chromaticity value.

As a ninth aspect of the invention, the color conversion table creation device according to any one of the first to eighth aspects of the invention may further comprise a second color conversion table creation unit that creates a second color conversion table indicating a multidimensional correspondence relationship between the third color space and the second color space of the document image data based on the correspondence relationship between the document image data indicated by the signal value in the third color space which is the device-dependent color space and the chromaticity value of the read image of the target printed matter obtained through the processes in the image association unit and the first color conversion unit. The second color conversion table created by the second color conversion table creation unit may be used as the input color conversion table of the second color conversion unit.

According to the ninth aspect of the invention, it is possible to enhance the accuracy of color reproduction in the first printing, and to increase the speed of convergence of color matching.

As a tenth aspect of the invention, in the color conversion table creation device according to any one of the first to ninth aspects of the invention, the image association unit may include an image extraction unit that performs a process of extracting a partial image corresponding to the document image data from the read image data.

According to the tenth aspect of the invention, it is possible to perform desired color matching even in a case where there is not a one-to-one correspondence in the document image data and image content of a printing surface of the target printed matter or the printed matter.

As an eleventh aspect of the invention, in the color conversion table creation device according to any one of the first to tenth aspects of the invention, the image association unit may perform a color extraction process of extracting, from each of the document image data and the read image data subjected to the association process for the positional relationship, color information corresponding thereto.

The read image data subject to the association process for the positional relationship refers to printed matter read image data or target printed matter read image data, or may refer to both of them.

As a twelfth aspect of the invention, in the color conversion table creation device according to the eleventh aspect of the invention, the color extraction process may include a process of setting a region-of-interest in the document image data, a process of determining whether the region-of-interest satisfies a first extraction condition, and a correspondence relationship color information extraction process of extracting a signal value of the document image data which is the color information from the region-of-interest that satisfies the first extraction condition and extracting a signal value of the read image data which is the color information from a region at a position corresponding to the region-of-interest that satisfies the first extraction condition in the read image data subjected to the association process for the positional relationship.

As a thirteenth aspect of the invention, in the color conversion table creation device according to the twelfth aspect of the invention, the first extraction condition may include a condition that a difference between colors in the region-of-interest is equal to or smaller than a first extraction threshold value which is regulated for an allowable range.

As a fourteenth aspect of the invention, in the color conversion table creation device according to the twelfth or thirteenth aspect of the invention, the color extraction process may include a process of determining whether the region-of-interest satisfies a second extraction condition, and the color extraction process may include, as the correspondence relation color information extraction process, a process of extracting a signal value of the document image data which is the color information from the region-of-interest that satisfies the first extraction condition and the second extraction condition and extracting a signal value of the read image data which is the color information from a region at a position corresponding to the region-of-interest that satisfies the first extraction condition and the second extraction condition in the read image data subjected to the association process for the positional relationship.

As a fifteenth aspect of the invention, in the color conversion table creation device according to the fourteenth aspect of the invention, the second extraction condition may include a condition that the read image data is present in the region at the position corresponding to the region-of-interest that satisfies the first extraction condition and an image defect is not present in a region of the read image data at the position corresponding to the region-of-interest that satisfies the first extraction condition.

The image defect corresponds to a defect of a printed matter which is a reading target, a contaminant attached in reading, or the like, for example.

As a sixteenth aspect of the invention, in the color conversion table creation device according to any one of the twelfth to fifteenth aspects of the invention, the color extraction process may include a process of determining whether the region-of-interest satisfies a third extraction condition. A process of extracting the signal value of the document image data which is the color information from the region-of-interest that satisfies the first extraction condition and the third extraction condition and extracting the signal value of the read image data which is the color information from the region at the position corresponding to the region-of-interest that satisfies the first extraction condition in the read image data subjected to the association process for the positional relationship may be performed as the correspondence relationship color information extraction process. Further, any one of a condition of there being a non-surface treatment region where surface treatment is not present and a condition of there being a surface treatment region where the surface treatment is present may be determined as the third extraction condition.

As a seventeenth aspect of the invention, in the color conversion table creation device according to any one of the first to tenth aspects of the invention, the image association unit may perform a color extraction process of extracting, from each of the document image data and read chromaticity value image data expressed by the chromaticity value in the second color space, subjected to the association process for the positional relationship, color information corresponding thereto.

As an eighteenth aspect of the invention, in the color conversion table creation device according to the seventeenth aspect of the invention, the color extraction process may include a process of setting a region-of-interest in the document image data, a process of determining whether the region-of-interest satisfies a first extraction condition, and a correspondence relationship color information extraction process of extracting a signal value of the document image data which is the color information from the region-of-interest that satisfies the first extraction condition and extracting a chromaticity value of the read chromaticity value image data which is the color information from a region at a position corresponding to the region-of-interest that satisfies the first extraction condition in the read chromaticity value image data subjected to the association process for the positional relationship.

As a nineteenth aspect of the invention, in the color conversion table creation device according to the eighteenth aspect of the invention, the first extraction condition may include a condition that a difference between colors in the region-of-interest is equal to or smaller than a first extraction threshold value which is regulated for an allowable range.

As a twentieth aspect of the invention, in the color conversion table creation device according to the eighteenth to nineteenth aspects of the invention, the color extraction process may include a process of determining whether the region-of-interest satisfies a second extraction condition, and the color extraction process may include, as the correspondence relation color information extraction process, a process of extracting a signal value of the document image data which is the color information from the region-of-interest that satisfies the first extraction condition and the second extraction condition and extracting a chromaticity value of the read chromaticity value image data which is the color information from a region at a position corresponding to the region-of-interest that satisfies the first extraction condition and the second extraction condition in the read chromaticity value image data subjected to the association process for the positional relationship.

As a twenty-first aspect of the invention, in the color conversion table creation device according to the twentieth aspect of the invention, the second extraction condition may include a condition that the read image data is present in the region at the position corresponding to the region-of-interest that satisfies the first extraction condition and an image defect is not present in a region of the read image data at the position corresponding to the region-of-interest that satisfies the first extraction condition.

As a twenty-second aspect of the invention, in the color conversion table creation device according to any one of the eighteenth to twenty-first aspects of the invention, the color extraction process may include a process of determining whether the region-of-interest satisfies a third extraction condition. A process of extracting the signal value of the document image data which is the color information from the region-of-interest that satisfies the first extraction condition and the third extraction condition and extracting the chromaticity value of the read image chromaticity value data which is the color information from a region at a position corresponding to the region-of-interest that satisfies the first extraction condition and the third extraction condition in the read chromaticity value image data subjected to the association process for the positional relationship may be performed as the correspondence relationship color information extraction process. Further, any one of a condition of there being a non-surface treatment region where surface treatment is not present and a condition of there being a surface treatment region where the surface treatment is present may be determined as the third extraction condition.

As a twenty-third aspect of the invention, in the color conversion table creation device according to any one of the first to twenty-second aspects of the invention of the invention may further comprise a first image reading unit that reads the target printed matter and a second image reading unit that reads the printed matter printed by the printing device as the image reading unit.

A device configuration in which the first image reading unit used for reading of the target printed matter and the second image reading unit used for reading of the printed matter printed by the printing device are separately provided may be used. In this case, a configuration in which the first image reading unit and the second image reading unit are integrated generally functions as an "image reading unit". That is, the first image reading unit and the second reading unit share the functions to serve as the "image reading unit".

In the case of the configuration in which the first image reading unit and the second image reading unit which are two different image reading units are used, with respect to the first color conversion table, two different first color conversion tables suitable for the respective first image reading unit and second image reading unit are prepared. In conversion of the signal value obtained by the first image reading unit, the first color conversion table corresponding to the first image reading unit is used, and in conversion of the signal value obtained by the second image reading unit, the first color conversion table corresponding to the second image reading unit is used.

As a twenty-fourth aspect of the invention, there is provided a color conversion table creation method that comprises: a document image color conversion process of color-converting document image data into print image data using an input color conversion table and an output color conversion table; a printing process of printing a printed matter according to the print image data by a printing device; a process of acquiring printed matter read image data indicating a read image of the printed matter by reading the printed matter by an image reading unit; a process of acquiring target printed matter read image data indicating a read image of a target printed matter by reading the target printed matter by the image reading unit; a read image color conversion process of converting, using a first color conversion table indicating a correspondence relationship between a signal value in a first color space acquired by the image reading unit and a chromaticity value in a second color space which is a device-independent color space, the signal value in the first color space into the chromaticity value in the second color space; an image association process of performing an association process for a positional relationship between the printed matter read image data indicated by the signal value in the first color space obtained by reading the printed matter by the image reading unit and the document image data and an association process for a positional relationship between the target printed matter read image data indicated by the signal value in the first color space obtained by reading the target printed matter by the image reading unit and the document image data, or performing an association process for a positional relationship between printed matter read chromaticity value image data obtained by converting a signal value of the printed matter read image data into a chromaticity value in the second color space in the read image color conversion process and the document image data and an association process for a positional relationship between target printed matter read chromaticity value image data obtained by converting a signal value of the target printed matter read image data into a chromaticity value in the second color space in the read image color conversion process and the document image data; and a color conversion table creation process of creating a color conversion table used in the color conversion in the document image color conversion process from a correspondence relationship between the document image data indicated by a signal value in a third color space which is a device-dependent color space, and a chromaticity value of the target printed matter and a chromaticity value of the printed matter obtained through processes in the image association process and the read image color conversion unit, based on a difference between the chromaticity value of the target printed matter and the chromaticity value of the printed matter.

In the color conversion table creation method according to the twenty-fourth aspect of the invention, it is possible to appropriately combine the same contents as specific contents of the color conversion table creation devices, specified according to the second to twenty-third aspects of the invention. In this case, processing units or functional units which are means for performing processes based on functions specified in the color conversion table creation devices may be handled as elements of "processes (steps)" which are processes or operations corresponding thereto.

As a twenty-fifth aspect of the invention, in the color conversion table creation method according to the twenty-fourth aspect of the invention, the color conversion table created in the color conversion table creation process may be used in the color conversion in the document image color conversion process, and the document image color conversion process, the printing process, the process of acquiring the printed matter read image data, the read image color conversion process, the image association process, and the color conversion table creation process may be repeated again.

Until the difference between the chromaticity value of the target printed matter and the chromaticity value of the printed matter falls within the allowable range, the document image color conversion process, the printing process, the process of acquiring the printed matter read image data, the read image color conversion process, the image association process, and the color conversion table creation process may be repeatedly performed. Thus, it is possible to further enhance the accuracy of color reproduction.

As a twenty-sixth aspect of the invention, there is provided a program that causes a computer to execute: a function of acquiring, using an image reading unit that reads a target printed matter and a printed matter printed by a printing device, read image data indicating a read image of each of the target printed matter and the printed matter; a first color conversion function of converting, using a first color conversion table indicating a correspondence relationship between a signal value in a first color space acquired by the image reading function and a chromaticity value in a second color space which is a device-independent color space, the signal value in the first color space into the chromaticity value in the second color space; a second color conversion function of color-converting document image data into print image data using an input color conversion table and an output color conversion table; an image association function of performing an association process for a positional relationship between printed matter read image data indicated by the signal value in the first color space obtained by reading the printed matter printed by the printing device according to the print image data by the image reading unit and the document image data and an association process for a positional relationship between target printed matter read image data indicated by the signal value in the first color space obtained by reading the target printed matter by the image reading unit and the document image data, or performing an association process for a positional relationship between printed matter read chromaticity value image data obtained by converting a signal value of the printed matter read image data into a chromaticity value in the second color space by the first color conversion function and the document image data and an association process for a positional relationship between target printed matter read chromaticity value image data obtained by converting a signal value of the target printed matter read image data into a chromaticity value in the second color space by the first color conversion function and the document image data; and a color conversion table creation function of creating a color conversion table used in the second color conversion function from a correspondence relationship between the document image data indicated by a signal value in a third color space which is a device-dependent color space, and a chromaticity value of the target printed matter and a chromaticity value of the printed matter obtained through processes in the image association function and the first color conversion function, based on a difference between the chromaticity value of the target printed matter and the chromaticity value of the printed matter.

In the program according to the twenty-sixth aspect of the invention, it is possible to appropriately combine the same contents as specific contents of the color conversion table creation devices, specified according to the second to twenty-third aspects of the invention. In this case, processing units or functional units which are means for performing processes based on functions specified in the color conversion table creation devices may be handled as elements of "functions" of the program which performs processes or operations corresponding thereto.

As a twenty-seventh aspect of the invention, there is provided a color conversion table creation device comprising: a first image reading unit that reads a target printed matter to acquire read image data indicating a read image of the target printed matter; a second image reading unit that reads a printed matter printed by a printing device to acquire read image data indicating a read image of the printed matter; a first color conversion unit that converts, using a first color conversion table indicating a correspondence relationship between a signal value in a first color space acquired by each of the first image reading unit and the second image reading unit and a chromaticity value in a second color space which is a device-independent color space, the signal value in the first color space into the chromaticity value in the second color space; a second color conversion unit that color-converts document image data into print image data using an input color conversion table and an output color conversion table; an image association unit that performs an association process for a positional relationship between printed matter read image data indicated by the signal value in the first color space obtained by reading the printed matter printed by the printing device according to the print image data by the second image reading unit and the document image data and an association process for a positional relationship between target printed matter read image data indicated by the signal value in the first color space obtained by reading the target printed matter by the first image reading unit and the document image data, or performs an association process for a positional relationship between printed matter read chromaticity value image data obtained by converting a signal value of the printed matter read image data into a chromaticity value in the second color space by the first color conversion unit and the document image data and an association process for a positional relationship between target printed matter read chromaticity value image data obtained by converting a signal value of the target printed matter read image data into a chromaticity value in the second color space by the first color conversion unit and the document image data; and a color conversion table creation unit that creates a color conversion table used in the second color conversion unit from a correspondence relationship between the document image data indicated by a signal value in a third color space which is a device-dependent color space, and a chromaticity value of the target printed matter and a chromaticity value of the printed matter obtained through processes in the image association unit and the first color conversion unit, based on a difference between the chromaticity value of the target printed matter and the chromaticity value of the printed matter.

In the color conversion table creation device according to the twenty-seventh aspect of the invention, it is possible to appropriately combine the same contents as specific contents of the color conversion table creation devices, specified according to the second to twenty-second aspects of the invention.

As a twenty-eighth aspect of the invention, in the color conversion table creation device according to the twenty-third or twenty-seventh aspect of the invention, the second image reading unit may be an in-line sensor built into the printing device.

According to a twenty-ninth aspect of the invention, there is provided a color conversion table creation method comprising: a process of acquiring target printed matter read image data indicating a read image of a target printed matter by reading the target printed matter by a first image reading unit; a document image color conversion process of color-converting document image data into print image data using an input color conversion table and an output color conversion table; a printing process of printing a printed matter according to the print image data by a printing device; a process of acquiring printed matter read image data indicating a read image of a printed matter by reading the printed matter by a second image reading unit; a read image color conversion process of converting, using a first color conversion table indicating a correspondence relationship between a signal value in a first color space acquired by each of the first image reading unit and the second image reading unit and a chromaticity value in a second color space which is a device-independent color space, the signal value in the first color space into the chromaticity value in the second color space; an image association process of performing an association process for a positional relationship between the printed matter read image data indicated by the signal value in the first color space obtained by reading the printed matter by the second image reading unit and the document image data and an association process for a positional relationship between the target printed matter read image data indicated by the signal value in the first color space obtained by reading the target printed matter by the first image reading unit and the document image data, or performing an association process for a positional relationship between printed matter read chromaticity value image data obtained by converting a signal value of the printed matter read image data into a chromaticity value in the second color space in the read image color conversion process and the document image data and an association process for a positional relationship between target printed matter read chromaticity value image data obtained by converting a signal value of the target printed matter read image data into a chromaticity value in the second color space in the read image color conversion process and the document image data; and a color conversion table creation process of creating a color conversion table used in the color conversion in the document image color conversion process from a correspondence relationship between the document image data indicated by a signal value in a third color space which is a device-dependent color space, and a chromaticity value of the target printed matter and a chromaticity value of the printed matter obtained through processes in the image association process and the read image color conversion process, based on a difference between the chromaticity value of the target printed matter and the chromaticity value of the printed matter.

In the color conversion table creation method according to the twenty-ninth aspect of the invention, it is possible to appropriately combine the same contents as specific contents of the color conversion table creation devices, specified according to the second to twenty-second aspects, and the twenty-eighth aspect of the invention. In this case, processing units or functional units which are means for performing processes based on functions specified in the color conversion table creation devices may be handled as elements of "processes (steps)" which are processes or operations corresponding thereto.

According to a thirtieth aspect of the invention, there is provided a program that causes a computer to execute: a function of acquiring, using a first image reading unit that reads a target printed matter, read image data indicating a read image of the target printed matter; a function of acquiring, using a second image reading unit that reads a printed matter printed by a printing device, read image data indicating a read image of the printed matter; a first color conversion function of converting, using a first color conversion table indicating a correspondence relationship between a signal value in a first color space acquired by each of the first image reading unit and the second image reading unit and a chromaticity value in a second color space which is a device-independent color space, the signal value in the first color space into the chromaticity value in the second color space; a second color conversion function of color-converting document image data into print image data using an input color conversion table and an output color conversion table; an image association function of performing an association process for a positional relationship between printed matter read image data indicated by the signal value in the first color space obtained by reading the printed matter printed by the printing device according to the print image data by the second image reading unit and the document image data and an association process for a positional relationship between target printed matter read image data indicated by the signal value in the first color space obtained by reading the target printed matter by the first image reading unit and the document image data, or performing an association process for a positional relationship between printed matter read chromaticity value image data obtained by converting a signal value of the printed matter read image data into a chromaticity value in the second color space by the first color conversion function and the document image data and an association process for a positional relationship between target printed matter read chromaticity value image data obtained by converting a signal value of the target printed matter read image data into a chromaticity value in the second color space by the first color conversion function and the document image data; and a color conversion table creation function of creating a color conversion table used in the second color conversion function from a correspondence relationship between the document image data indicated by a signal value in a third color space which is a device-dependent color space, and a chromaticity value of the target printed matter and a chromaticity value of the printed matter obtained through processes in the image association function and the first color conversion function, based on a difference between the chromaticity value of the target printed matter and the chromaticity value of the printed matter.

With respect to the program according to the thirtieth aspect of the invention, it is possible to appropriately combine the same contents as specific contents of the color conversion table creation devices, specified according to the second to twenty-second aspects, and the twenty-eighth aspect of the invention. In this case, processing units or functional units which are means for performing processes based on functions specified in the color conversion table creation devices may be handled as elements of "functions" of the program which performs processes or operations corresponding thereto.

A non-transitory recording medium according to a thirty-first aspect of the invention is a non-transitory recording medium on which a computer-readable code of the program according to the twenty-sixth aspect is recorded. A non-transitory recording medium on which a computer-readable code of a program obtained by appropriately combining the same contents as specific contents of the color conversion table creation devices, specified according to the second to twenty-third aspects of the invention, with respect to the program according to the twenty-sixth aspect of the invention is also included in an embodiment of the invention.

A non-transitory recording medium according to a thirty-second aspect of the invention is a non-transitory recording medium on which a computer-readable code of the program according to the thirtieth aspect is recorded. A non-transitory recording medium on which a computer-readable code of a program obtained by appropriately combining the same contents as specific contents of the color conversion table creation devices, specified according to the second aspect to the twenty-second aspect and the twenty-eighth aspects of the invention, with respect to the program according to the thirtieth aspect of the invention is also included in an embodiment of the invention.

In the thirtieth aspect and the thirty-first aspect of the invention, as a specific example of the "non-transitory recording medium", various non-transitory recording mediums such as a read only memory (ROM) or an electrically erasable and programmable read only memory (EEPROM), a hard disk drive, various magneto-optical recording mediums such as a compact disc or a digital versatile disc (DVD), or a semiconductor memory such as a solid state drive (SSD) may be used.

According to a thirty-third aspect of the invention, there is provided a color conversion table creation device comprising: an image reading unit that reads a target printed matter to acquire read image data indicating a read image of the target printed matter; a first color conversion unit that converts, using a first color conversion table indicating a correspondence relationship between a signal value in a first color space acquired by the image reading unit and a chromaticity value in a second color space which is a device-independent color space, the signal value in the first color space into the chromaticity value in the second color space; an image association unit that performs an association process for a positional relationship between the read image data indicated by the signal value in the first color space and document image data of the target printed matter or performs an association process for a positional relationship between read chromaticity value image data obtained by converting a signal value of the read image data into a chromaticity value in the second color space by the first color conversion unit and the document image data of the target printed matter; and a color conversion table creation unit that creates, based on a correspondence relationship between the document image data indicated by a signal value in a third color space which is a device-dependent color space, and a chromaticity value of the read image obtained through processes in the image association unit and the first color conversion unit, a second color conversion table indicating a multidimensional correspondence relationship between the third color space and the second color space of the document image data.

A configuration in which the color conversion process in the first color conversion unit is performed after the image association process in the image association unit is performed with respect to the read image data obtained by the image reading unit may be used, or a configuration in which the image association process in the image association unit is performed after the color conversion process in the first color conversion unit is performed may be used.

The term "chromaticity value" means a value of a color indicated by table color coordinates in a device-independent color space, which is not limited to an XYZ table color system.

The second color conversion table created according to the thirty-third aspect of the invention may be used as a color conversion table of a target profile. According to the thirty-third aspect of the invention, it is possible to create a color conversion table (second color conversion table) of the target profile without performing output of a printed matter using the printing device and a reading operation of the printed matter.

Furthermore, since the second color conversion table created according to the thirty-third aspect of the invention regulates a multi-dimensional correspondence relationship between a color space (third color space) of the document image data and a device-independent color space (second color space), it is possible to perform color correction with a higher degree of freedom, and to perform color matching with higher accuracy, compared with a configuration in which color correction is performed using a one-dimensional correspondence relationship for each color component in the related art.

In addition, according to the thirty-third aspect of the invention, it is possible to perform color management using an ICC profile, and to provide a technique having versatility.

According to a thirty-fourth aspect of the invention, the color conversion table creation device according to the thirty-third aspect of the invention may further comprise: a color measurement unit that performs color measurement with respect to a color measurement target which is at least one of the target printed matter or a color sample which is different from the target printed matter to acquire a colorimetric value of the color measurement target; and a color measurement target image signal acquisition unit that includes at least one of a color measurement target document image signal acquisition unit that acquires a document image signal corresponding to a position on the document image data of which a colorimetric value is acquired by the color measurement unit or a color measurement target read image signal acquisition unit that acquires a read image signal corresponding to the position on the read image data of which the colorimetric value is acquired by the color measurement unit.

It is preferable to use a spectral colorimeter as the color measurement unit. According to the thirty-fourth aspect of the invention, it is possible to reduce an error of the chromaticity value detected from the read image obtained by the image reading unit, to thereby enhance color matching accuracy.

According to a thirty-fifth aspect of the invention, the color conversion table creation device according to the thirty-fourth aspect may further comprise a chromaticity value replacement unit that replaces a chromaticity value corresponding to the position on the document image data of which the colorimetric value is acquired by the color measurement unit with the colorimetric value acquired by the color measurement unit, with respect to a color conversion result in the first color conversion unit.

According to a thirty-sixth aspect of the invention, the color conversion table creation device according to the thirty-fourth aspect or the thirty-fifth aspect may further comprise: a first color conversion table database in which a plurality of color conversion tables capable of being applied as the first color conversion table is stored; and a first color conversion table selection unit that selects one color conversion table from the plurality of color conversion tables stored in the first color conversion table database. The plurality of color conversion tables may include a color conversion table indicating a correspondence relationship between a reading signal and a chromaticity value of the image reading unit for each combination of types of coloring materials and base materials to be used in creation of a printed matter in the printing device, and the first color conversion table selection unit may select one color conversion table from the plurality of color conversion tables based on a correspondence relationship between the read image signal corresponding to the position on the read image data of which the colorimetric value is acquired by the color measurement unit and the colorimetric value acquired by the color measurement unit.

For example, the first color conversion table selection unit may be configured to calculate a color difference between the chromaticity value of the read image signal obtained by referring to the color conversion table stored in the first color conversion table database and the colorimetric value obtained by the color measurement unit, and to select the color conversion table in which an average value (referred to as "average color difference") of color differences or a maximum value (referred to as "maximum color difference") of color differences becomes a minimum from the first color conversion table database.

According to the thirty-sixth aspect of the invention, it is possible to further enhance the accuracy of the chromaticity value calculated from the read image obtained by the image reading unit.

According to a thirty-seventh aspect of the invention, the color conversion table creation device according to any one of the thirty-fourth to thirty-sixth aspects of the invention may further comprise: a first color conversion table correction unit that corrects the first color conversion table based on the correspondence relationship between the read image signal corresponding to the position on the read image data of which the colorimetric value is acquired by the color measurement unit and the colorimetric value acquired by the color measurement unit.

According to the thirty-seventh aspect of the invention, it is possible to make the chromaticity value acquired by the image reading unit close to the colorimetric value obtained by the color measurement unit, to thereby enhance the accuracy of the chromaticity value.

According to a thirty-eighth aspect of the invention, in the color conversion table creation device according to any one of the thirty-third to thirty-seventh aspects of the invention, the image association unit may include an image extraction unit that performs a process of extracting a partial image corresponding to the document image data from the read image data.

According to the thirty-eighth aspect of the invention, it is possible to perform desired color matching even in a case where there is not a one-to-one correspondence in the document image data and image content of a printing surface of the target printed matter or the printed matter.

According to a thirty-ninth aspect of the invention, in the color conversion table creation device according to any one of the thirty-third to thirty-eighth aspects of the invention, the color conversion table creation unit may perform a process of setting a chromaticity value in the second color space associated with a signal value of the document image data with respect to one or a plurality of lattice points of the second color conversion table corresponding to the signal value of the document image data.

In a case where the signal value of the document image data directly corresponds to a value of a lattice point, it is possible to set a chromaticity value to one lattice point that directly corresponds thereto. Furthermore, it is preferable to set the same chromaticity value with respect to peripheral lattice points adjacent to one lattice point that directly corresponds thereto.

On the other hand, in a case where there are no lattice points that directly correspond to the signal value of the document image data, the plural lattice points that surround the signal value (document image signal value) of the document image data are set as "a plurality of lattice points of the second color conversion table corresponding to the signal value of the document image data". Thus, it is possible to set chromaticity values with respect to the plurality of lattice points.

According to a fortieth aspect of the invention, in the color conversion table creation device according to the thirty-ninth aspect of the invention, the color conversion table creation unit may perform, using an existing color conversion table as a temporary color conversion table, the process of setting the chromaticity value in the second color space associated with the signal value of the document image data with respect to one or the plurality of lattice points of the second color conversion table corresponding to the signal value of the document image data with respect to the temporary color conversion table.

According to a forty-first aspect of the invention, in the color conversion table creation device according to any one of the thirty-third to thirty-eighth aspects of the invention, the color conversion table creation unit may perform a process of calculating a chromaticity value of one or a plurality of lattice points of the second color conversion table corresponding to a signal value of the document image data, using a color reproduction model for predicting a color reproduced according to a coloring material used in printing.

According to a forty-second aspect of the invention, in the color conversion table creation device according to any one of the thirty-third to forty-first aspects of the invention, the image association unit may perform a color extraction process of extracting, from each of the document image data and the read image data subjected to the association process for the positional relationship, color information corresponding thereto.

According to a forty-third aspect of the invention, in the color conversion table creation device according to the forty-second aspect of the invention, the color extraction process may include a process of setting a region-of-interest in the document image data, a process of determining whether the region-of-interest satisfies a first extraction condition, and a correspondence relationship color information extraction process of extracting a signal value of the document image data which is the color information from the region-of-interest that satisfies the first extraction condition and extracting a signal value of the read image data which is the color information from a region at a position corresponding to the region-of-interest that satisfies the first extraction condition in the read image data subjected to the association process for the positional relationship.

According to a forty-fourth aspect of the invention, in the color conversion table creation device according to the forty-third aspect of the invention, the first extraction condition may include a condition that a difference between colors in the region-of-interest is equal to or smaller than a first extraction threshold value which is regulated for an allowable range.

According to a forty-fifth aspect of the invention, in the color conversion table creation device according to the forty-third aspect or the forty-fourth aspect of the invention, the color extraction process may include a process of determining whether the region-of-interest satisfies a second extraction condition, and the color extraction process may include, as the correspondence relation color information extraction process, a process of extracting a signal value of the document image data which is the color information from the region-of-interest that satisfies the first extraction condition and the second extraction condition and extracting a signal value of the read image data which is the color information from a region at a position corresponding to the region-of-interest that satisfies the first extraction condition and the second extraction condition in the read image data subjected to the association process for the positional relationship.

According to a forty-sixth aspect of the invention, in the color conversion table creation device according to the forty-fifth aspect of the invention, the second extraction condition may include a condition that the read image data is present in the region at the position corresponding to the region-of-interest that satisfies the first extraction condition and an image defect is not present in a region of the read image data at the position corresponding to the region-of-interest that satisfies the first extraction condition.

For example, the image defect corresponds to a defect of the target printed matter, a contaminant attached when reading of the target printed matter, or the like.

According to a forty-seventh aspect of the invention, in the color conversion table creation device according to any one of the forty-third to forty-sixth aspects of the invention, the color extraction process may include a process of determining whether the region-of-interest satisfies a third extraction condition. A process of extracting the signal value of the document image data which is the color information from the region-of-interest that satisfies the first extraction condition and the third extraction condition and extracting the signal value of the read image data which is the color information from the region at the position corresponding to the region-of-interest that satisfies the first extraction condition in the read image data subjected to the association process for the positional relationship may be performed as the correspondence relationship color information extraction process, and any one of a condition of there being a non-surface treatment region where surface treatment is not present and a condition of there being a surface treatment region where the surface treatment is present may be determined as the third extraction condition.

According to a forty-eighth aspect of the invention, in the color conversion table creation device according to the thirty-third to forty-first aspects of the invention, the image association unit may perform a color extraction process of extracting, from each of the document image data and the read chromaticity value image data, subjected to the association process for the positional relationship, color information corresponding thereto.

According to a forty-ninth aspect of the invention, in the color conversion table creation device according to the forty-eighth aspect of the invention, the color extraction process may include a process of setting a region-of-interest in the document image data, a process of determining whether the region-of-interest satisfies a first extraction condition, and a correspondence relationship color information extraction process of extracting a signal value of the document image data which is the color information from the region-of-interest that satisfies the first extraction condition and extracting a chromaticity value of the read chromaticity value image data which is the color information from a region at a position corresponding to the region-of-interest that satisfies the first extraction condition in the read chromaticity value image data subjected to the association process for the positional relationship.

According to a fiftieth aspect of the invention, in the color conversion table creation device according to the forty-ninth aspect of the invention, the first extraction condition may include a condition that a difference between colors in the region-of-interest is equal to or smaller than a first extraction threshold value which is regulated for an allowable range.

According to a fifty-first aspect of the invention, in the color conversion table creation device according to the forty-ninth aspect or the fiftieth aspect of the invention, the color extraction process may include a process of determining whether the region-of-interest satisfies a second extraction condition. The color extraction process may include, as the correspondence relation color information extraction process, a process of extracting a signal value of the document image data which is the color information from the region-of-interest that satisfies the first extraction condition and the second extraction condition and extracting a chromaticity value of the read chromaticity value image data which is the color information from a region at a position corresponding to the region-of-interest that satisfies the first extraction condition and the second extraction condition in the read image data subjected to the association process for the positional relationship.

According to a fifty-second aspect of the invention, in the color conversion table creation device according to the fifty-first aspect of the invention, the second extraction condition may include a condition that the read image data is present in the region at the position corresponding to the region-of-interest that satisfies the first extraction condition and an image defect is not present in a region of the read image data at the position corresponding to the region-of-interest that satisfies the first extraction condition.

According to a fifty-third aspect of the invention, in the color conversion table creation device according to any one of the forty-ninth to fifty-second aspects of the invention, the color extraction process may include a process of determining whether the region-of-interest satisfies a third extraction condition. A process of extracting the signal value of the document image data which is the color information from the region-of-interest that satisfies the first extraction condition and the third extraction condition and extracting the chromaticity value of the read image data which is the color information from a region at a position corresponding to the region-of-interest that satisfies the first extraction condition and the third extraction condition in the read chromaticity value image data subjected to the association process for the positional relationship may be performed as the correspondence relationship color information extraction process, and any one of a condition of there being a non-surface treatment region where surface treatment is not present and a condition of there being a surface treatment region where the surface treatment is present may be determined as the third extraction condition.

According to a fifty-fourth aspect of the invention, there is provided a color conversion table creation method comprising: an image reading process of reading a target printed matter to acquire read image data indicating a read image of the target printed matter; a first color conversion process of converting, using a first color conversion table indicating a correspondence relationship between a signal value in a first color space acquired in the image reading process and a chromaticity value in a second color space which is a device-independent color space, the signal value in the first color space into the chromaticity value in the second color space; an image association process of performing an association process for a positional relationship between the read image data indicated by the signal value in the first color space and document image data of the target printed matter or performing an association process for a positional relationship between read chromaticity value image data obtained by converting a signal value of the read image data into a chromaticity value in the second color space in the first color conversion process and the document image data of the target printed matter; and a color conversion table creation process of creating, based on a correspondence relationship between the document image data indicated by a signal value in a third color space which is a device-dependent color space, and a chromaticity value of the read image obtained through the image association process and the first color conversion process, a second color conversion table indicating a multi-dimensional correspondence relationship between the third color space and the second color space of the document image data.

In the color conversion creation method according to the fifty-fourth aspect of the invention, it is possible to appropriately combine the same contents as specific contents of the color conversion table creation devices, specified according to the thirty-fourth to fifty-third aspects of the invention. In this case, processing units or functional units which are means for performing processes based on functions specified in the color conversion table creation devices may be handled as elements of "processes (steps)" which are processes or operations corresponding thereto.

According to a fifty-fifth aspect of the invention, there is provided a program that causes a computer to execute: a function of acquiring, using an image reading unit that reads a printed matter, read image data indicating a read image of the printed matter; a first color conversion function of converting, using a first color conversion table indicating a correspondence relationship between a signal value in a first color space acquired by the image reading unit and a chromaticity value in a second color space which is a device-independent color space, the signal value in the first color space into the chromaticity value in the second color space; an image association function of performing an association process for a positional relationship between the read image data indicated by the signal value in the first color space and document image data of the target printed matter or performing an association process for a positional relationship between read chromaticity value image data obtained by converting a signal value of the read image data into a chromaticity value in the second color space by the first color conversion function and the document image data of the target printed matter; and a color conversion table creation function of creating, based on a correspondence relationship between the document image data indicated by a signal value in a third color space which is a device-dependent color space, and a chromaticity value of the read image obtained through processes based on the image association function and the first color conversion function, a second color conversion table indicating a multi-dimensional correspondence relationship between the third color space and the second color space of the document image data.

With respect to the program according to the fifty-fifth aspect of the invention, it is possible to appropriately combine the same contents as specific contents of the color conversion table creation devices, specified according to the thirty-fourth to fifty-third aspects of the invention. In this case, processing units or functional units which are means for performing processes based on functions specified in the color conversion table creation devices may be handled as elements of "functions" of the program which performs processes or operations corresponding thereto.

A non-transitory recording medium according to a fifty-sixth aspect of the invention is a non-transitory reading recording medium on which a computer-readable code of the program according to the fifty-fifth aspect of the invention is recorded. A non-transitory recording medium on which a computer-readable code of a program obtained by appropriately combining the same contents as specific contents of the color conversion table creation devices, specified according to the thirty-fourth to fifty-third aspects of the invention, with respect to the program according to the fifty-sixth aspect of the invention is also included in an embodiment of the invention. In the fifty-sixth aspect of the invention, as a specific example of the "non-transitory recording medium", the same recording medium as in the above-described thirtieth aspect and thirty-first aspect of the invention may be used.

According to the invention, it is possible to obtain a color conversion table capable of reproducing a color of a target printed matter with high accuracy from the target printed matter and document image data. Since multi-dimensional color conversion can be performed using the second color conversion unit by using the color conversion table created by the invention, it is possible to achieve color correction with a higher degree of freedom, and to achieve color matching with higher accuracy, compared with a configuration in which color correction is performed in a one-dimensional correspondence relationship for each color component in the related art. Further, according to the invention, even in a case where a target profile is unknown, it is possible to perform color management using an ICC profile, and to provide a technique having versatility.

Further, according to the invention, it is possible to create a color conversion table (second color conversion table) which is a target profile, based on document image data and a target printed matter. According to the invention, when a color conversion table which is a target profile is created, it is possible to omit output of a printed matter using a printing device and a reading operation of the printed matter, and to thereby simplify a color matching operation.

Further, according to the invention, since a color conversion table (second color conversion table) indicating a multi-dimensional correspondence relationship between a color space (third color space) of document image data and a device-independent color space (second color space) is created, it is possible to perform color matching with high accuracy, compared with a case where color adjustment is performed using a one-dimensional correspondence relationship in the related art.

According to the invention, even in a case where a target profile is unknown, it is possible to perform color management using an ICC profile, and to provide a technique having versatility.

BRIEF DESCRIPTION OF THE DRAWINGS

FIG. 14 is a table showing an example of data of a correspondence between document image signals, target chromaticity values, print chromaticity values, and differential chromaticity values.

DESCRIPTION OF THE PREFERRED EMBODIMENTS

Hereinafter, embodiments for performing the invention will be described with reference to the accompanying drawings.

<System Outline>

Figure 1:
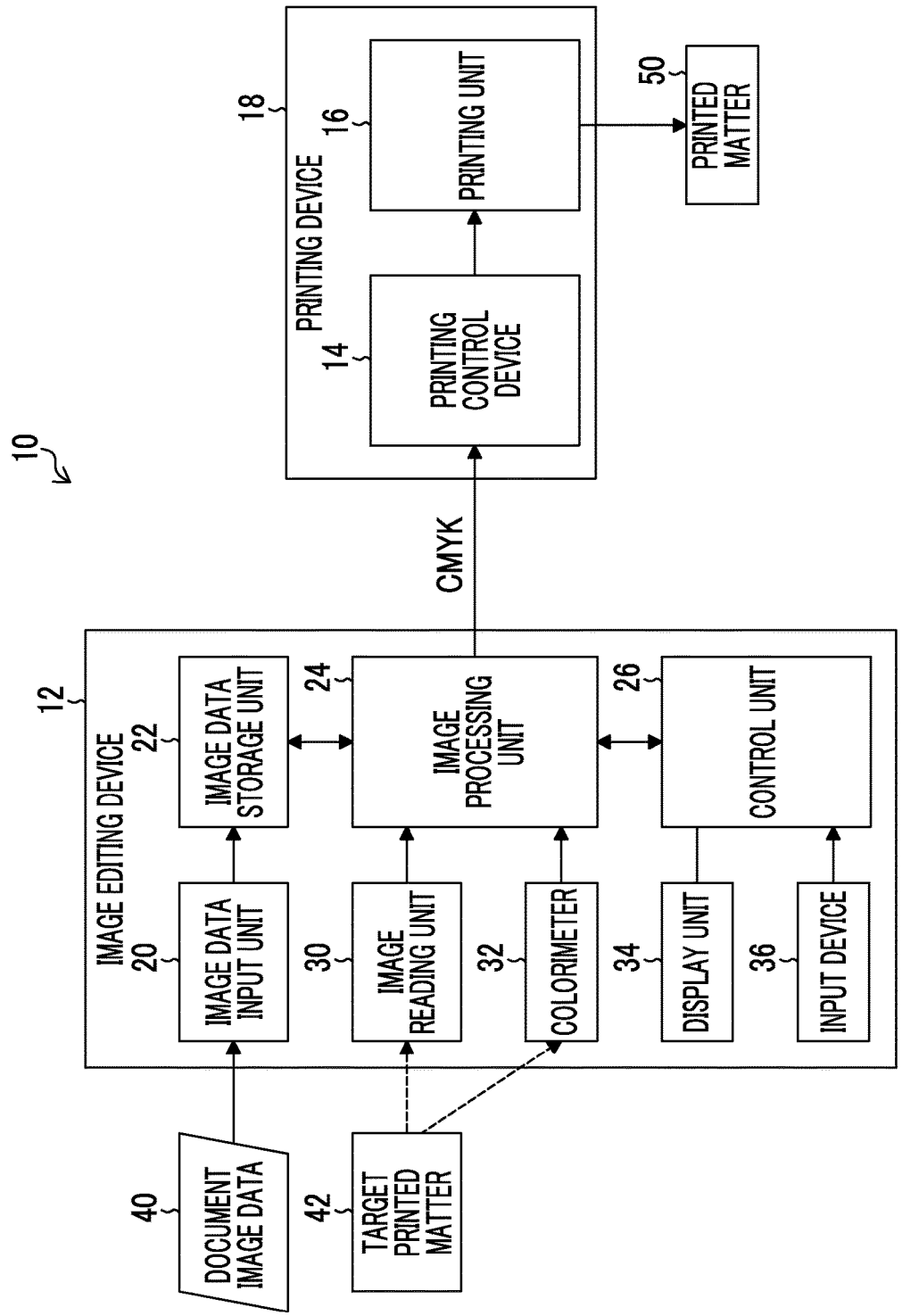
FIG. 1 is a block diagram showing a system configuration of a printing system including a color conversion table creation device according to an embodiment of the invention.

FIG. 1 is a block diagram showing an overall configuration of a printing system including a color conversion table creation device according to an embodiment of the invention. The printing system 10 comprises an image editing device 12, a print control device 14, and a printing unit 16. The image editing device 12 functions as the color conversion table creation device according to this embodiment, and performs a color conversion table creation process necessary for color reproduction in the printing unit 16. Further, the image editing device 12 is a device that performs image processing such as color conversion or image data processing (editing) using the color conversion table. Print image data generated by the image editing device 12 is transmitted to the print control device 14.

The image control device 14 controls a print operation in the printing unit 16 based on the print image data generated by the image editing device 12. The print control device 14 may include a half-tone processing unit that converts continuous tone image data into binary or multinary halftone image data. In this embodiment, a configuration in which the image editing device 12 and the print control device 14 are individually provided is shown, but a configuration in which the function of the print control device 14 is provided in the image editing device 12 may be used. For example, a configuration in which a single computer functions as the image editing device 12 and the print control device 14 may be used.

The printing unit 16 is image formation means for performing printing according to the control of the print control device 14. A printing method in the printing unit 16 and the type of a coloring material to be used therein are not particularly limited. As the printing unit 16, for example, various printers such as an inkjet printer, an electro-photographic printer, a laser printer, an offset printer or a flexo printer may be employed. The term "printer" may be understood as a synonym of a term of a printer, a printing device, an image recording device, an image formation device, an image output device, or the like. The coloring material may use ink, toner, or the like according to the type of the printing unit 16.

Here, for ease of description, a plateless-type digital printer is considered, and a configuration in which the print control device 14 and the printing unit 16 are combined is represented as a printing device 18. A configuration in which the print control device 14 and the printing unit 16 are integrally combined to form the printing device 18 may be used, and a configuration in which the print control device 14 and the printing unit 16 are provided as individual devices and signal transmission and reception is performed through wired or wireless communication may be used.

In a case where a plate-type printer that uses a printing plate as the printing unit 16 is employed, a system configuration in which a plate-making device (not shown) such as a plate recorder that makes a printing plate from image data is provided in addition to the print control device 14 is used. In this case, a configuration in which the plate-making device (not shown), the print control device 14, and the printing unit 16 are combined corresponds to the printing device 18.

The printing system 10 of this embodiment uses an inkjet printer capable of forming a color image using inks of four colors of cyan (C), magenta (M), yellow (Y), and black (K), as an example of the printing device 18. Here, the number of colors of inks or a combination thereof is not limited to the example. For example, a configuration in which pale inks such as light cyan (LC) or light magenta (LM) are added to the four colors of C, M, Y, and K, or a configuration in which a special color ink such as red or green is used in addition to the four colors of C, M, Y, and K may be used, for example.

The image editing device 12 comprises an image data input unit 20, an image data storage unit 22, an image processing unit 24, and a control unit 26. Further, the image editing device 12 comprises an image reading unit 30, a colorimeter 32, a display unit 34, and an input device 36. The image editing device 12 may be realized by a combination of hardware and software (program) of a computer. The image editing device 12 may be realized as a function of a raster image processor (RIP) device.

The image data input device 20 is a data acquisition unit that imports document image data 40. The image data input unit 20 may be configured by a data input terminal that imports the document image data 40 from an external device or another signal processing unit of the device. As the image data unit 20, a wired or wireless communication interface unit may be employed, a media interface unit that performs reading and writing with respect to an external recording medium (removable disc) such as a memory card may be employed, or an appropriate combination of these configurations may be used.

A target printed matter 42 is a color sample printed matter of a target color to be reproduced, and is given as a color sample of an actual object. The document image data 40 is digital image data indicating image content to be printed. In the case of this example, the document image data 40 is image data indicating a pattern of a document image of the target printed matter 42. The document image data 40 and the target printed matter 42 are provided from a user who requests printing (client). The document image data 40 may be entire image data indicating the entirety of image content on a printing surface of the target printed matter 42, or may be data of an image component (document component) which is a part of the image recorded on the printing surface.

A data format of the document image data 40 is not particularly limited. In this example, as the document image data 40, image data of 8 bits (256 gradations) is used with respect to each color of C, M, Y, and K, but the invention is not limited to C, M, Y, and K signals. Instead, an RGB signal format may be used, or a combination format of the C, M, Y, and K signals and a special color signal may be used, for example. Further, the number of gradations (the number of bits) in signals is not limited to this example.

The image data storage unit 22 is means for storing the document image data 40 acquired through the image data input unit 20. The document image data 40 imported through the image data input unit 20 is stored in the image data storage unit 22.

The image reading unit 30 reads the target printed matter 42 or a printed matter such as a printed matter 50 printed by the printing device 18, converts an optical image into electronic image data, and generates read image data which is a color image indicating the read image. For example, as the image reading unit 30, a color image scanner capable of outputting a read image as RGB image data may be used. As the image reading unit 30 in this example, a scanner capable of acquiring read image data indicated by image signals of color components of R, G, and B may be used. The read image acquired by the image reading unit 30 may be referred to as a "scan image". Instead of the scanner, a camera may be used.

The image reading unit 30 functions as means for acquiring read image data of the target printed matter 42. Further, the image reading unit 30 functions as means for reading the printed matter 50 printed by the printing device 18 and acquiring read image data of the printed matter 50. The read image data acquired through the image reading unit 30 is transmitted to the image processing unit 24.

A function of causing the read image data acquired by the image reading unit 30 to be imported to the image processing unit 24 corresponds to a "function of acquiring read image data".

The image processing unit 24 performs a color conversion table creation process based on the read image data acquired by the image reading unit 30 and the document image data 40. Further, the image processing unit 24 has a function of performing a color conversion process using a color conversion table with respect to the document image data 40 to generate image data for transmission and reception with respect to the printing device 18. The image processing unit 24 comprises a function of performing a process such as resolution conversion or gradation conversion with respect to the document image data 40 or the read image data as necessary. Details of processing contents in the image processing unit 24 will be described later.

Further, the printing system 10 in this example comprises the colorimeter 32 (corresponding to a "color measurement unit") in order to increase the accuracy of color information of the read image from the image reading unit 30. A spectral colorimeter is used as the colorimeter 32. The spectral colorimeter measures reflectances at a predetermined wavelength pitch in a wavelength region of visible light, and calculates X, Y, and Z values using color functions of X, Y, Z and the like indicating spectral sensitivities of human's visual sense to acquire colorimetric values. For example, the spectral colorimeter used as the colorimeter 32 measures reflectances at a wavelength pitch (wavelength step) of 10 nm in a wavelength region of 380 nm to 730 nm which is the wavelength region of the visible light to acquire colorimetric values. The X, Y, and Z values acquired by the colorimeter 32 may be converted into color coordinate values in a device-independent color space such as an L*a*b* color system according to a known conversion formula.

In this embodiment, an example in which the L*a*b* color system is used as a color system in the device-independent color space (color coordinate system) indicating target values of colors is described, but the color system is not limited thereto. For example, an XYZ color system (stimulus value Y including luminance (brightness), and color stimulus values X and Z), a Yxy color system (luminance Y, and chromaticity coordinates x, y), L*u*v* color system, defined by the International Commission on Illumination, may be used. Further, an HSV color system (hue H, saturation S, lightness V (value) or B (brightness)), an HLS color system (hue H, saturation S, luminance L), an YCbCr color system (luminance Y, and color differences Cb, Cr) may be used.

In this specification, for simplicity of description, the color space of the L*a*b* color system is expressed as a "Lab color space", chromaticity values expressed by coordinate values in the Lab color space are expressed as "Lab values". Further, image data in which image signal values of each pixel are represented as Lab values may be expressed as a "Lab image". As in the Lab color space, a value of a color expressed by color system coordinates of a color space (device-independent color space) that does not depend on a device is expressed as a "chromaticity value".

Information about colorimetric values acquired by the colorimeter 32 is transmitted to the image processing unit 24. The image processing unit 24 creates a color conversion table in consideration of the information about the colorimetric values acquired by the colorimeter 32 in addition to the read image data acquired by the image reading unit 30.

The control unit 26 controls an operation of each unit of the image editing device 12. The display unit 34 and the input device 36 function as a user interface (UI). The input device 36 may employ a variety of means such as a keyboard, a mouse, a touch panel or a track ball, or may employ an appropriate combination thereof. A configuration in which the display unit 34 and the input device 36 are integrally formed, such as a configuration in which a touch panel is mounted on a screen of the display unit 34, may be used.

An operator may perform input of a variety of information, for example, input of printing conditions using the input device 36, selection of an image quality mode, designation of a color measurement position, input and editing of additional information, or retrieval of information while checking content displayed on the screen of the display unit 34. Further, the input content and a variety of different information may be checked through display of the display unit 34.

Figure 2:
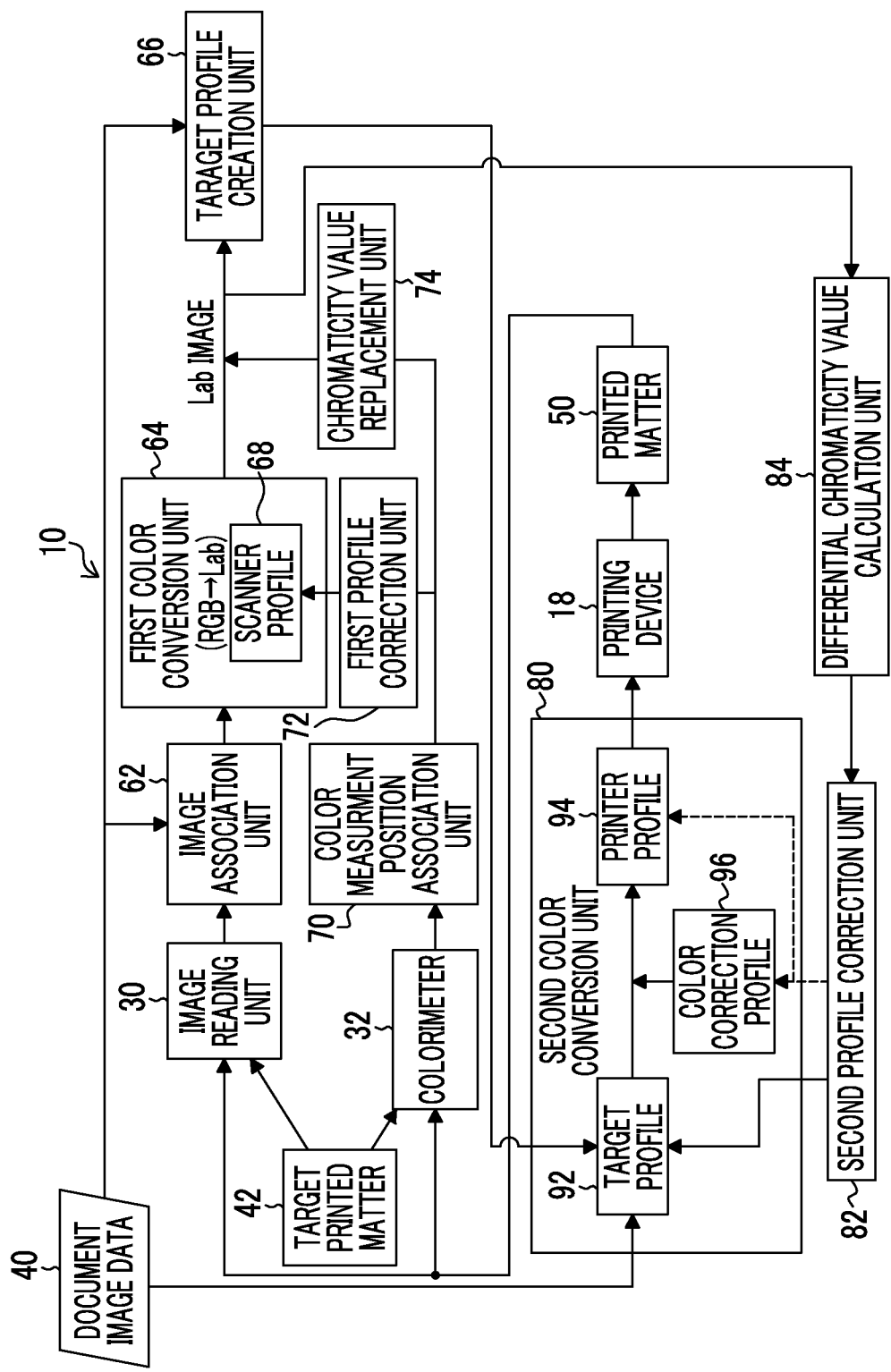
FIG. 2 is a block diagram showing an overall outline of the printing system.

FIG. 2 is a block diagram showing an overall outline of the printing system 10. In FIG. 2, the same reference numerals are given to the same components shown in FIG. 1. The printing system 10 of this example comprises a function of performing color-matching so that the printed matter 50 obtained by the printing device 18 is reproduced to have the same color as that of the target printed matter 42 based on the given target printed matter 42 and document image data 40. The "same color" includes a color difference range capable of being allowed by a client, that is, an allowable range capable of being satisfactorily considered as substantially the same color.

In order to realize such color matching, the printing system 10 comprises the image reading unit 30. Further, as shown in FIG. 2, the printing system 10 comprises an image association unit 62 that performs a positioning process with respect to the read image data acquired by the image reading unit 30 and the document image data 40, a first color conversion unit 64 that performs a color conversion process with respect to the read image data, and a target profile creation unit 66 that creates a target profile color conversion table from a correspondence relationship between the read image data subjected to the color conversion in the color conversion process of the first color conversion unit 64 and the document image data 40.

The first color conversion unit 64 performs a process of converting read image data indicated by signal values (in this example, RGB) of color components of a device-dependent color space into read image data after color conversion indicated by signal values (in this example, Lab values) of color components of a device-independent color space.

The first color conversion unit 64 performs a color conversion process (RGB→Lab conversion) of converting RGB values into Lab values using a color conversion table (corresponding to a "first color conversion table") of a scanner profile 68. The scanner profile 68 includes a color conversion table ("a first color conversion table") indicating a correspondence relationship between RGB values which are read image signal values in the device-dependent color space, acquired by the image reading unit 30, and device-independent Lab values. Here, the Lab color space is used as the device-independent color space, but other device-independent color spaces may be used. A color space of the read image signals (RGB) acquired by the image reading unit 30 corresponds to a "first color space", and a device-independent color space shown in the Lab color space corresponds to a "second color space". The color conversion function in the first color conversion unit 64 corresponds to a "first color conversion function". A process of color-converting read image signals by the first color conversion unit 64 corresponds to a "read image color conversion process".

Further, the printing system 10 comprises a color measurement position association unit 70 that performs an association process for a color measurement position where colorimetric values are acquired by the colorimeter 32 and a position in the document image data 40, and a first profile correction unit 72 that corrects the scanner profile 68 using the colorimetric values acquired by the colorimeter 32. A configuration in which a chromaticity value replacement unit 74 that directly corrects chromaticity values of a Lab image after color conversion in the first color conversion unit 64 is provided instead of or in addition to the first profile correction unit 72 may be used.

The image association unit 62, the first color conversion unit 64, the target profile creation unit 66, the color measurement position association unit 70, the first profile correction unit 72, and the colorimetric value replacement unit 74 are respectively included in the image processing unit 24 of the image editing device 12 shown in FIG. 1.

Further, as shown in FIG. 2, the image processing unit 24 includes a second color conversion unit 80 that performs color conversion of the document image data 40, a second profile correction unit 82, and a differential colorimetric value calculation unit 84.

The second color conversion unit 80 performs the conversion process of the document image data 40 using a target profile 92 based on an ICC profile format, and using a printer profile 94 to generate an image signal of a data format suitable for the printing device 18. Here, an example in which an output device signal based on a format of CMYK signals is generated as the image signal of the data format suitable for the printing device 18 will be described. A color conversion function in the second color conversion unit 80 corresponds to a "second color conversion function".

The target profile 92 is also referred to as an input profile. A color conversion table (referred to as an "input color conversion table") of the target profile 92 is a color conversion table that shows a conversion relation of CMYK→Lab in which target colors of CMYK signals of the document image data 40 are defined in a device-independent color space (here, Lab space). A color space (here, CMYK color space) of the document image data 40 corresponds to a "third color space".

The printer profile 94 is also referred to as an output profile. A color conversion table (referred to as an "output color conversion table") of the printer profile 94 is a color conversion table in which a correspondence relationship between CMYK signals output to the printing device 18 and Lab values of output colors from the printing device 18. The output color conversion table is a table that shows a conversion relation (Lab→CMYK) from Lab values to be reproduced to output CMYK values corresponding thereto.

The differential chromaticity value calculation unit 84 is a calculation unit that calculates differential chromaticity values (differential Lab values) indicating a difference between target chromaticity values (Lab values of the target printed matter 42) generated from the read image data of the target printed matter 42 through color conversion by the first color conversion unit 64 and print chromaticity values (Lab values of the printed matter 50) generated from the read image data of the printed matter 50.

Information about the difference calculated by the differential chromaticity value calculation unit 84 is provided to the second profile correction unit 82. The second profile correction unit 82 performs a process of correcting the target profile 92 based on the difference information. The second profile correction unit 82 does not only correct the target profile 92, but may also correct the printer profile 94. Further, the second profile correction unit 82 may create a color correction profile 96 based on the difference information, and may combine the target profile 92, the color correction profile 96, and the printer profile 94 to correct a color conversion table of the second color conversion unit 80.

An operation of performing color matching between the target printed matter 42 and the printed matter 50 using the image reading unit 30 in the printing system 10 of this embodiment may be approximately divided into the following two stages.

In a first stage, the target printed matter 42 is read by the image reading unit 30 to estimate a target profile, that is, to create the target profile.

In a second stage, the target printed matter 42 and the printed matter 50 printed by the printing device 18 are respectively read by the image reading unit 30, and a profile to be applied to the second color conversion unit 80 is corrected based on the read results to improve color matching accuracy.

A configuration corresponding to the first stage is referred to as a "first main configuration", and a configuration corresponding to the second stage is referred to as a "second main configuration". Hereinafter, the first main configuration and the second main configuration will be respectively described in detail.

<First Main Configuration>

Figure 3:
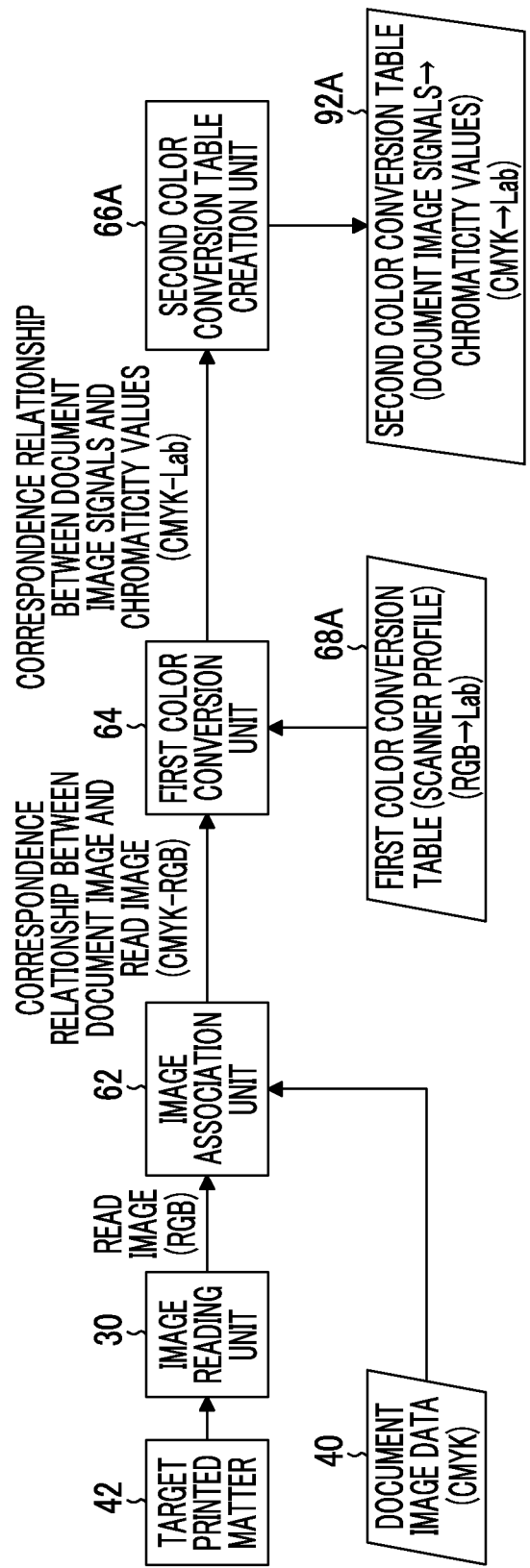
FIG. 3 is a block diagram showing a first main configuration of the printing system.

FIG. 3 is a block diagram showing a processing flow in the first main configuration. In FIG. 3, the document image data 40 is written as CMYK, the read image data is written as RGB, and chromaticity values are written as Lab, but a color space to be applied in realizing the invention is not limited to this example. The document image data 40 may be RGB image data, may be CMY image data, or may be image data in which CMYK signals and special color signals are combined.

Chromaticity values expressed in a device-independent color space may be values of an XYZ color system, may be values of an Luv color system, or may be values of other color systems. Such arbitrariness in color space is similarly applied to the following description.

As shown in FIG. 3, a target profile creation process based on the first main configuration is performed in the following procedure.

[Procedure 1] The target printed matter 42 is read by the image reading unit 30 (target printed matter image reading process) to acquire read image data (target printed matter read image data acquisition process). In this example, it is assumed that RGB images are acquired as read image data. The acquired read image data is transmitted to the image association unit 62.

[Procedure 2] The image association unit 62 performs an association process for a positional relationship between the read image data and the document image data 40 (image association process). A process of importing the document image data 40 (document image data acquisition process) may be performed before or after the target printed matter read image data acquisition process.

In the image association unit 62, a correspondence relationship between pixel positions of a document image and pixel positions of a read image is specified, and data indicating a correspondence relationship between signal values (CMYK values) of the document image data and signal values (RGB values) of the read image data ("data on the correspondence relationship between the document image and the read image") is acquired.

[Procedure 3] The first color conversion unit 64 performs a process of converting the RGB values of the read image data into Lab values using a first color conversion table 68A ("first color conversion process"). The first color conversion table 68A is a color conversion table of the scanner profile 68 shown in FIG. 2, which regulates a correspondence relationship between signal values of read image data and chromaticity values (Lab values). That is, the first color conversion table 68A is a table that regulates a conversion relation of RGB→Lab in which input RGB signals are converted into output Lab values. The RGB values of the read image data are converted into chromaticity values in a device-independent color space by the first color conversion unit 64.

[Procedure 4] Data indicating a correspondence relationship between the document image signals (CMYK values) and the chromaticity values (Lab values) ("correspondence relationship data of the document image signals and the chromaticity values") is acquired through Procedure 2 and Procedure 3. A second color conversion table 92A is created by a second color conversion table creation unit 66A based on the "correspondence relationship data of the document image signals and the chromaticity values" ("second color conversion table creation process").

The second color conversion table creation unit 66A corresponds to the target profile creation unit 66 shown in FIG. 2. The second color conversion table creation unit 66A corresponds to a "color conversion table creation unit". A second color conversion table 92A created by the second color conversion table creation unit 66A (see FIG. 3) is a table that regulates a conversion relation of CMYK→Lab in which CMYK signals of document image data are converted into chromaticity values (Lab values). The second color conversion table 92A corresponds to a target profile indicating target colors, and may be used as a color conversion table of the target profile 92 to be applied to the second color conversion unit 80 shown in FIG. 2.

Modification Example

Figure 4:
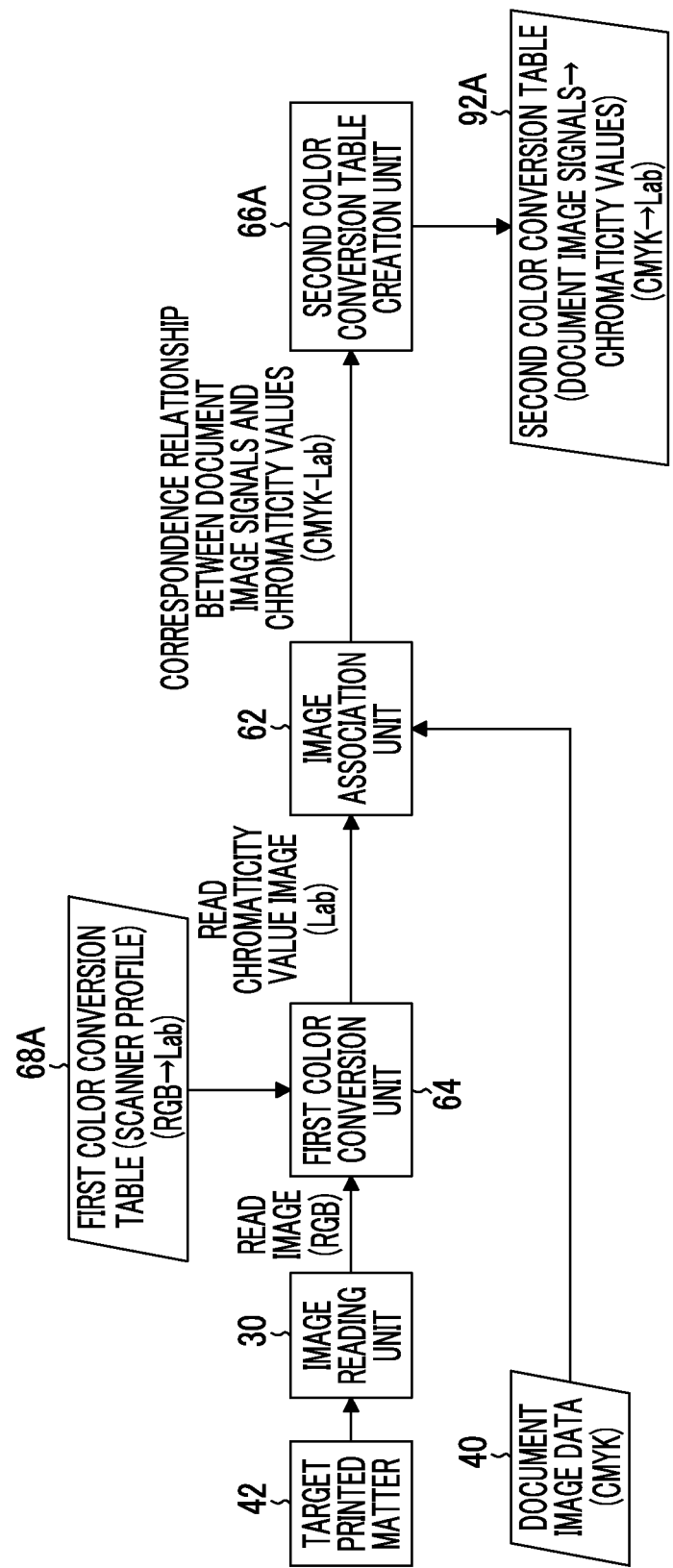
FIG. 4 is a block diagram showing a modification example of the first main configuration.

FIG. 4 is a modification example of the configuration shown in FIG. 3. In FIG. 4, the same reference numerals are given to the same or similar components as in the configuration shown in FIG. 3, and description thereof will not be repeated.

The configuration shown in FIG. 4 is a configuration in which processing procedures of the image association unit 62 and the first color conversion unit 64 are exchanged, compared with the configuration shown in FIG. 3. In the example of FIG. 4, a process of RGB→Lab conversion in the first color conversion unit 64 ("first color conversion processing process" and "read image color conversion process") is performed with respect to read image data of RGB acquired by the image reading unit 30, and then, an image association process for a Lab image (read chromaticity value image) of the acquired read image and the document image data 40 is performed. In the configuration shown in FIG. 4, the same effect as in the configuration shown in FIG. 3 can be performed.

As shown in FIG. 4, data after conversion obtained by performing the color conversion process in the first color conversion unit 64 with respect to the read image data acquired by the image reading unit 30 is referred to as "read chromaticity value image data". The read chromaticity value image data of the target printed matter 42 is referred to as "target printed matter read chromaticity value image data", and the read chromaticity value image data of the printed matter 50 is referred to as "printed matter read chromaticity value image data".

<Second Main Configuration>

Figure 5:
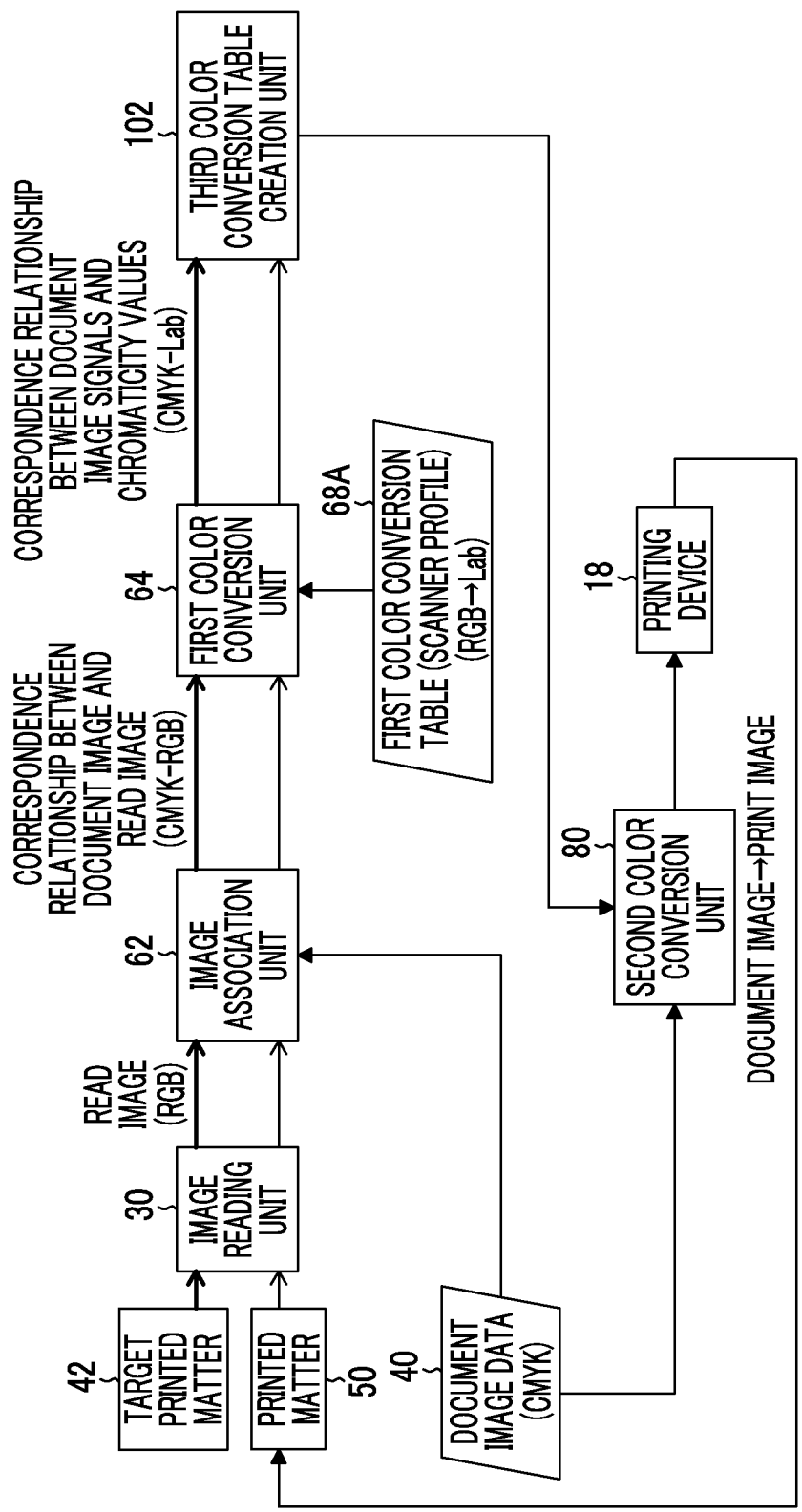
FIG. 5 is a block diagram showing a second main configuration.

FIG. 5 is a block diagram showing the second main configuration. In FIG. 5, the same reference numerals are given to the same or similar components as in the configuration described in FIG. 1 to FIG. 4, and description thereof will not be repeated. A "third color conversion table creation unit 102" in FIG. 5 is a processing unit corresponding to the differential chromaticity value calculation unit 84 and the second profile correction unit 82 shown in FIG. 2. The third color conversion table creation unit 102 corresponds to a "color conversion table creation unit that creates a color conversion table used in the second color conversion unit".

Although not shown, a configuration in which the processing procedures of the image association unit 62 and the first color conversion unit 64 shown in FIG. 5 are exchanged may be employed with respect to the second main configuration, similar to the first main configuration described in FIG. 3 and FIG. 4. With such a configuration, the same effect as in FIG. 5 can be achieved.

The processing procedure based on the second main configuration shown in FIG. 5 will be described with reference to a flowchart of FIG. 6. In the second main configuration shown in FIG. 5, first, an input color conversion table and an output color conversion table are set to the second color conversion unit 80 (step S110 in FIG. 6). The input color conversion table is the color conversion table of the target profile 92 shown in FIG. 2, and the output color conversion table is the color conversion table of the printer profile 94.

Figure 6:
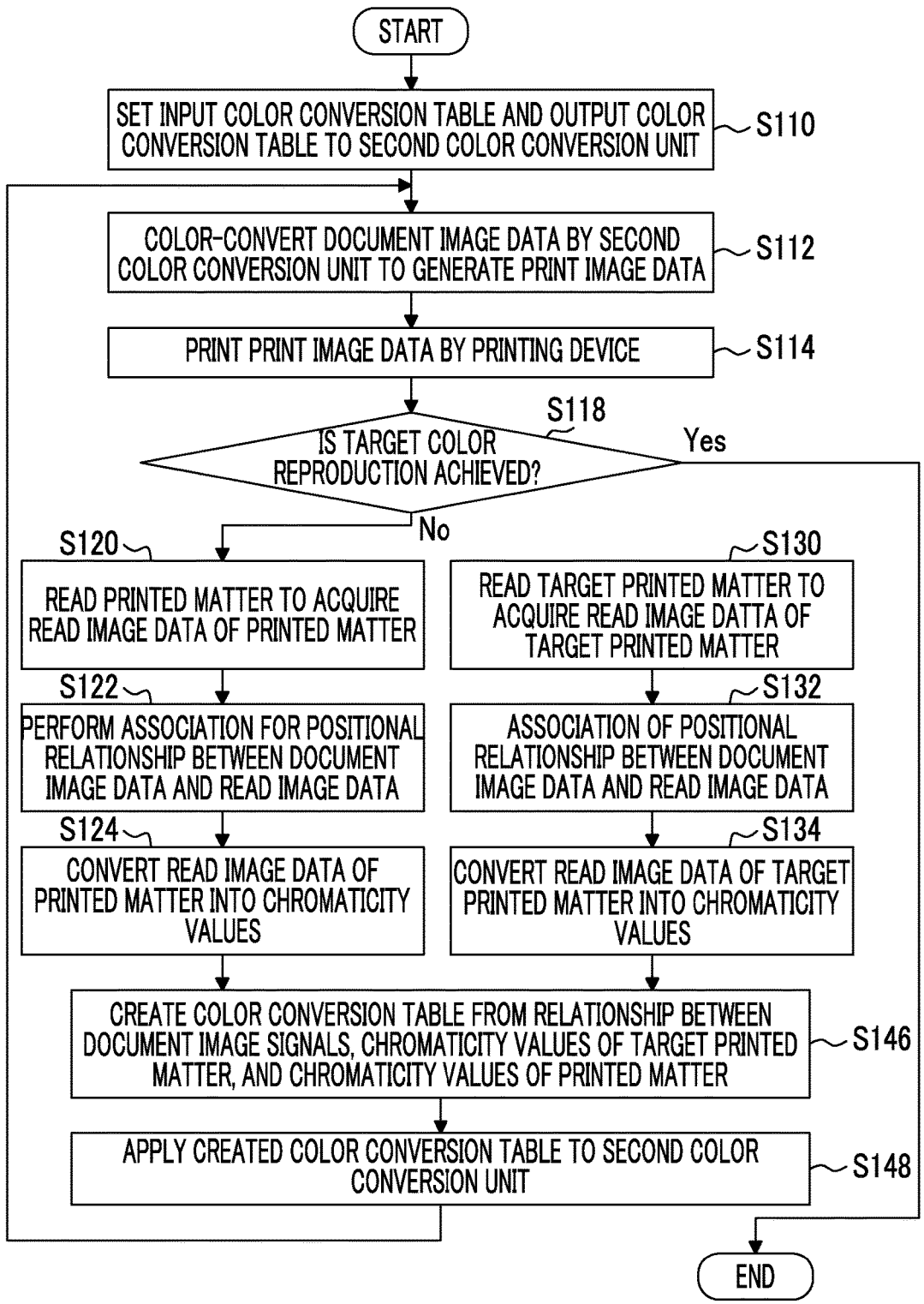
FIG. 6 is a flowchart showing a procedure of processes in the second main configuration.

The input color conversion table and the output color conversion table set in step S110 in FIG. 6 are color conversion tables given as an initial setting in the second color conversion unit 80. Here, it is preferable to use the "second color conversion table 92A" created by the first main configuration shown in FIG. 3 as the input color conversion table. Here, the input color conversion table is not limited to the second color conversion table 92A, and may employ an input color conversion table of a reference profile such as JAPAN COLOR (registered trademark) or a color conversion table that is previously created in the printing system 10. As the output color conversion table, a color conversion table regulated for each printing device 18 according to the kind of printing sheets to be used may be used.

After the input color conversion table and the output color conversion table are set to the second color conversion unit 80, the document image data 40 is color-converted by the second color conversion unit 80 using the color conversion tables to generate print image data suitable for input to the printing device 18 (step S112 in FIG. 6, corresponding to the "second color conversion process" and the "document image color conversion process").

In the case of this example, the document image data 40 of CMYK is converted into print image data of CMYK using the input color conversion table and the output color conversion table of the second color conversion unit 80.

The print image data generated by the second color conversion unit 80 is transmitted to the printing device 18, and then, printing is performed by the printing device 18 (step S114 in FIG. 6 and "printing process"). The printed matter 50 is obtained by the printing process (step S114).

The acquired printed matter 50 is compared with the target printed matter 42 to determine whether the printed matter 50 having desired color reproduction is obtained (step S118). As an example of a determination method in step S118, for example, the following two methods are used. That is, a first example of the determination method is a determination method based on comparison of the printed matter 50 and the target printed matter 42 using visual observation. A second example of the determination method is a quantitative determination method based on a difference of chromaticity values acquired by reading the printed matter 50 and the target printed matter 42 using the image reading unit 30.

As a specific example of the second example of the determination method, for example, a method for calculating an average color difference or a maximum color difference and determining, if the average color difference or the maximum color difference is equal to or smaller than a specific threshold value, that desired color reproduction is achieved may be used. Further, as another specific example, a method for calculating both of the average color difference and the maximum color difference and performing the determination based on a combination of the average color difference and the maximum color difference may be used. In this case, for example, in a case where the average color difference is equal to or smaller than a first threshold value and the maximum color difference is equal to or smaller than a second threshold value, it may be determined that desired color reproduction is achieved. Further, a method for defining an evaluation function for calculating a different evaluation value (index values) based on the combination of the average color difference and the maximum color difference and comparing the evaluation value calculated from the evaluation function with a threshold value regulated as a determination reference to determine whether desired color reproduction is achieved.

That is, in the second example of the determination method, the determination is performed based on a difference between chromaticity values acquired in step S124 and step S134 (which will be described later). By providing the calculation function and the determination function of performing such quantitative determination, it is possible to realize an automatic determination process.

Instead of the determination method (first example) based on the visual observation comparison or in combination therewith, the quantitative determination method (second example) based on the difference between the chromaticity values may be employed.

In the determination of step S118, if the printed matter 50 having the same color reproduction as in the target printed matter 42 is obtained, the determination in step S118 becomes "YES", and the color matching process may be terminated.

On the other hand, in the determination of step S118, in a case where the printed matter 50 of the target color is not obtained, the determination in step S118 becomes "NO", and the procedure proceeds to step S120 in FIG. 6. Then the printed matter 50 is read by the image reading unit 30 to acquire read image data of the printed matter 50 (step S120 in FIG. 6). Step S120 corresponds to a "printed matter image reading process" or a "printed matter read image data acquisition process".

In this example, an RGB image is acquired as the read image data, and the acquired read image data is transmitted to the image association unit 62. The image association unit 62 performs an image association process of performing association for a positional relationship between the read image data (referred to as "printed matter read image data") of the printed matter 50 and the document image data 40 (step S122 in FIG. 6, "image association process"). The process of importing the document image data 40 (document image data acquisition process) may be executed before or after the printed matter read image data acquisition process. Here, in a case where the document image data 40 is imported the system by the first main configuration shown in FIG. 3, it is not necessary to import the document image data 40 again, and it is sufficient that the document image data 40 is read from the image data storage unit 22 (see FIG. 1).

In the image association unit 62, a correspondence relationship between pixel positions of the document image and pixel positions of the read image is specified, and data indicating a correspondence relationship between signal values (CMYK values) of the document image data and signal values (RGB values) of the printed matter read image data corresponding thereto is acquired.

With respect to the printed matter read image data subjected to the image association process in the image association unit 62, the first color conversion unit 64 performs a process of converting the RGB values into Lab values using the first color conversion table 68A (Step S124 in FIG. 6, "first color conversion process", and "read image color conversion process"). Thus, chromaticity values (Lab values) of the printed mattered read image data are acquired.

Similar to the processes of steps S120 to S124 with respect to the printed matter 50, read image data is acquired with respect to the target printed matter 42 (step S130), association between the document image data and the read image data is performed (step S132), and color conversion to chromaticity values (step S134) is performed.

That is, reading using the image reading unit 30 is performed with respect to the target printed matter 42 to acquire the read image data of the target printed matter 42 (step S130 in FIG. 6). Step S130 corresponds to a "target printed matter image reading process" or a "target printed matter read image data acquisition process". The acquired read image data of the target printed matter 42 (referred to as "target printed matter read image data) is transmitted to the image association unit 62. The image association unit 62 performs an image association process of performing association for a positional relationship between the target printed matter read image data and the document image data 40 (step S132 in FIG. 6).

In the image association unit 62, a correspondence relationship between pixel positions of the document image and pixel positions of the read image is specified, and data indicating a correspondence relationship between signal values (CMYK values) of the document image data and signal values (RGB values) of the target printed matter read image data corresponding thereto is acquired.

With respect to the target printed matter read image data subjected to the image association process in the image association unit 62, the first color conversion unit 64 performs a process of converting the RGB values to Lab values using the first color conversion table 68A (step S134 in FIG. 6, "first color conversion process", "read image color conversion process"). Thus, chromaticity values (Lab values) of the target printed matter read image data is acquired.

The processes of steps S130 to S134 may be performed before the processes of steps S120 to S124, or may be performed in parallel with the processes of steps S120 to S124. Further, in a case where the creation of the "second color conversion table 92A" is terminated in the procedures 1 to 4 of the first main configuration described in FIG. 3, since information about the chromaticity values of the target printed matter read image data is already achieved, the processes of steps S130 to S134 may not be repeated.

Thus, the information the about chromaticity values of the target printed matter read image data corresponding to the document image data 40 (that is, chromaticity values of the target printed matter 42), and the information about the chromaticity values of the printed matter read image data (that is, chromaticity values of the printed matter 50) are acquired. Further, a process of creating a color conversion table, based on a difference between the chromaticity values of the target printed matter 42 and the chromaticity values of the printed matter 50, from a relationship between the document image signals, the chromaticity values of the target printed matter 42, and the chromaticity values of the printed matter 50 (step S146 in FIG. 6).

A processing unit that performs the creation of the color conversion table in step S146 corresponds to the "third color conversion table creation unit 102" in FIG. 5. The color conversion table created by the third color conversion table creation unit 102 is used in the second color conversion unit 80, and the third color conversion table creation unit 102 creates any one of the input color conversion table, the output color conversion table, and the color correction table of the color correction profile 96 (see FIG. 2) to be used in the second color conversion unit 80.

Thus, the color conversion table created by the third color conversion table creation unit 102 is applied to the second color conversion unit 80 (step S148 in FIG. 6). Then, the procedure returns to step S112, and the process of step S112 and the subsequent processes are repeated. When the processes are repeated, the processes of steps S130 to S134 relating to the reading of the target printed matter 42 are not necessary.

According to the second main configuration described in FIG. 5 and FIG. 6, it is possible to improve a color conversion table to be applied to the second color conversion unit 80 so as to become an appropriate table, and to further improve the accuracy of color conversion.

<Description of Respective Units>

Next, the functions of the respective units in the first main configuration (FIG. 3 and FIG. 4) and the second main configuration (FIG. 5) will be described in detail.

[Image Reading Unit 30]

In the first main configuration shown in FIG. 3 and FIG. 4, the image reading unit 30 reads only the target printed matter 42 without reading the printed matter 50. That is, in the first main configuration, a target profile is created from only the read results of the document image data 40 and the target printed matter 42 without printing of the printed matter 50.

On the other hand, in the second main configuration shown in FIG. 5, two kinds of printed matters of the target printed matter 42 and the printed matter 50 printed by the printing device 18 are read by the image reading unit 30. That is, in the second main configuration, the document image data 40 is printed by the printing device 18, the acquired printed matter 50 is read, the given target printed matter 42 is read, and the color conversion table of the second color conversion unit 80 is corrected so that a difference between the read results decreases.

[Image Association Unit 62]

The image association unit 62 performs association of image positions (that is, pixel positions) of read image data obtained by reading the document image data 40 and the printed matter (target printed matter 42 or the printed matter 50).

The read image data corresponds to any one of an RGB image acquired by the image reading unit 30 or a chromaticity value image (Lab image) acquired by color-converting the RGB images by the first color conversion unit 64. The read image data in the case of the configuration shown in FIG. 3 corresponds to an RGB image, and the read image data in the case of the configuration shown in FIG. 4 corresponds to a chromaticity value image (Lab image).

The association (positioning) process for the image positions of the document image data 40 and the read image data may be performed using a known image positioning method. For example, as the image positioning method, a technique disclosed in paragraphs [0064] to in JP2013-30996A may be used.

Figure 7:
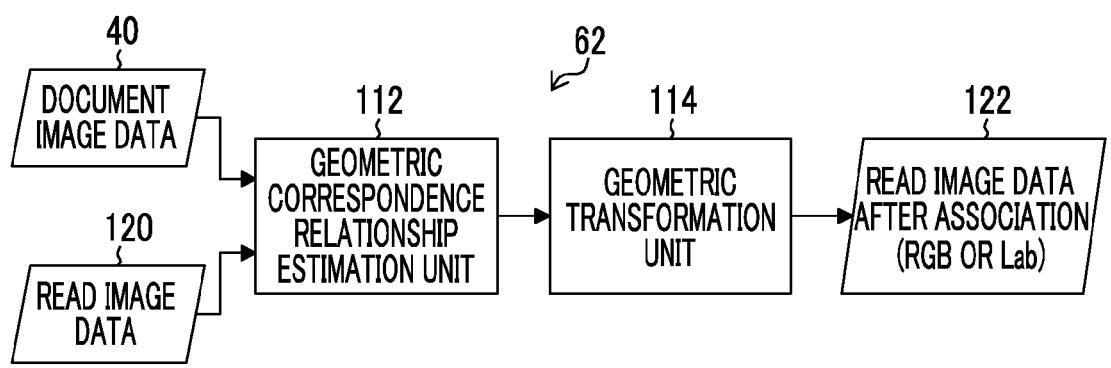
FIG. 7 is a block diagram showing a specific example of an image positioning process in an image association unit.

FIG. 7 is a block diagram showing a specific example of the image positioning process in the image association unit 62. The image association unit 62 comprises a geometric correspondence relationship estimation unit 112 and a geometric transformation unit 114. The geometric correspondence relationship estimation unit 112 imports the document image data 40 and read image data 120, and estimates a geometric correspondence relationship between these two images. The geometric correspondence relationship includes at least one of an image displacement amount, a rotational angle, or a variable magnification between two images to be compared with each other.

The geometric transformation unit 114 performs, with respect to any one of two images or both of two images, a geometric transformation process of matching both of two images based on the geometric correspondence relationship estimated by the geometric correspondence relationship estimation unit 112. For example, a configuration in which geometric transformation is performed with respect to read image data and is not performed with respect to the document image data 40 may be used. Further, as an example of the geometric transformation, affine transformation may be applied.

In order to estimate the geometric correspondence relationship between two images, for example, (a) a method using a marker, (b) a method using pattern matching, (c) a method using a phase only correlation method, or the like may be used. Hereinafter, these methods will be described with reference to disclosure in JP2013-30996A.

(a) Method Using a Marker

In a printing field, a printed matter in which a marker indicating a reference position, which is called a "crop mark", is disposed at four corners of a document image or at the center of each side of the document image is output. When reading the printed matter with such a marker, by estimating a position deviation amount of the marker, it is possible to calculate an image displacement amount, a rotational angle, and a magnification between images.

For example, four or six crop marks (markers) are formed on one printed matter. By comparing a position deviation between a marker on document image data and a marker on read image data of the printed matter, it is possible to calculate geometric transformation parameters.

By calculating a correspondence relationship between a point indicating a position of a feature point of the marker in the document image data and a point indicating a position of a feature point of the marker in the read image data, it is possible to obtain geometric transformation parameters. Here, a technique of matching two point patterns by performing, for example, affine transformation with respect to one image of two images is known. Accordingly, in order to calculate the geometric transformation parameters, it is sufficient to find optimal affine parameters in which respective positions of two point patterns are closest to each other. For example, an evaluation function of affine parameters for affine-transforming the feature point of the marker in the read image data into the feature point of the marker in the document image data is determined, and the affine parameters when the evaluation function becomes minimum are set as the geometric transformation parameters.

(b) Method Using Pattern Matching

As an example of a method of estimating only a displacement amount, a template matching method may be used. In the template matching method, one image is used as a template, a matching rate between one image and the other image is calculated while deviating positions little by little, and a position where a matching rate is highest is detected. In a case where the geometric transformation cannot be defined only by the displacement amount, it is necessary to use a combination of the method of estimating the display amount and a method of estimating a rotational angle (Hough transform or the like) or a method of estimating a magnification (multi-scale analysis or the like).

In a block matching method which is an application of the template matching, one image may be divided into blocks, and a position where a matching rate with respect to the other image is highest may be detected for each block to calculate a displacement amount. In the block matching method, it is also possible to estimate a rotational angle or a magnification from the displacement amount for each block.

(c) Method Using Phase Only Correlation

As an example of a method of calculating a displacement amount, a rotational angle or a magnification with high accuracy, phase only correlation (POC) or rotation invariant phase only correlation (RIPOC) is used. The phase only correlation is a method of using phase images acquired through discrete Fourier transform with respect to images and detecting a position where correlation between two phase images acquired from two images which are comparison targets is highest to calculate a displacement amount. Further, the rotation invariant phase only correlation is a method of performing log polar coordinates transformation with respect to the phase images to detect a rotational angle and a magnification as a displacement amount on the transformed phase images.

After calculating the geometric transformation parameters using the above-described methods (a) to (c) or the like, the geometric transformation unit 114 executes geometric transformation with respect to the read image data 120 (or the document image data 40). In transformation, in a case where there is not a one-to-one correspondence in pixels before and after transformation due to movement or any rotation in the accuracy of sub-pixels, a magnification in actual values, or the like in transformation, pixel values may be derived using an appropriate pixel interpolation method. As an example of the pixel interpolation method, a bi-linear method, a bi-cubic method, or the like may be used.

Thus, the association of a positional relationship with the document image data 40 is determined, and the read image data 122 after association is obtained. The read image data 122 after association is transmitted to the first color conversion unit 64 (see FIG. 2 to FIG. 5).

[Preprocessing for Image Association (Positioning)]

In a case where a resolution of the document image data 40 and a resolution of the read image data 120 are different from each other, it is preferable to perform a resolution conversion process of matching the resolution of the document image data 40 with the read image data 120 using the image association unit 62. The image association unit 62 is configured to include a resolution conversion unit (not shown) for performing the resolution conversion process.

Further, for example, in a case where a color space of the document image data 40 and a color space of the read image data 120 are different from each other, such as in a case where the document image data 40 corresponds to CMYK images and the read image data 120 corresponds to RGB images, before the image positioning (association) in the image association unit 62 is performed, it is preferable to perform grayscale conversion with respect to both of the document image data 40 and the read image data 120 to perform conversion into the same color space.

The grayscale conversion may be realized by converting the read image data 120 into Lab values by the scanner profile 68 (see FIG. 2) and forming a monochromic image by extracting only the L value (brightness). With respect to the document image data 40, a color profile of the target printed matter 42 is not present at a time point when a target profile is created by the first main configuration (see FIG. 3 and FIG. 4), but for example, a representative profile such as JAPAN COLOR (registered trademark) may be used.

Further, even though both of the document image data 40 and the read image data 120 are grayscale-converted, since it is considered that pixel values (density values) are different from each other, an edge extraction process may be further performed with respect to the grayscale images to convert the grayscale images into binary edge images, and then, the positioning may be performed. The edge extraction process may employ a known Sobel method, a Prewitt method, or the like.

Further, since it may be considered that edge thicknesses of two edge images are different from each other, a thinning process may be performed with respect to the respective edge images so that the edge thicknesses are adjusted, and then, the positioning may be performed. The thinning process may use a known Hilditch method, a Tamura method, or the like.

In this way, in a case where the image color spaces for the document image data 40 and the read image data are different from each other, it is preferable to perform preprocessing for the positioning in order to easily estimate a geometric correspondence relationship between images. Even in a case where the color spaces for the document image data 40 and the read image data are the same, the preprocessing may be performed.

Further, a case where the target printed matter 42 is an actual object (actually generated printed matter) which is a printed matter printed by a printing device other than the printing device 18 and there is not a one-to-one correspondence in the target printed matter 42 and the document image data 40 may be considered. For example, as a case where there is not a one-to-one correspondence in the target printed matter 42 and the document image data 40, the following examples may be considered.

Example 1

A case where the target printed matter 42 is a printed matter in which plural pieces of identical document image data 40 are arranged on the same printing surface.

Example 2

A case where the target printed matter 42 is a printed matter in which the document image data 40 and image data which is not a color matching target (image data different from the document image data 40) are arranged on the same printing surface. Arrangement of plural pieces of different image data on the same printing surface is referred to as "different pagination", "ganging", or the like.

Example 3

A case where the document image data 40 forms a part of the target printed matter 42 (a part of a design or layout thereof).

As illustrated in Example <1> to Example <3>, in a case where there is not a one-to-one correspondence in the target printed matter 42 and the document image data 40, it is useful to perform a partial image extraction process of extracting a partial image corresponding to the document image data 40 which is an attention target from the read image of the target printed image 42.

Here, as another specific example of <Example 1>, a case where the target printed matter 42 is a printed matter in which plural pieces of identical document image data 40 are arranged (paged) on the same printing surface in a nesting form will be described.

Figure 8A:
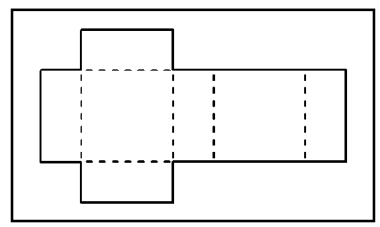
FIG. 8A shows an example of document image data.
Figure 8B:
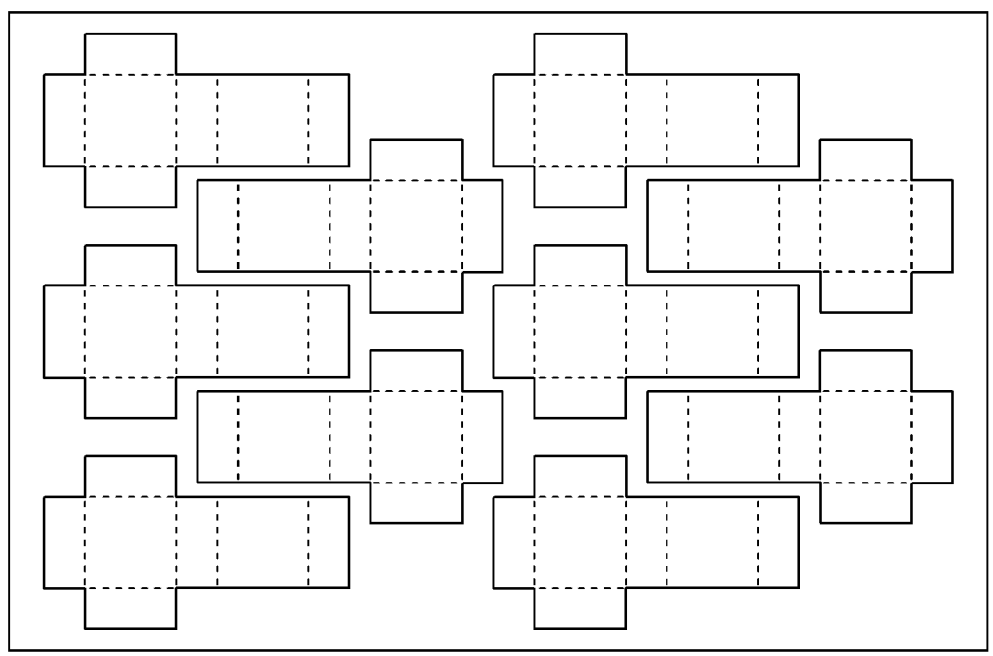
FIG. 8B shows an example of a target printed matter.

FIG. 8 shows such an example. FIG. 8A shows an example of document image data, and FIG. 8B shows an example of a target printed matter. The target printed matter shown in FIG. 8B is a printed matter in which plural pieces of document image data shown in FIG. 8A are arranged on the printing surface in the nesting form (pagination).

In such a case, it is preferable to extract a partial image corresponding to the document image data from the read image data before the positioning in the image association unit 62 without using the read image data of the target printed matter as it is.

As a method of the partial image extraction process, a method of specifying a partial image corresponding to a document image using known pattern matching for automatic extraction, a method of displaying a read image on the display unit 34 which is a monitor to cause a user to manually designate a range of the partial image corresponding to the document image, or the like may be used.

The partial image extraction process is not limited to the case of <Example 1>, and in the case of <Example 2> or <Example 3>, similarly, it is useful to perform the partial image extraction process.

The partial image extraction process is not necessary in a case where there is not a one-to-one correspondence in the document image data 40 and the target printed matter 42, such as a case where color samples corresponding to one document image are provided from a client.

Figure 9:
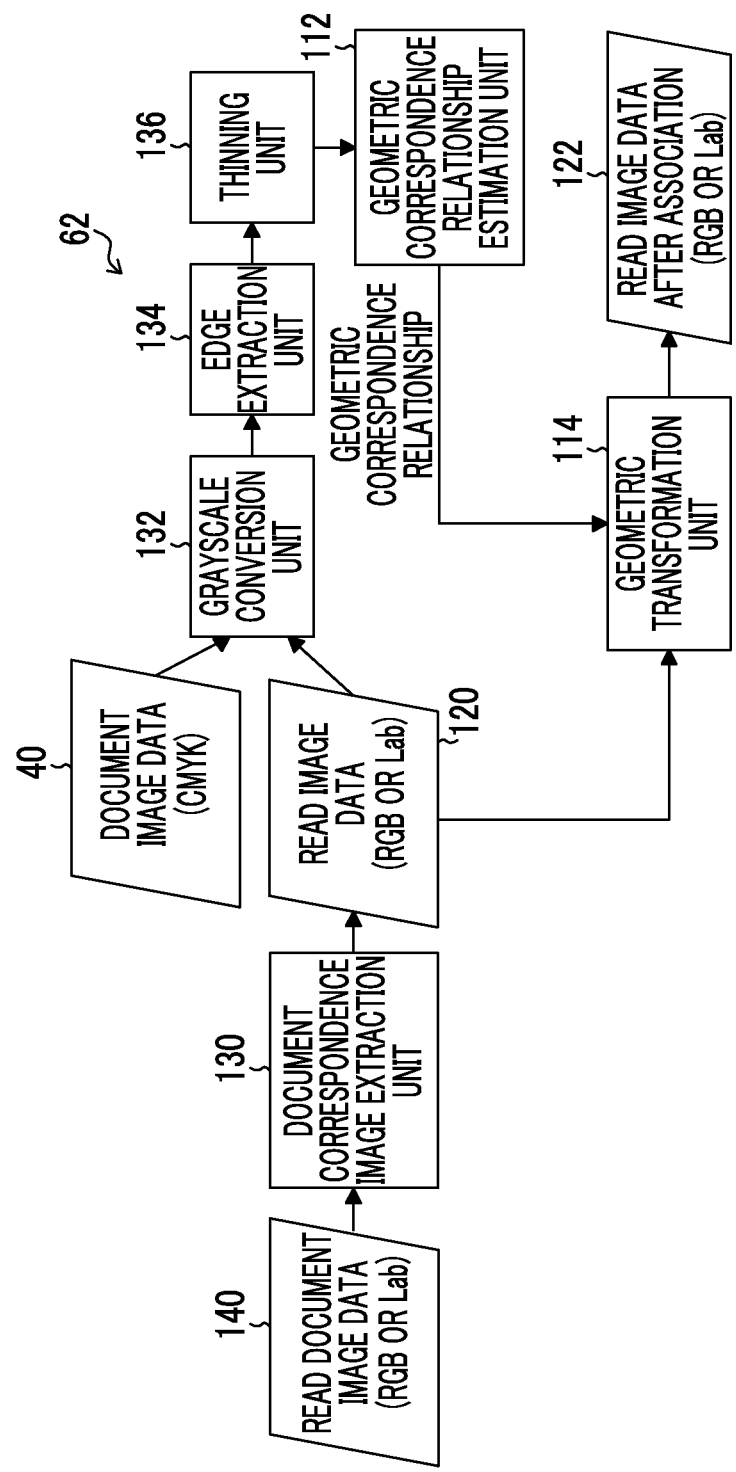
FIG. 9 is a block diagram showing a configuration in which an image association process including preprocessing is performed.

FIG. 9 is a block diagram showing a configuration in which an image association process including the above-described preprocessing is performed. The image association unit 62 shown in FIG. 9 comprises a document correspondence image extraction unit 130 (corresponding to an "image extraction unit"), a grayscale conversion unit 132, an edge extraction unit 134, a thinning unit 136, a geometric correspondence relationship estimation unit 112, and a geometric transformation unit 114.

The document correspondence image extraction unit 130 performs a process of extracting a partial image corresponding to the document image data 40 from a read document image data 140 obtained by reading the target printed matter 42 in which plural images are arranged to be paged as shown in FIG. 8B. The read document image data 140 is data of read images generated by reading the entirety of a printing surface of a printed matter as shown in FIG. 8B. The read document image data 140 may be an RGB image or a Lab image.

Data of the partial image extracted by the document correspondence image extraction unit 130 corresponds to the read image data 120 to be compared with the document image data 40.

The grayscale conversion unit 132 performs a process of grayscale-converting the document image data 40 and the read image data 120, respectively. The edge extraction unit 134 performs an edge extraction process from grayscale images. The thinning unit 136 performs a thinning process with respect to edge images generated by the edge extraction unit 134.

The edge images thinned by the thinning unit 136 are input to the geometric correspondence relationship estimation unit 112, and a geometric correspondence relationship of the document image data 40 and the read image data 120 is specified by the geometric correspondence relationship estimation unit 112. The geometric transformation process with respect to the read image data 120 is performed by the geometric transformation unit 114 using the calculated geometric correspondence relationship, and the read image data 122 after association is obtained.

The association processing function in the image association unit 62 corresponds to an "image association function". In a case where there is a one-to-one correspondence in print images of the document image data 40 and target printed matter 42, the read image data 140 shown in FIG. 9 is handled as the read image data 120 as it is.

[First Color Conversion Unit 64]

The first color conversion unit 64 performs a process of converting data of a read image (for example, an RGB image) acquired by the image reading unit 30 into data in a device-independent color space. As described in FIG. 2, in this example, the first color conversion unit 64 converts read image signal values (RGB) of the image reading unit 30 into chromaticity values (Lab) in a device-independent color space using a conversion table which is an RGB→Lab conversion table which is a color conversion table (corresponding to the "first color conversion table") of the scanner profile 68 which is prepared in advance.

Here, in a case where plural same image signal values are present in document image data, chromaticity values of a correspondence read image may vary due to noise of the image reading unit 30, contaminants attached to a printed matter, stain of the printed matter, or the like. Accordingly, in order to reduce the influence of the noise or the like, it is preferable to average the chromaticity values of the read image corresponding to the same document image signal values.

[Target Profile Creation Unit 66 (Second Color Conversion Table Creation Unit 66A)]

Through the respective processes in the image reading unit 30, the image association unit 62, and the first color conversion unit 64, data indicating a correspondence relationship between image signal values (in this example, CMYK values) of respective pixels in the document image data 40 and chromaticity values (in this example, Lab values) of respective pixels in read image data of the target printed matter 42 is obtained. The target profile creation unit 66 (see FIG. 2), that is, the second color conversion table creation unit 66A (see FIG. 3) creates a color conversion table that regulates a conversion relation (CMYK→Lab) in which image signals (CMYK) are converted into chromaticity values (Lab) based on the "correspondence relationship data of the document image signals and the chromaticity values".

In the case of a printing system in the related art, when creating such a color conversion table, generally, a correspondence relationship between image signal values which are regularly arranged in the entire color space and chromaticity values is calculated using a color chart, and interpolation is performed by a predetermined interpolation method to create a color conversion table from the correspondence relationship.

On the other hand, in this embodiment, the creation of the color conversion table is performed based on the target printed matter 42 which is a reproduction target of an actual object and the document image data 40 thereof, it is not necessary to create a color conversion table from a correspondence relationship between image signal values with partial and irregular arrangement in a color space and chromaticity values. Accordingly, the general interpolation method in the related art cannot be used. Thus, the following methods are used.

Embodiment 1

Figures 10, 11:
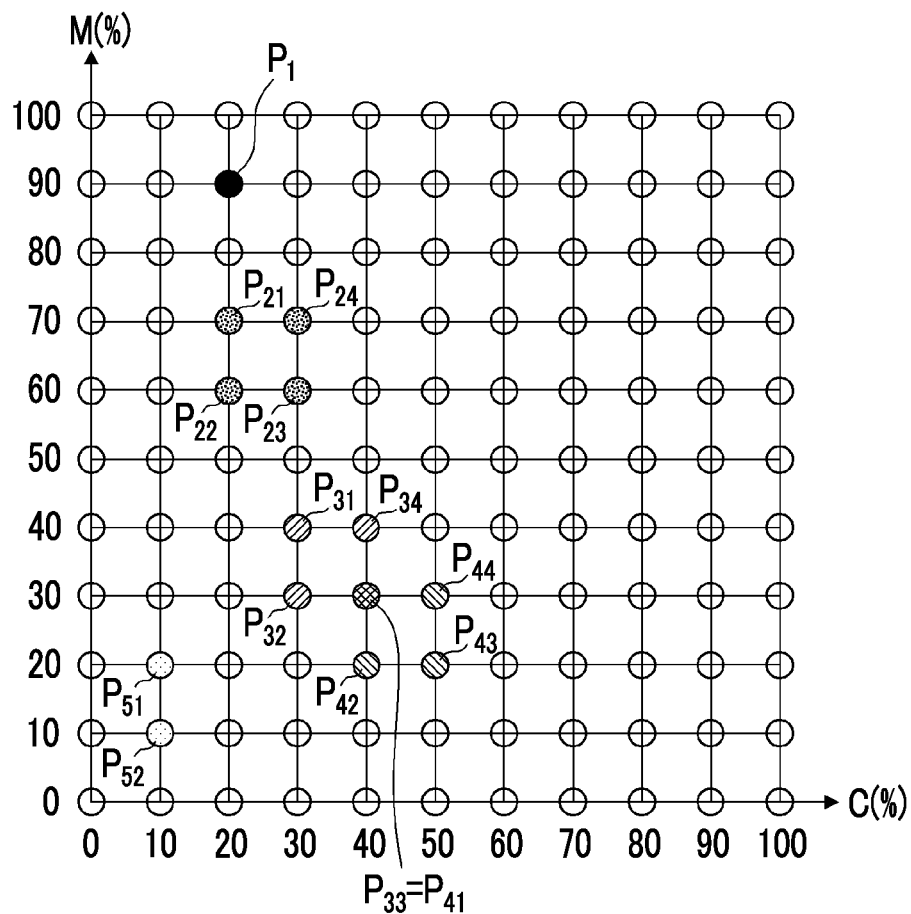
FIG. 10 is a table showing an example of data of a correspondence between document image signals and chromaticity values.
FIG. 11 is a diagram showing lattice points in a color space (here, a CM surface) of document image data corresponding to an input side of a color conversion table.

Method of Directly Associating Correspondence Relationship Data of Document Image Signals and Chromaticity Values with Respect to Color Conversion Table A method of directly associating correspondence relationship data of document image signals and chromaticity values with respect to lattice points in a color space of a color conversion table will be described with reference to an example of FIG. 10 and FIG. 11. Here, for ease of description, the concept of a color conversion table of two colors of C and M is shown. FIG. 10 shows an example of correspondence relationship data of document image signals (CM) and chromaticity values (Lab). FIG. 11 shows lattice points in a color space (here, a CM surface) of document image data corresponding to an input side of a color conversion table.

In FIG. 11, a range (variable range or value area) where a signal value can be taken is represented from 0% to 100% with respect to each of an axis C and an axis M, and lattice points are set at a pitch of 10% for each axis. In realization of the invention, the signal pitch width on each axis that regulates lattice points is not limited to 10%. Further, when 8-bit integer values (0 to 255) which are signal values of image signals are used, a signal value "0" is represented as 0%, and a signal value "255" is represented as 100%, and thus, values between 0 to 255 may be associated with values on each axis according to a linear equation.

It is assumed that the lattice points with the pitch of 10% shown in FIG. 11 represent lattice points of document image signals on the input side in the color conversion table. Further, it is assumed that a configuration in which corresponding Lab values are allocated to the respective lattice points corresponds to a color conversion table.

"ID" in FIG. 10 represents an identification code that specifies colors (CM values) used in the document image data. A C value and an M value represent signal values in a range of 0 to 100%, respectively. Lab values include values of respective components of an L value, an a value, and a b value.

The CM values of ID=1 are (C, M)=(20, 90), and Lab values corresponding to the CM values are (L, a, b)=(50, 60, −13).

A color of ID=2 corresponds to (C, M)=(24, 66), and Lab values corresponding to the CM value color of ID=2 are (L, a, b)=(60, 36, −17).

In creation of a color conversion table, corresponding chromaticity values (Lab values) are set with respect to a lattice point of a color conversion table corresponding to document image signal values (CM values) for each ID shown in FIG. 11.

The CM values of ID=1 correspond to a color corresponding to a lattice point P1 in FIG. 11. Corresponding Lab values (50, 60, −13) are set with respect to the lattice point $P_1$ corresponding to ID=1.

With respect to ID=2 to 5, since there is no directly corresponding lattice point, chromaticity values are set with respect to adjacent lattice points. As shown in FIG. 11, chromaticity values are set with respect to four lattice points that surround document image signal values with respect to ID=2, 3, and 4.

With respect to ID=2, the same Lab values (60, 36, −17) are set with respect to four lattice points $P_{21}$, $P_{22}$, $P_{23}$, and $P_{24}$ that surround (C, M)=(24, 66), respectively. Similarly, with respect to ID=3 and ID=4, chromaticity values are set with respect to four lattice points that surround document image signal values. Here, as in ID=3 and ID=4, in a case where four lattice points that surround respective document image signal values partially overlap each other so that candidates of different chromaticity values are present with respect to the same lattice point, the chromaticity values of the candidates are averaged to be set.

That is, four lattice points that surround (C, M)=(35, 35) of ID=3 are $P_{31}$, $P_{32}$, $P_{33}$, and $P_{34}$, and four lattice points that surround (C, M)=(47, 23) of ID=4 are $P_{41}$ (=$P_{33}$), $P_{42}$, $P_{43}$, and $P_{44}$. Since candidates (71, 9, −20) of chromaticity values of ID=3 and candidates (72, −4, −26) of chromaticity values of ID=4 are present with respect to the lattice point ($P_{33}$=$P_{41}$) indicated by (C, M)=(40, 30), average values (71.5, 2.5, −23) of Lab values of ID=3 and ID=4 are allocated.

Lab values (71, 9, −20) of ID=3 are set with respect to other lattice points $P_{31}$, $P_{32}$, and $P_{34}$. Further, Lab values (72, −4, −26) of ID=4 are set with respect to $P_{42}$, $P_{43}$, and $P_{44}$.

Since the C value is "10%" with respect to ID=5, instead of the "four lattice points that surround", "two lattice points" $P_{51}$, and $P_{52}$ are used, and corresponding Lab values (89, 6, 8) are set with respect to these lattice points $P_{51}$, and $P_{52}$.

Since lattice points irrelevant to the document image signal values, among the entire lattice points in the color conversion table, are not used for color conversion of the document image data 40, appropriate values are set. With respect to lattice points indicated by white circles in FIG. 11, for example, arbitrary values such as Lab=(100, 0, 0) may be set.

In FIG. 10 and FIG. 11, for ease of description, a color conversion table of two colors of C and M is described, but even in a color conversion table of three or more colors, similarly, chromaticity values may be set with respect to lattice points.

In the case of two colors, maximum four lattice points that surround arbitrary CM values are present, but in the case of three colors, maximum eight lattice points are present, and in the case of four colors, maximum sixteen lattice points are present.

Further, in FIG. 10 and FIG. 11, with respect to ID=1, Lab values (chromaticity values) are directly associated with lattice points to which CM values correspond, but there is a possibility that a slightly deviated point is referenced due to an operation error or the like so that an interpolation operation with reference to chromaticity values of adjacent lattice points is performed. Thus, it is preferable to set the same chromaticity values to peripheral adjacent lattice points in addition to the directly corresponding lattice points.

There is no disadvantage in that the document image data 40 is color-converted using a color conversion table created by the method described in Embodiment 1 to perform printing by the printing device 18.

However, if an operator adjusts (corrects) document image data for color adjustment with reference to a result obtained by performing printing using the color conversion table created by the method of Embodiment 1, a disadvantage may occur. That is, in a case where the operator adjusts the document image data 40, for example, a desired color change may not occur, or color variation different from a color variation direction intended by the operator may occur, which causes difficulties in color adjustment with respect to the document image data.

In order to reduce the above-described disadvantage that occurs when the document image data is adjusted, it is preferable that the entirety of a color space (including a color portion which does not directly relate to document image data) is set to have corresponding chromaticity values (color close to a color desired by the operator) and smoothness in color variation is secured. In order to secure such smooth continuity in the entirety of the color space, it is preferable to use methods such as Embodiments 2, 3, and 4 which will be described hereinafter.

Embodiment 2

Method of Correcting Temporary Color Conversion Table Using Correspondence Relationship Data of Document Image Signals and Chromaticity Values In Embodiment 2, a "temporary color conversion table" in which smoothness in corresponding color variation is secured in the entirety of a color space is prepared in advance, and the temporary color conversion table is locally (partially) corrected using correspondence relationship data of document image signals and chromaticity values.

Here, the "temporary color conversion table" may employ any one of color conversion tables indicating standard color reproduction in offset printing such as JAPAN COLOR (registered trademark), SWOP, GRACOL, or FOGRA in the case of input of CMYK, and may employ any one of color conversion tables such as sRGB or AdobeRGB in the case of input of RGB.

Further, the above-described standard color conversion table and the color conversion table previously created by the method of Embodiment 2 may be stored in a database, a color conversion table which is closest to correspondence relationship data of a current read image of the target printed matter 42, document image signals which are newly acquired from the document image data 40, and chromaticity values may be selected from the database, and the selected color conversion table may be used as the "temporary color conversion table". The standard color conversion table or the previously created color conversion table corresponds to an "existing color conversion table".

When selecting the color conversion table which is closest to the "correspondence relationship data of the document image signals and the chromaticity values", a color conversion table in which an average value of color differences with respect to the correspondence relationship data of the document image signals and the chromaticity values is smallest, a color conversion table in which a maximum value of color differences with respect to the correspondence relationship data of the document image signals and the chromaticity values is smallest, or the like may be automatically extracted from the database, and may be set as the "temporary color conversion table". In a case where plural candidates with respect to the "temporary color conversion table" are extracted by the automatic extraction, a configuration in which the candidates are displayed on the display unit 34 and a user selects one of the candidates may be used.

With respect to the "temporary color conversion table", setting of chromaticity values with respect to the lattice points described in "Embodiment 1" is executed. That is, with respect to the lattice points $P_1$, $P_{21}$ to $P_{24}$, $P_{31}$ to $P_{34}$, $P_{41}$ to $P_{44}$, and $P_{51}$ to $P_{52}$ (see FIG. 11) corresponding to ID=1 to 5 described in FIG. 10, chromaticity values are set in a similar way to Embodiment 1, and the temporary color conversion table is corrected so that chromaticity values with respect to the lattice points indicated by white circles in FIG. 11 maintain the values of the "temporary color conversion table" as they are.

In the color conversion table obtained after correction in this way, the chromaticity values of the lattice points are locally replaced with respect to the temporary color conversion table, it is expected that the continuity (smoothness) of chromaticity values deteriorates between lattice points of which chromaticity values are replaced and lattice points of which chromaticity values are not replaced. Thus, it is preferable to perform a smoothing treatment with respect to the color conversion table after correction to secure smoothness in conversion of chromaticity values.

Embodiment 3

Method Using Color Reproduction Model

As a color reproduction model, for example, a Neugebauer model may be used. The Neugebauer model is a model that chromaticity values of combination colors of 0% and 100% of respective coloring materials (primary colors) are added up according to an area ratio of each coloring material to calculate chromaticity values of reproduction colors based on arbitrary combinations of the area ratios of the respective coloring materials. In the Neugebauer model, generally, XYZ values are used as the "chromaticity values".

Figure 12:
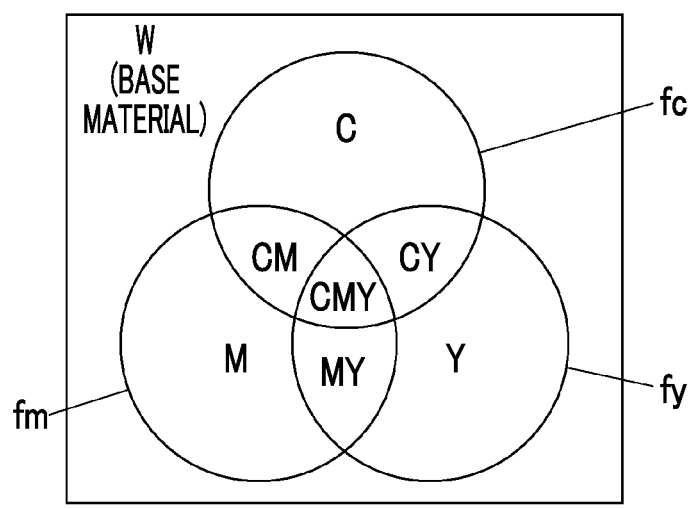
FIG. 12 is a diagram showing a chromaticity value calculation method based on a Neugebauer model.

Here, the color reproduction model will be described using an example of three coloring materials of CMY with reference to FIG. 12. When CMY area ratios of prediction target colors are (fc, fm, fy), area ratios Fi (i=w, c, m, y, cm, my, yc, cmy) of combinations of 0% and 100% of the respective coloring materials may be calculated as follows. A symbol "·" in equations represents multiplication.

$Fw=(1-fc)\cdot(1-fm)\cdot(1-fy)$ $Fc=fc\cdot(1-fm)\cdot(1-fy)$ $Fm=(1-fc)\cdot(1-fm)\cdot fy$ $Fcm=fc\cdot fm\cdot(1-fy)$ $Fmy=(1-fc)\cdot fm\cdot fy$ $Fyc=fc\cdot(1-fm)\cdot fy$ $Fcmy=fc\cdot fm\cdot fy$ Here, "w" represents a base material (print base material) of a printed matter such as a printing sheet. The area ratio represents a coverage factor per unit area on a print base material. Here, the area ratio is expressed as a value of 0 or greater and 1 or smaller. fc, fm, and fy are values detected as signal values (image signal values) of image data.

If a chromaticity value (for example, X of XYZ values) of combinations of 0% and 100% of respective coloring materials is Xpi (i=w, c, m, y, cm, my, yc, cmy), the chromaticity value X with respect to the CMY area ratios (fc, fm, fy) may be calculated as follows.

$$X = \sum_i F_i \cdot Xp_i$$

Y and Z values of the XYZ values may be calculated in a similar manner, and conversion from the XYZ values into Lab values may be simply performed. Further, this may be similarly applied to two-color printing or four-or-more-color printing other than three-color printing.

In order to use the Neugebauer model for creation of a color conversion table, chromaticity values of combinations of 0% and 100% of respective coloring materials are necessary.

However, in this embodiment, since the creation of the color conversion table is performed based on a printed matter (target printed matter 42) which is an actual matter instead of a color chart, it is not essential that combination colors of 0% and 100% of respective coloring materials are present in a correspondence relationship between image signal values (CMYK) detected by reading of the target printed matter 42 and chromaticity values (XYZ) of the target printed matter 42.

Thus, a method for estimating (Xpi, Ypi, Zpi) by an optimization method using chromaticity values (Xpi, Ypi, Zpi) corresponding to combinations of 0% and 100% of respective coloring materials in the Neugebauer model are set as unknown numbers and using a correspondence relation between image signal values (CMYK), that is, "Fi" and chromaticity values (Xm, Ym, Zm) of a target printed matter as correct answer data may be considered. That is, an optimization process of finding (Xpi, Ypi, Zpi) where the sum of squares of differences expressed by the following equation is performed.

The following equation is an equation relating to X. Equations relating to Y and Z may be similarly expressed.

$$\sum_j \left\{ \left( \sum_i F_{ij} \cdot Xp_i \right) - Xm_j \right\}^2 \to \min$$

Here, j is a subscript indicating ID (that is, each pixel) of correspondence relationship data of image signal values (CMYK) and chromaticity values (Xm, Ym, Zm) of a target printed matter.

The optimization method may include, for example, a Newton's method, a quasi-Newton method, a Simplex method, or the like. Methods other than the above-described methods may be used. That is, an applied method is not particularly limited.

By using (Xpi, Ypi, Zpi) calculated by the optimization, it is possible to calculate chromaticity values of each lattice point in a color conversion table by the Newgebauer model.

In this way, (Xpi, Ypi, Zpi) is estimated by the optimization operation, but if a combination color of 0% and 100% of coloring materials is present in image signals, chromaticity values corresponding thereto may be employed as the values of (Xpi, Ypi, Zpi) as they are. The unknown numbers decrease, and the optimization is easily performed.

Further, in the above description, the Newgebauer model is used, but a Yule-Nielsen correction Neugebauer model expressed as the following equation may be used. Here, n is a so-called Yule-Nielsen's correction coefficient, and is used to correct non-linearity of combinations with respect to the Neugebauer model.

$$X = \sum_i \{F_i \cdot Xp_i^{1/n}\}^n$$

In a case where the correction coefficient model is used, it is sufficient to add n to unknown numbers for optimization. n may be common to the XYZ values, or may be calculated as different coefficients (nx, ny, nz) in X, Y, and Z.

Further, a Cellular-Neugebauer model in which fundamental values (Xpi, Ypi, Zpi) of color prediction are extended to combination colors (for example, 0%, 40%, and 100%) including an intermediate area ratio may be used, for example. In addition, in realization of the invention, it is not essential that the color reproduction model is limited to the Neugebauer models. Any model indicating a relationship between image signals and chromaticity values may be used, and thus, a color reproduction model other than the Neugebauer models may also be used. Furthermore, the color reproduction (relationship between image signals and chromaticity values) may be mathematically expressed as an appropriate matrix, a polynomial equation, or the like, and elements of the matrix, coefficients of the polynomial equation, or the like may be optimized, to thereby create a new model.

Embodiment 4

Combination Method of Embodiment 3 and Embodiment 2

As Embodiment 4, a method of creating a color conversion table using a color reproduction model and correcting the color conversion table (color conversion table created by the color reproduction model) by correspondence relationship data of document image signals and chromaticity values may be used. That is, Embodiment 4 corresponds to a method of performing the method of Embodiment 2 using the color conversion table created in Embodiment 3 as a "temporary color conversion table".

[Second Color Conversion Unit 80]

The second color conversion unit 80 color-converts the document image data 40 using a profile that uses the second color conversion table 92A created by the target profile creation unit 66 (that is, the second color conversion table creation unit 66A) or an appropriate profile which is prepared in advance as an input profile, and using a profile of the printing device 18 which is prepared in advance as an output profile. The "appropriate profile which is prepared in advance" includes a standard profile such as JAPAN COLOR (registered trademark), SWOP, GRACOL, or Fogra, in the case of CMYK signals, for example.

In the second main configuration shown in FIG. 5, the input profile which is first set with respect to the second color conversion unit 80 may be as close as possible to a color reproduction characteristic of the target printed matter 42. Thus, it is preferable to use a configuration in which candidates of the input profile are stored in a database and the input profile is selected based on a correspondence relationship between document image signals acquired by reading the target printed matter 42 and chromaticity values. As the input profile which is first set with respect to the second color conversion unit 80, an input profile in which an average color difference or a maximum color difference between read chromaticity values and profile chromaticity values with respect to document image signals is smallest may be selected.

Figure 13:
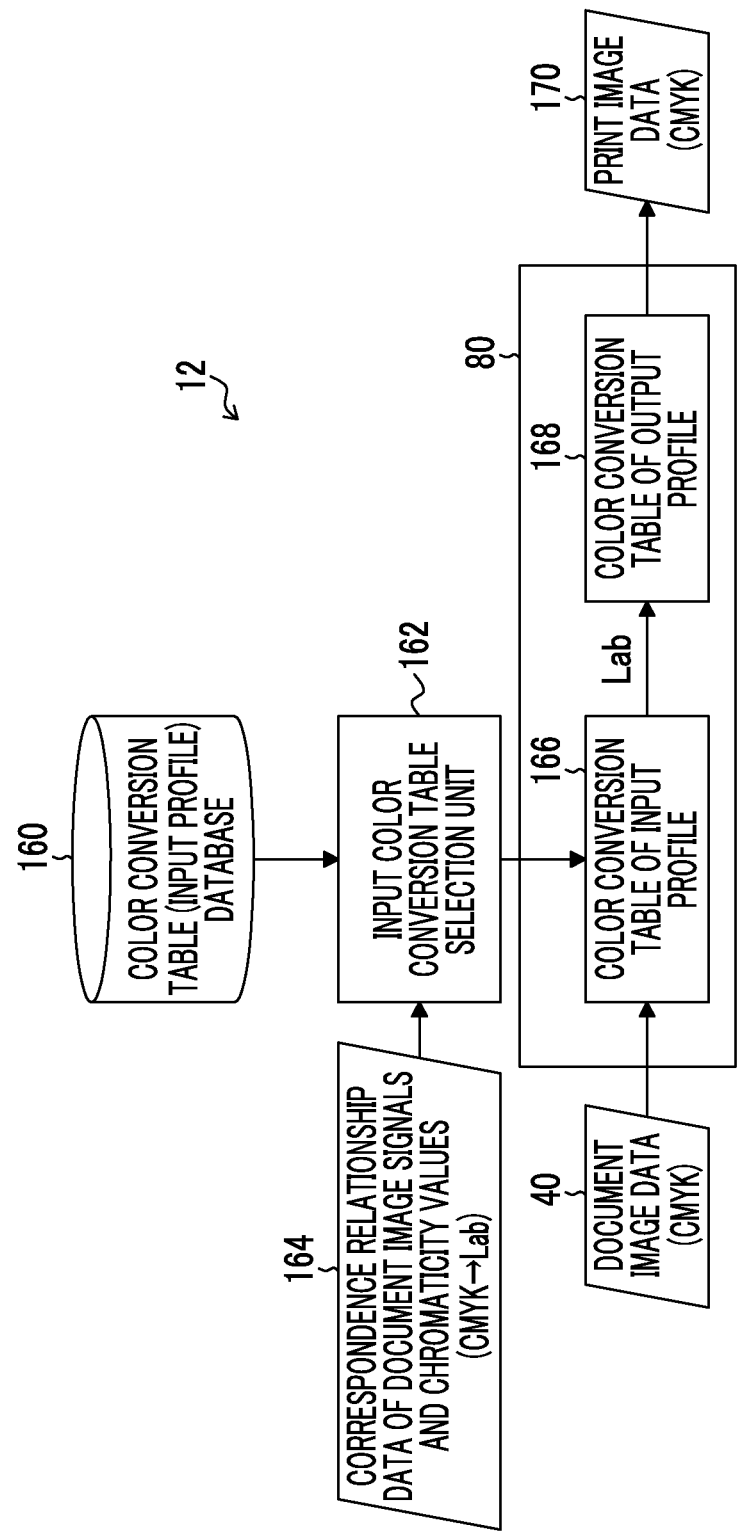
FIG. 13 is a block diagram showing main components relating to a second color conversion unit.

FIG. 13 is a block diagram showing main components relating to the second color conversion unit 80.

The image editing device 12 comprises a color conversion table database 160 and an input color conversion table selection unit 162. The color conversion table database 160 stores a color conversion table of a standard profile or an input profile which is previously created. The color conversion table database 160 corresponds to an "input color conversion table database".

The input color conversion table selection unit 162 performs a process of selecting a color conversion table of an optimal input profile based on correspondence relationship data 164 of document image signals and chromaticity values, from the color conversion table database 160. The "correspondence relationship data 164 of document image signals and chromaticity values" is data generated through the processes in the image association unit 62 and the first color conversion unit 64 described in FIG. 2 to FIG. 4.

The input color conversion table selection unit 162 shown in FIG. 13 performs a process of selecting a color conversion table in which an average color difference or a maximum color difference between read chromaticity values and profile chromaticity values with respect to document image signals is smallest from the color conversion table database 160 based on the correspondence relationship data 164 of the document image signals and the chromaticity values.

One color conversion table selected by the input color conversion table selection unit 162 is set as an input profile color conversion table 166 in the second color conversion unit 80.

The document image data 40 is converted from CMYK values into Lab values according to the input profile color conversion table 166 ("input color conversion table") in the second color conversion unit 80, and is converted from Lab values into CMYK values according to the output profile color conversion table 168 ("output color conversion table").

Thus, the document image data 40 is subjected to CMYK→CMYK conversion by the second color conversion unit 80, so that CMYK data which corresponds to the print image data 170 after color conversion is obtained. In FIG. 13, an example in which the color conversion processes are performed in stages according to two color conversion tables (166 and 168) is described, but in actual processing, it is possible to combine two color conversion table (166 and 168) to form one color conversion table of CMYK→CMYK conversion. It is possible to perform color conversion by one-time processing using the combined multi-dimensional (CMYK→CMYK) color conversion table.

The print image data 170 generated by the second color conversion unit 80 is transmitted to the printing device 18 (see FIG. 1 and FIG. 2). The printing device 18 performs printing of the printed matter 50 based on the print image data 170.

[Third Color Conversion Table Creation Unit 102]

Next, a third color conversion table creation unit 102 in FIG. 5 will be described. In a second main configuration shown in FIG. 5, similar to the procedures (procedures 1 to 3, steps S130 to S134 in FIG. 6) of acquiring chromaticity values from the target printed matter 42, a procedure of acquiring chromaticity values from the printed matter 50 is performed with respect to the printed matter 50 (steps S120 to S124 in FIG. 6).

Thus, correspondence relationship data of the document image data 40 and chromaticity values of the target printed matter 42 is obtained, and correspondence relationship data of the document image data 40 and chromaticity values of the printed matter 50 is obtained. That is, data indicating a correspondence relationship between three items of signal values (document image signal values) of the document image data 40, the chromaticity values ("referred to as "target chromaticity values") of the target printed matter 42, and chromaticity values (referred to as "print chromaticity values") of the printed matter 50 is obtained.

It is possible to acquire a difference between target chromaticity values and chromaticity values (print chromaticity values) of an actually printed result with respect to each signal value of the document image data 40, from the correspondence relationship data. The difference between the chromaticity values (referred to as "differential chromaticity values") is reflected in a color conversion table of an input profile (target profile 92) in the second color conversion unit 80 or a color conversion table of an output profile (printer profile 94) to correct the color conversion table (see FIG. 2).

Further, a configuration in which the color correction profile 96 for correcting chromaticity values is inserted between an input profile and an output profile and a color correction table of the color correction profile 96 is created from information about differential chromaticity values may be used.

The third color conversion table creation unit 102 (see FIG. 5) is a block including the differential colorimetric value calculation unit 84 and the second profile correction unit 82 shown in FIG. 2. The differential chromaticity value calculation unit 84 is a processing unit that calculates a difference between target chromaticity values and print chromaticity values. The second profile correction unit 82 performs a process of correcting a color conversion table of an input profile or a color conversion table of an output profile, or a process of creating a color correction table of the color correction profile 96.

[Example of Method of Correcting Color Conversion Table of Input Profile]

As a specific example of the third color correction conversion table creation unit 102, an example in which a color conversion table of an input profile is corrected will be described. In this example, a CMYK→Lab conversion table is used as the color conversion table of the input profile.

When values (difference) obtained by subtracting print chromaticity values from target chromaticity values are set as differential chromaticity values (differential chromaticity values=target chromaticity values−print chromaticity values), the differential chromaticity values are added with respect to a lattice point of the color conversion table of the input profile to correct values of the chromaticity values (values on an output side of the color conversion table). The correction method is not limited to a method of adding the differential chromaticity values as they are for correction, and a method of adding "A×differential chromaticity values" using a correction intensity coefficient A to correct the values of chromaticity values (values on the output side of the color conversion table) may be used. Here, the range of the correction intensity coefficient A is set to be 0<A≤2, for example. A case where A is 1 corresponds to a case where differential chromaticity values are added they are for correction. In order to prevent vibration in a case where feedback adjustment is repeated, it is preferable to set the correction intensity coefficient A to a value which is slightly smaller than 1, for example, "0.75" or the like. The correction intensity coefficient A may be a predetermined fixed value or may be appropriately changed by a user.

Lattice points which are correction targets are the same as the example described in [Embodiment 1] (FIG. 10 and FIG. 11).

An example of a color conversion table of two colors of C and M will be described. FIG. 14 shows correspondence data indicating a correspondence relationship between document image signals (CM) and chromaticity values (Lab values). In FIG. 14, correspondence data of document image signals (CM), target chromaticity values (target Lab values), print chromaticity values (print Lab values), and differential chromaticity values (differential Lab) is shown. The correspondence data shown in FIG. 14 is correspondence data formed by adding "print Lab values" and "differential Lab values" to the correspondence data described in FIG. 10.

The differential chromaticity values (differential Lab values) shown in FIG. 14 are added to chromaticity values (Lab values of a lattice point) of a color conversion table of an original input profile to correct the chromaticity values.

That is, differential Lab=(+1, −1, 0) are added to original Lab values associated with the lattice point $P_1$ in FIG. 11 to correct the Lab values.

Similarly, with respect to four lattice points $P_{21}$, $P_{22}$, $P_{23}$, and $P_{24}$, differential Lab=(+1, −4, −2) are added to original Lab values to correct the Lab values.

Similarly, with respect to the lattice points $P_{31}$, $P_{32}$, $P_{33}$, and $P_{34}$, differential Lab=(+1, −4, −2) are added to original Lab values to correct the Lab values.

Similarly, with respect to the lattice points $P_{42}$, $P_{43}$, and $P_{44}$, differential Lab=(−1, +3, −5) are added to original Lab values to correct the Lab values.

With respect to the lattice points $P_{33}=P_{41}$ that overlap each other in ID=3 and ID=4, average values of the differential Lab values of ID=3 and the differential Lab values of ID=4 are calculated, and the calculated average values are added to the original Lab values to correct the Lab values. In the case of FIG. 14, since the average values of the differential Lab values of ID=3 and the differential Lab values of ID=4 are (−0.5, 0, −1), the average values are added to the Lab values of the lattice point $P_{33}=P_{41}$ for correction.

With respect to the lattice points of $P_{51}$ and $P_{52}$, differential Lab=(−1, 0, −2) are added to original Lab values to correct the Lab values.

In the above-described specific example, an example in which differential Lab values are added as they are to correct Lab values is described, but as described above, an example in which "A×differential Lab" are added using the correction intensity coefficient A for correction may be used. In this case, with respect to lattice points that overlap each other, average values of "A×differential Lab" are added for correction.

If chromaticity values of lattice points in a color conversion table are corrected using the above-described method, it is expected that the continuity of color conversion table (smoothness in change) deteriorates. Thus, it is preferable to perform a smoothing treatment with respect to a color conversion table after correction. Furthermore, adjustment of differential Lab values using the correction intensity coefficient A, which are the amount of adjustment, and the smoothing treatment may be performed together.

[Example of Method of Creating Color Correction Table]

Even when a form called a color correction table is used instead of the above-described configuration in which the difference between the target chromaticity values and the print chromaticity values is reflected in the color conversion table of the input profile, the same effects can be obtained.

Figure 15:
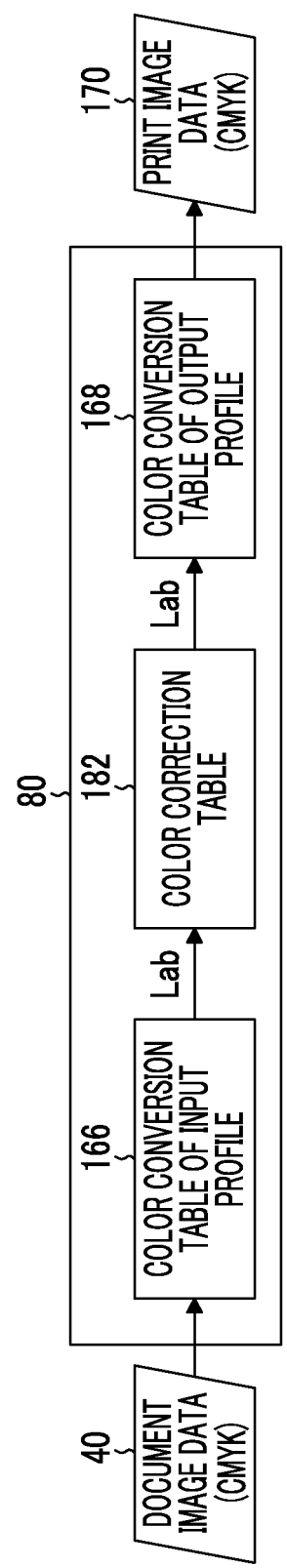
FIG. 15 is a conceptual diagram in a case where a color correction table is used.

FIG. 15 is a conceptual diagram in a case where a color correction table is used. A color correction table 182 is a table for correcting chromaticity values between the color conversion table 166 of the input profile and the color conversion table 168 of the output profile in the second color conversion unit 80. The color correction table 182 is a color conversion table of the color correction profile 96 shown in FIG. 2. Here, as the color correction table 182, a Lab→Lab conversion table for converting input Lab values to output Lab values is used. That is, the color correction table 182 functions to correct output values of the color conversion table 166 (input color conversion table) of the input profile.

The color correction table 182 may be created as follows, based on the correspondence data shown in FIG. 14.

In a case where target Lab values which are input side Lab values in the color correction table 182 correspond to a lattice point, the Lab values (output side Lab values) of the lattice point corresponding to the target Lab values are set to "target Lab+(target Lab−print Lab)".

Further, in a case where the target Lab values do not correspond to a lattice point, Lab values (output side Lab values) of lattice points that surround the target Lab values are set to values of "target Lab+(target Lab−print Lab)".

With respect to lattice points other than the color correction target, values of the table are set so that input Lab values and output Lab values become identical to each other.

With respect to the above-described method of creating the color correction table 182, in a case where the target Lab values which become the input side Lab values in the color correction table 182 correspond to a lattice point, using the correction intensity coefficient A, Lab values (output side Lab values) of the lattice point corresponding to the target Lab values may be set to "target Lab+A×(target Lab−print Lab)". Further, in a case where the target Lab values does not correspond to the lattice point, Lab values (output side Lab values) of lattice points that surround the target Lab values may be set to values of "target Lab+A×(target Lab−print Lab)". As described above, the range of the correction intensity coefficient A is set to be 0<A≤2, for example. Preferably, the correction intensity coefficient A is set to a value which is slightly smaller than 1. The correction intensity coefficient A may be a predetermined fixed value, or may be appropriately changed by a user.

In FIG. 15, a configuration in which the CMYK→Lab conversion using the color conversion table 166 of the input profile, the Lab→Lab conversion using the color correction table 182, and the Lab→CMYK conversion using the color conversion table 168 of the output profile are performed in stages is shown, but in actual operation processing, it is possible to combine these three color conversion tables (166, 182, and 168) to form one color conversion table of CMYK→CMYK conversion. It is possible to perform color conversion using the combined multi-dimensional (CMYK→CMYK) color conversion table in one-time processing.

[Example of Method of Correcting Color Conversion Table of Output Profile]

Further, as another method, a method of correcting the color conversion table 168 of the output profile may be used. In this case, similarly, the same effects can be realized.

In a case where the color conversion table 168 of the output profile is corrected, CMYK values of lattice points corresponding to target Lab values are corrected so that chromaticity values are changed by the amount of differential chromaticity values.

With respect to the above-described method of correcting the color correction table 168 of the output profile, using the correction intensity coefficient A, CMYK values of lattice points corresponding to target Lab values may be corrected so that chromaticity values are changed by the amount of A×differential chromaticity values. As described above, the range of the correction intensity coefficient A is set to be 0<A≤2, for example. Preferably, the correction intensity coefficient A is set to a value which is slightly smaller than 1. The correction intensity coefficient A may be a predetermined fixed value, or may be appropriately changed by a user.

As described above, the third color conversion table creation unit 102 in the second main configuration (see FIG. 5) corrects an input color conversion table or an output color conversion table or creates a color correction table from a difference between target chromaticity values and print chromaticity values.

Further, in the second main configuration, the document image data 40 is color-converted again to perform printing using the input color conversion table or the output color conversion table after correction or the color correction table, created by the third color conversion table creation unit 102.

Thus, it is expected that a color of a printed matter printed by the printing device 18 is close to a color of a target printed matter.

Further, in the second main configuration, by repeating the series of procedures "second color conversion→printing→printed matter reading/chromaticity value acquisition/image and chromaticity value association→color conversion table correction (color correction table creation)" described above, it is expected that a color of a printed matter is closer to a color (target color) of a target printed matter.

[Using Colorimeter 32 Together]

Various error factors may be considered in chromaticity values acquired by reading the target printed matter 42 or the printed matter 50 printed by the printing device 18 using the image reading unit 30 such as a scanner. As the error factors, a scanner reading error, a scanner profile error, an association error of image signals and chromaticity values, a color conversion table creation error, or the like may occur.

Accordingly, in order to reduce the influence of these error factors and to enhance the accuracy of color matching, it is preferable to use a spectral colorimeter (colorimeter 32) together. By combining information acquired by the image reading unit 30 and colorimetric information acquired by the spectral colorimeter, it is possible to enhance the accuracy of color matching.

[Color Measurement Method, and Association Method of Colorimetric Values and Image Position]

With respect to a gradation portion or a pattern portion of a printed matter, it is physically difficult to acquire colorimetric values corresponding to desired image signal values using a spectral colorimeter. Main reasons are as follows, for example. First, an aperture of a spectral colorimeter has a certain size. Second, it is difficult to accurately match a color measurement position with a desired position.

In this regard, if a screen tint portion (portion where a predetermined image signal value is expanded) that has an area sufficiently wider than the size of the aperture of the spectral colorimeter is used, it is possible to easily acquire colorimetric values with respect to desired image signal values.

In this embodiment, as a method of acquiring colorimetric values corresponding to image signal values by the colorimeter 32, the following methods may be used.

(1) A first method is a method of analyzing document image data and automatically specifying a screen tint portion capable of being measured by the colorimeter 32, and displaying a color measurement recommendation position (see FIG. 1) on the display unit 34 so that a user performs color measurement.

In this case, a configuration in which a color corresponding to a larger number of pixels in the document image data takes a higher rank and color measurement recommendation position candidates are sequentially arranged in a descending order on a graphical user interface (GUI) may be used.

(2) A second method is a method of displaying image content of document image data (document image) on the display unit 34 and causing a user to select a color measurement position on a screen to perform color measurement.

In the case of a colorimeter capable of automatically performing color measurement by designating a position, it is possible to instruct the colorimeter to perform automatic color measurement.

In the second method of causing the user to designate the color measurement position on the screen, in a case where the user designates a gradation portion or a pattern portion, a color measurement target image signal value may be acquired by averaging a certain range (for example, a range of the aperture of the colorimeter 32) in an image corresponding to the position designated by the user, and colorimetric values may be acquired as averaged colorimetric values in the aperture range by performing color measurement at the designated position.

In this case, it is preferable to request the user to perform color measurement at the position designated by the user (including the vicinity thereof) plural times, and to obtain colorimetric values by averaging plural color measurement results. That is, if the user performs an operation of positioning the colorimeter 32, since delicate deviation occurs at a color measurement position, it is preferable to reduce the influence of measurement errors due to the positional deviation by performing color measurement plural times and averaging plural color measurement results.

Figure 16:
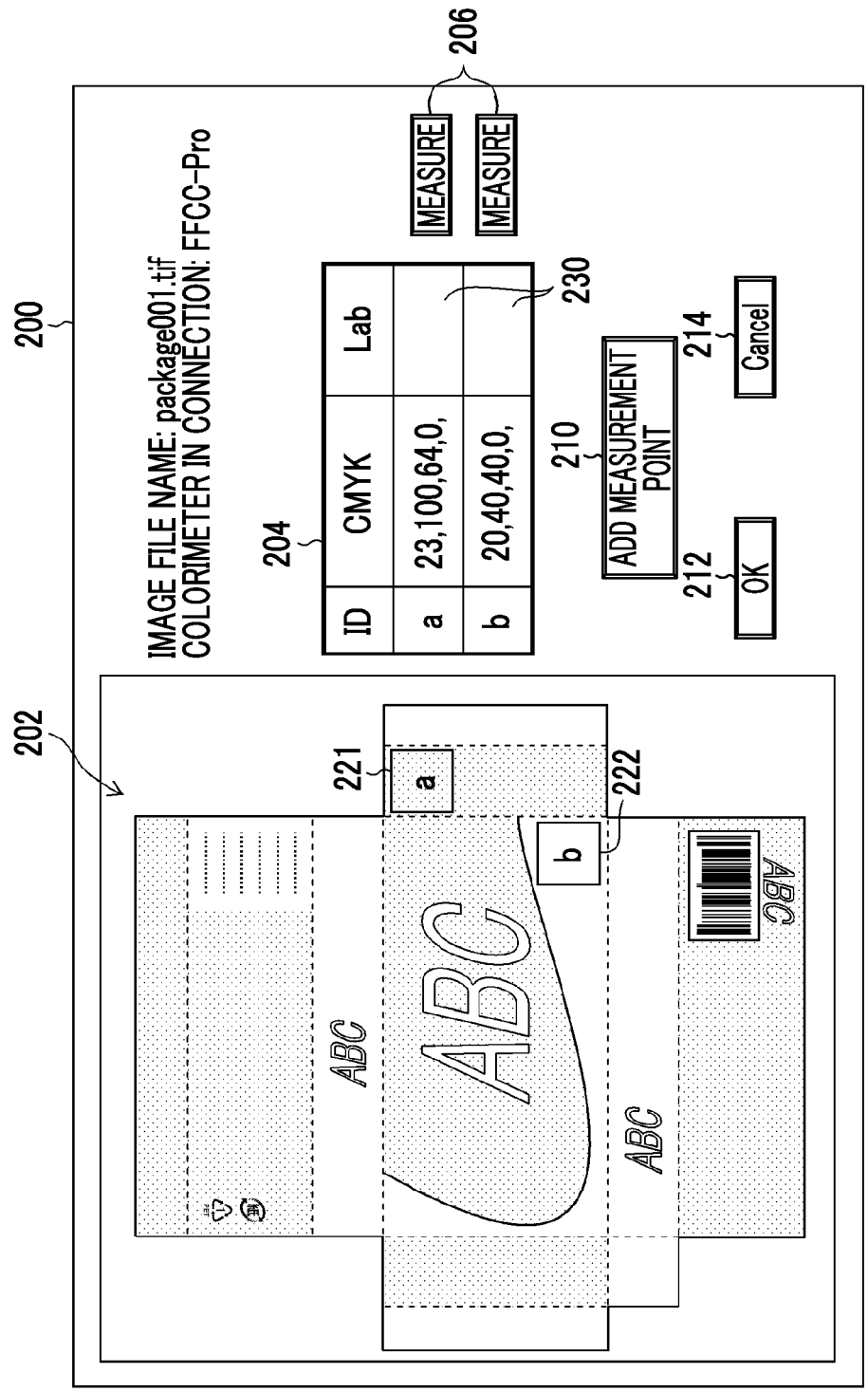
FIG. 16 is a diagram showing an example of a graphical user interface (GUI) when a color measurement position is selected in a configuration where a spectral colorimeter is used in combination.

FIG. 16 shows an example of a GUI when selecting a color measurement position. A measurement position selection screen 200 as shown in FIG. 16 is displayed on the display unit 34 of the image editing device 12 shown in FIG. 1. The measurement position selection screen 200 includes an image display area 202, a measurement point display section 204, a measurement execution button 206, a measurement point addition button 210, an OK button 212, and a cancel button 214.

Further, on the measurement position selection screen 200, an image file name of image data corresponding to a printed matter which is a measurement target or a type name of a measurer connected to a system are displayed.

Image content of image data corresponding to the printed matter which is the measurement target is displayed in the image display area 202. A region indicated by "a" (portion surrounded by a frame line of reference numeral 221) and a region indicated by "b" (portion surrounded by a frame image of reference numeral 222) in the shown image represent screen tint portions recommended as color measurement positions from analysis of document image data.

Identification codes (ID) which correspond to color measurement recommendation positions are assigned to the screen tint portions recommended as the color measurement positions, and the frame lines 221 and 222 indicating the color measurement recommendation positions are displayed on an image displayed in the image display area 202 in an overlapping manner. In FIG. 16, the frame lines 221 and 222 are displayed in a rectangular shape, but the shape of the frame lines 221 or 222 is not limited to the rectangle, and may be an arbitrary figure shape such as other polygons or a circle.

Further, information about color measurement recommendation positions is displayed in the order of priority in the measurement point display section 204. ID=a represents a color measurement recommendation position corresponding to the region surrounded by the frame line 221, and ID=b represents a color measurement recommendation position corresponding to the region surrounded by the frame line 222.

In the measurement point display section 204, identification codes (ID) of measurement points and information about CMYK values of a document image corresponding to respective measurement positions (color measurement positions) are displayed.

The measurement point addition button 210 is a GUI button for freely enabling a user to set a measurement point (that is, a color measurement region) on the document image, in addition to the recommended color measurement positions (color measurement regions). If the measurement point addition button 210 is pressed, the user can manually add a measurement point (color measurement region) on the document image. As a method of designating a desired measurement point, means for designating a position or a region on an image using a pointing device, a touch panel or the like of the input device 36 (see FIG. 1) may be employed.

The term "press" with respect to the measurement point addition button 210 and the other GUI buttons includes an operation of inputting a command corresponding to each button, such as click or touch.

The measurement execution button 206 is a GUI button for instructing execution of color measurement using the colorimeter 32 (see FIG. 1). In the case of this example, the measurement execution button 206 is provided for each candidate of the measurement points shown in the measurement point display section 204.

If the measurement execution button 206 is pressed, color measurement using the colorimeter 32 is executed with respect to an image position corresponding to a measurement point. If the color measurement using the colorimeter 32 is executed and colorimetric values (in this example, Lab values) are acquired by the colorimeter 32, Lab values which are color measurement results are displayed in a corresponding Lab value display cell 230 in the measurement point display section 204.

The OK button 212 is a GUI button for instructing completion of the measurement using the colorimeter 32. The cancel button 214 is a GUI button for instructing canceling of a process or an operation. By pressing the OK button 212, the measurement process using the colorimeter 32 is completed, and the measurement result is stored.

In the above description, a case where a color at a specific position in an image of the target printed matter 42 or the printed matter 50 printed by the printing device 18 is measured by the colorimeter 32 is described, but the measurement target of the colorimeter 32 is not limited to the target printed matter 42 or the printed matter 50.

Instead of the target printed matter 42 or the printed matter 50, in a case where a target color such as a color chip is designated as a sample, the color chip instead of the target printed matter 42 may be color-measured.

In this way, combination data of image signals (document image signals or read image signals) at a position which is a color measurement target of the colorimeter 32 and colorimetric values acquired by the colorimeter 32 is obtained. Two specific examples with respect to a method of using the combination data will be described as follows.

[First Example of Method of Using Colorimetric Values]

As a first example of the method of using the colorimetric values obtained by the colorimeter 32, a method in which colorimetric values are directly reflected in a correspondence relationship between document images and chromaticity values will be described.

Figure 17:
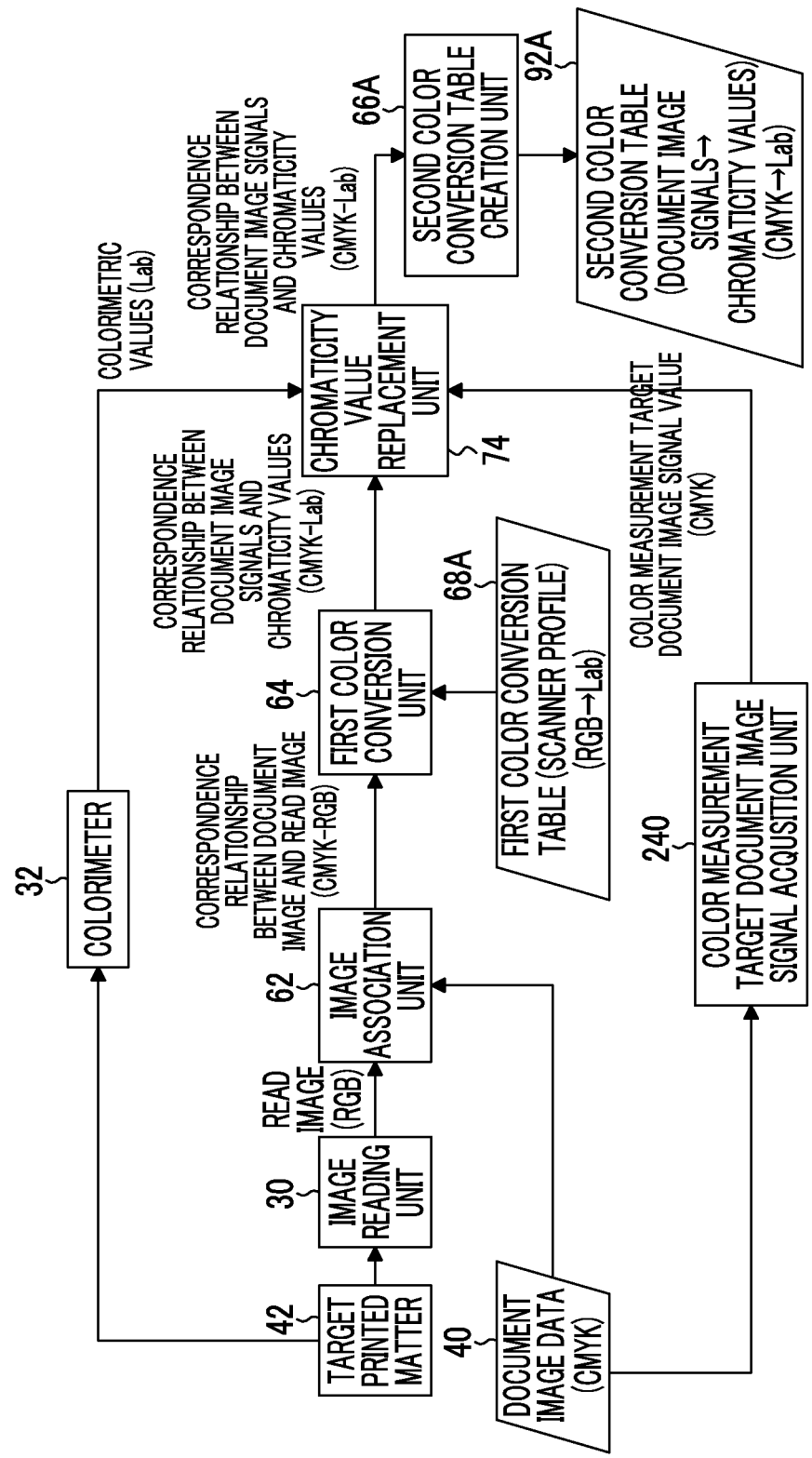
FIG. 17 is a block diagram showing a configuration according to a first example of a method of using colorimetric values.

FIG. 17 is a block diagram showing a configuration relating to the first example of the method of using the colorimetric values. The configuration shown in FIG. 17 corresponds to a configuration in which the colorimeter 32, the chromaticity value replacement unit 74, and a color measurement target document image signal acquisition unit 240 are added to the first main configuration shown in FIG. 3. In the configuration shown in FIG. 17, the same reference numerals are given to the same or similar components as in the configuration shown in FIG. 3, and description thereof will not be repeated.

The color measurement target document image signal acquisition unit 240 corresponds to means for detecting a position on a document image corresponding to a color measurement position where a printed matter is color-measured using the colorimeter 32 and acquiring document image signal values (referred to as "color measurement target document image signal values") of an image position corresponding to the color measurement position in the document image data 40.

A function of the color measurement target document image signal acquisition unit 240 is included in the color measurement position association unit 70 shown in FIG. 2. The color measurement position association unit 70 may include means for providing the color measurement recommendation positions shown in FIG. 16, a GUI through which a user can set a color measurement position, automatic color measurement means for automatically performing color measurement with respect to a designated color measurement position, or the like.

The chromaticity value replacement unit 74 performs a replacement process of replacing chromaticity value data corresponding to the color measurement target document image signal values corresponding to a position where a printed matter on a document image is color-measured with colorimetric values acquired by the colorimeter 32, based on colorimetric values (here, Lab values) acquired by the colorimeter 32 and color measurement target document signal values (CMYK values) acquired by the color measurement target document image signal acquisition unit 240, with respect to "correspondence relationship data of document image signals and chromaticity values" generated through the processes in the image association unit 62 and the first color conversion unit 64 with respect to read image data of the target printed matter 42.

The second color conversion table 92A is created by the second color conversion table creation unit 66A based on the "correspondence relationship data of document image signals and chromaticity values" after the replacement process generated through the replacement process in the chromaticity value replacement unit 74.

The configurations of the colorimeter 32, the color measurement target document image signal acquisition unit 240, and the chromaticity value replacement unit 74, described in FIG. 17 may be similarly added to the configuration shown in FIG. 4 or the configuration shown in FIG. 5.

Figure 18:
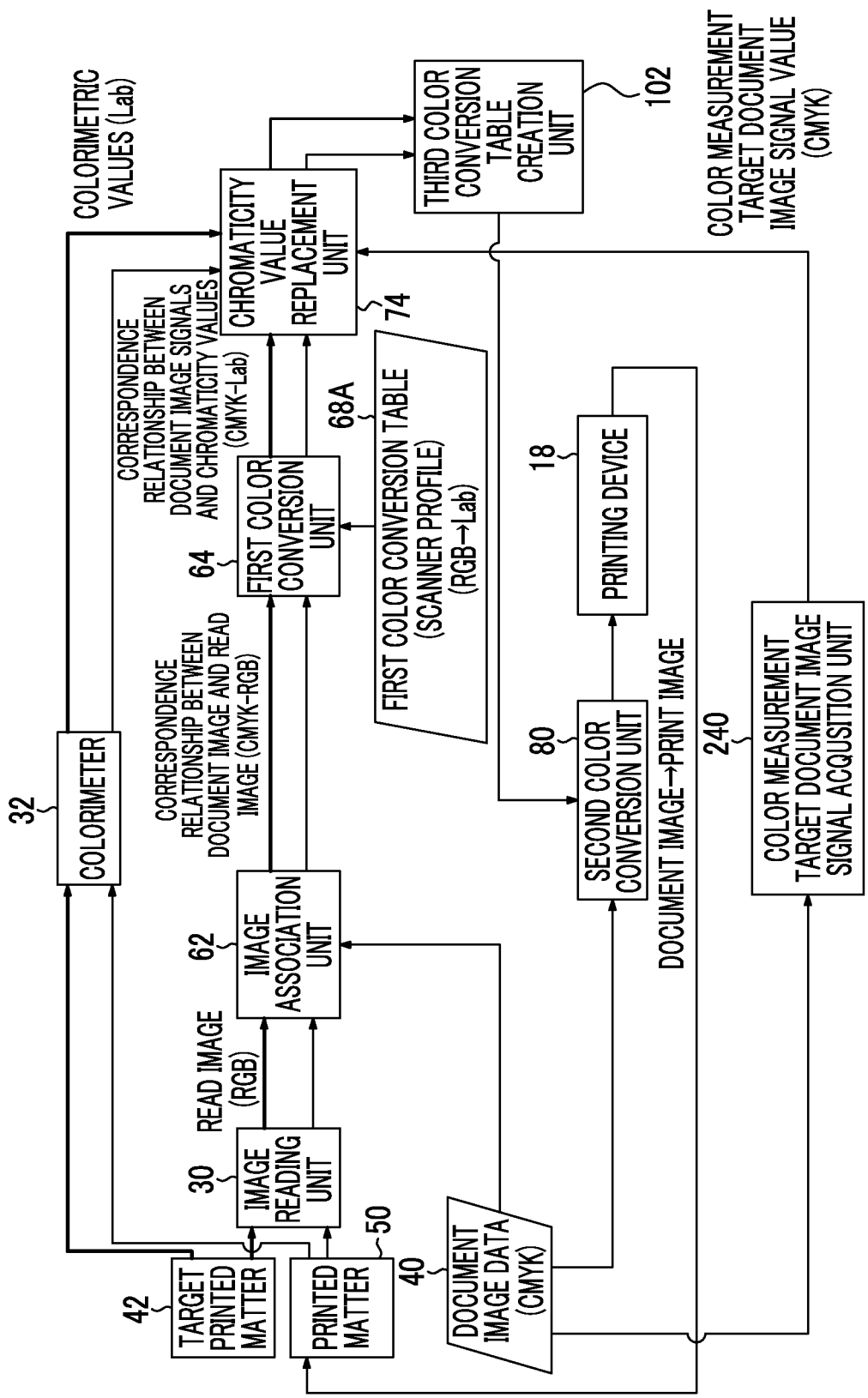
FIG. 18 is a block diagram showing a configuration in which a function of replacing chromaticity values with colorimetric values is added to the second main configuration shown in FIG. 5.

FIG. 18 is a block diagram showing a configuration in which a function of replacing chromaticity values with colorimetric values is added to the second main configuration shown in FIG. 5.

The configuration shown in FIG. 18 corresponds to a configuration in which the colorimeter 32, the chromaticity value replacement unit 74, and the color measurement target document image signal acquisition unit 240 are added to the second main configuration shown in FIG. 5.

In the case of the configuration shown in FIG. 18, color measurement may be executed using the colorimeter 32 with respect to both of the target printed matter 42 and the printed matter 50 printed by the printing device 18.

The chromaticity value replacement unit 74 may replace chromaticity values of both of "correspondence relationship data of document image signals and chromaticity values of a target printed matter" obtained by reading the target printed matter 42 and "correspondence relationship data of document image signals and chromaticity values of a printed matter" obtained by reading the printed matter 50 with colorimetric values obtained by the colorimeter 32.

An input color conversion table or an output color conversion table of the second color conversion unit 80 is corrected by the third color conversion table creation unit 102, based on the "correspondence relationship data of document image signals and chromaticity values of the target printed matter" and the "correspondence relationship data of document image signals and chromaticity values of the printed matter" after the replacement process generated through the replacement process in the chromaticity value replacement unit 74, or a color correction table is created.

In this way, by directly reflecting the colorimetric values from the colorimeter 32 in the correspondence relationship data of the image signals and the chromaticity values, the accuracy of color conversion is further enhanced.

[Second Example of Method of Using Colorimetric Values]

As a second example of the method of using the colorimetric values obtained by the colorimeter 32, a method of performing selection or correction of a scanner profile based on the colorimetric values will be described. A scanner used as the image reading unit 30 generally acquires image signals (scanner image signals) acquired through a filter of three primary colors of RGB. A spectral sensitivity of the filter of three primary colors of RGB is different from that of a color function of XYZ or the like of a spectral colorimeter.

A scanner profile is obtained by associating scanner image signals and colorimetric values (chromaticity values in a device-independent color space). The spectral sensitivity (that is, scanner spectral sensitivity) of the filter of three primary colors of RGB in the scanner is different from the color function of XYZ or the like of the spectral colorimeter. Thus, in the case of coloring materials or base materials having different spectral characteristics, even in a case where RGB signal values acquired by the scanner are identical to each other, XYZ values (Lab values) acquired by the colorimeter 32 may vary. That is, the scanner profile has dependency on a coloring material or a base material of a printed matter.

Thus, a configuration in which plural scanner profiles with respect to various coloring materials or base materials are prepared in a database and a scanner profile which is closest to colorimetric values of an actual printed matter from a relationship between color measurement target read image signals and colorimetric values is selected is preferably used.

Further, a configuration in which a color conversion table of a scanner profile is corrected from a relationship between color measurement target read image signals and colorimetric values so that chromaticity values obtained by the image reading unit 30 are set to be close to colorimetric values obtained from an actual printed matter may be preferably used.

Figure 19:
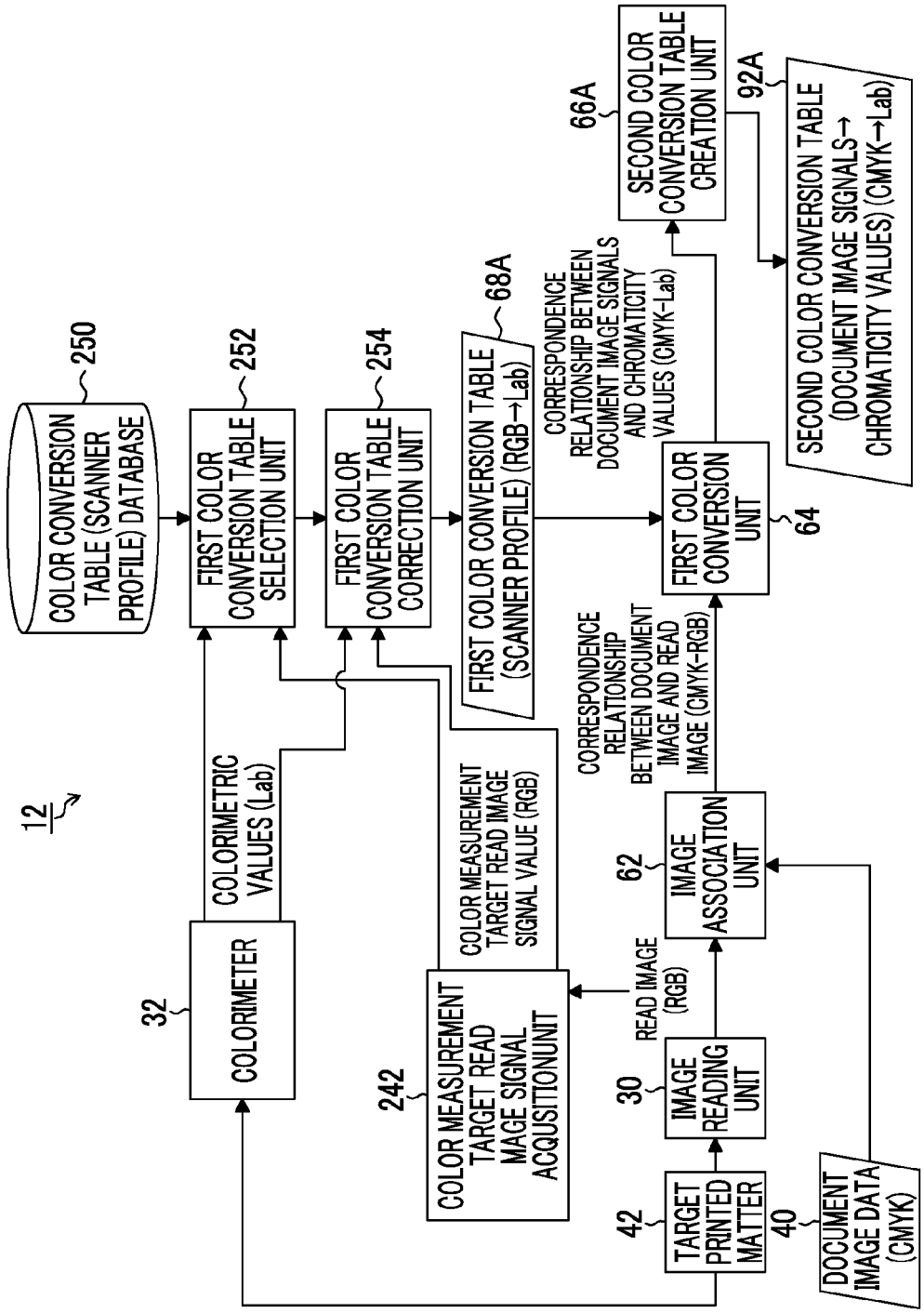
FIG. 19 is a block diagram showing an example of a configuration in which means for performing selection and correction of a scanner profile based on colorimetric values is provided in the first main configuration.

FIG. 19 shows a configuration example comprising means for performing scanner profile selection and correction based on colorimetric values. Here, a case where both of scanner profile selection and correction are performed using the colorimetric values obtained by the colorimeter 32 is described, but a configuration in which any one of scanner profile selection and correction is performed may be used. That is, a configuration in which only scanner profile selection is executed may be used, and a configuration in which only one scanner profile is prepared to adaptively perform only correction may be used.

The configuration example of the image editing device 12 shown in FIG. 19 corresponds to a configuration in which the colorimeter 32, a color measurement target read image signal acquisition unit 242, a color conversion table database 250, a first color conversion table selection unit 252, and a first color conversion table correction unit 254 are added to the first main configuration shown in FIG. 3.

The color measurement target read image signal acquisition unit 242 corresponds to means for detecting a position on a document image corresponding to a color measurement position where a printed matter is color-measured using the colorimeter 32 based on the read image data obtained from the image reading unit 30 and acquiring image signal values (referred to as "color measurement target read image signal values") of an image position corresponding to the color measurement position in read image data.

A function of the color measurement target read image signal acquisition unit 242 is included in the color measurement position association unit 70 shown in FIG. 2. The function of the color measurement target document image signal acquisition unit 240 shown in FIG. 17 and the function of the color measurement target read image signal acquisition unit 242 in FIG. 19 are common in that image signals (color measurement target image signals) associated with colors for which the colorimetric values are acquired by the colorimeter 32. The color measurement document image signal acquisition unit 240 shown in FIG. 17 and the color measurement target read image signal acquisition unit 242 in FIG. 19 may be integrated into a color measurement target image signal acquisition unit.

Plural scanner profiles with respect to various combinations of coloring materials or base materials are stored in the color conversion table database 250. Further, scanner profiles which are previously created or corrected in this system may be stored in the color conversion table database 250. With respect to various combinations of types of coloring materials and base materials capable of being used in printing using the printing device 18, a color conversion table indicating a correspondence relationship between read signals from the image reading unit 30 and chromaticity values for each combination is stored in the color conversion table database 250. The color conversion table database 250 corresponds to a "first color conversion table database in which plural color conversion tables capable of being applied as a first color conversion table".

The first color conversion table selection unit 252 performs a process of selecting an appropriate scanner profile from the color conversion table database 250 based on colorimetric values obtained by the colorimeter 32 and the color measurement target read image signal values obtained by the color measurement target read image signal acquisition unit 242.

The first color conversion table correction unit 254 performs a process of correcting table values based on the colorimetric values obtained by the colorimeter 32 and the color measurement target read image signal values obtained by the color measurement target read image signal acquisition unit 242 with respect to a color conversion table of a scanner profile read from the color conversion table database 250. The first color conversion table correction unit 254 is included in the first profile correction unit 72 shown in FIG. 2.

The first color conversion table 68A obtained through at least one process among the selection process in the first color conversion table selection unit 252 and the correction process in the first color conversion table correction unit 254 is applied to the first color conversion unit 64.

[Example of Scanner Profile Selection Method]

The first color conversion table selection unit 252 performs the following processes.

The first color conversion table selection unit 252 calculates color differences between Lab values obtained from color measurement target read image signal values (here, RGB values) corresponding to a color measurement position with reference to a color conversion table (RGB→Lab conversion table) of a scanner profile and Lab values (colorimetric values) obtained by color conversion using the colorimeter 32 are calculated, and calculates an average color difference or a maximum color difference, or both of them.

Such a process is performed with respect to the entirety of scanner profiles prepared in the color conversion table database 250, and a scanner profile for which the average color difference or the maximum color difference is smallest is selected as a scanner profile to be used in the first color conversion unit 64.

The color conversion table of the scanner profile selected in this way may be applied to the first color conversion unit 64, or the color conversion table of the scanner profile may be further corrected by the first color conversion table correction unit 254 and the color conversion table after correction may be applied to the first color conversion unit 64.

[First Example of Scanner Profile Correction Method]

Next, a first example of a correction method in the first color conversion table correction unit 254 will be described.

The first color conversion table correction unit 254 may be configured to directly correct a color conversion table by the same method as the color conversion table correction method described as "Embodiment 2" relating to the second color conversion table creation unit 66A (see FIG. 3).

In the above-described "Embodiment 2", a desired color conversion table is obtained by correcting chromaticity values of lattice points in an existing color conversion table using correspondence relationship data of document image signals and chromaticity values.

On the other hand, in the first color conversion table correction unit 254, a desired scanner profile color conversion table is obtained by correcting chromaticity values of lattice points in an existing scanner profile color conversion table using correspondence relationship data of read image signals obtained by the image reading unit 30 and colorimetric values.

That is, with respect to lattice points around read image signals where colorimetric values are present, that is, with respect to lattice points around read image signals for which color measurement using the colorimeter 32 can be performed in a screen tint portion on a printed matter, it is possible to locally replace chromaticity values with measurement values to correct a color conversion table.

Further, similar to the example described in "Embodiment 2", it is preferable to perform a smoothing treatment with respect to the color conversion table after correction.

[Second Example of Scanner Profile Correction Method]

Next, a second example of the correction method in the first color conversion table correction unit 254 will be described.

The first color conversion table correction unit 254 may be configured to estimate a color reproduction model of the image reading unit 30 from correspondence relationship data of local read image signals and colorimetric values in which correspondence between the read image signals and the colorimetric values are specified, and to perform correction with respect to the entirety of an existing scanner profile color conversion table.

For example, as a color reproduction model of a scanner used in the image reading unit 30, the following 3×3 matrix and gamma (γ) values of RGB are considered. The 3×3 matrix corresponds to a matrix in which XYZ values of RGB primary values are used as components. γ values represent non-linearity of RGB monochromatic gradation.

$$\begin{bmatrix} Xr & Xg & Xb \\ Yr & Yg & Yb \\ Zr & Zg & Zb \end{bmatrix} \begin{pmatrix} R^{\gamma r} \\ G^{\gamma g} \\ B^{\gamma b} \end{pmatrix} = \begin{pmatrix} X \\ Y \\ Z \end{pmatrix}$$

R, G, and B represent device signal values (read image signal values) of the image reading unit 30, which are values obtained by standardizing signal values obtained by the image reading unit 30 to "0 to 1".

X, Y, and Z represent colorimetric values corresponding to read image signal values. Parameters of the color reproduction model become total 12 parameters of XYZ values (Xr, Yr, and Zr) of the R primary color, XYZ values (Xg, Yg, and Zg) of the G primary color, XYZ colors (Xb, Yb, and Zb) of the B primary color, and γ values (γr, γg, and γb) of RGB.

Since correct answer values of colorimetric values X, Y, and Z with respect to the read image signal values (R, G, and B) for one measurement point are obtained, three equations are obtained. Accordingly, in order to calculate a color reproduction model of the image reading unit 30 corresponding to a current printed matter, four or more measurement points may be prepared on the printed matter. By preparing four or more measurement points, 12 or more equations are obtained. By simultaneously solving the equations, it is possible to calculate 12 unknown parameters. If there are five or more measurement points, the parameters are optimized to be solved.

The existing color conversion table may be fitted to the color reproduction model.

That is, the XYZ values of the RGB primary colors and the γ values of the RGB gradation may be acquired from a color conversion table.

In this way, a color reproduction model of a scanner corresponding to a current printed matter and a color reproduction model of a scanner corresponding to an existing color conversion table are obtained.

If the color reproduction models are obtained, the following correction is performed with respect to respective lattice points (R, G, and B) of the existing color conversion table.

XYZ values of corrected color conversion table lattice points=XYZ values of existing color conversion table lattice points+(XYZ values in scanner color reproduction model with respect to current printed matter−XYZ values in scanner color reproduction model from existing color conversion table)

A color conversion table may be newly created using an estimated model corresponding to a current printed matter. Here, since it is considered that the number of color measurement points on the printed matter is small, it can be expected that a method of estimating a minute deviation amount due to a difference between coloring materials or base materials using a model based on general color reproduction characteristics of an existing color conversion table to correct the color conversion table shows high accuracy compared with a method of creating a color conversion table from the beginning based on a small amount of information.

Figure 20:
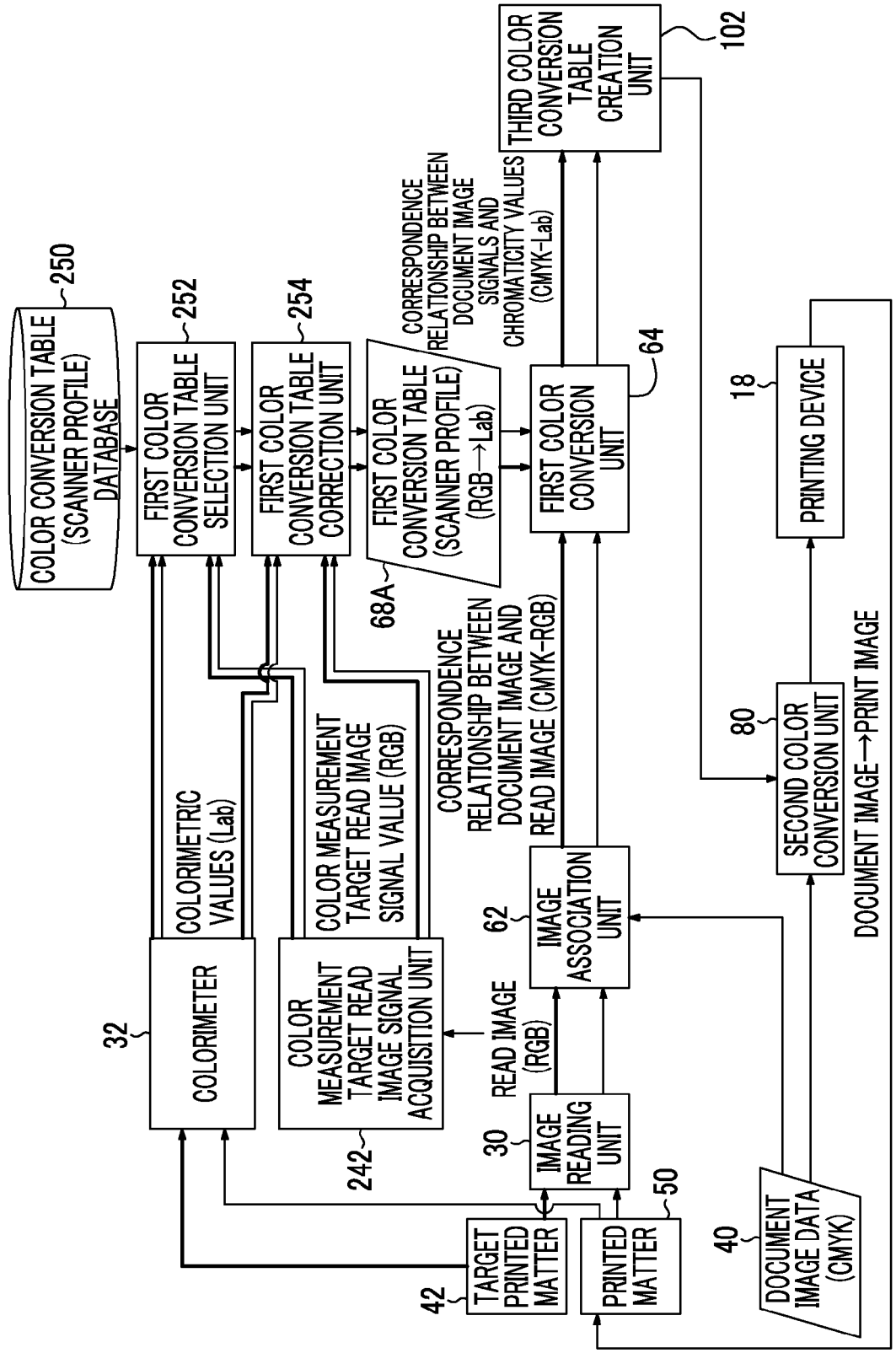
FIG. 20 is a block diagram showing an example of a configuration in which means for performing selection and correction of a scanner profile based on colorimetric values is provided in the second main configuration.

This is not limited to the example of FIG. 19. As shown in FIG. 20, similar to FIG. 19, the colorimeter 32, the color measurement target read image signal acquisition unit 242, the color conversion table database 250, the first color conversion table selection unit 252, the first color conversion table correction unit 254 may be added to the second main configuration shown in FIG. 5.

In the configuration shown in FIG. 20, in a case where coloring materials or base materials used in the target printed matter 42 and the printed matter 50 are different from each other, it is preferable that color measurement is performed with respect to each of the target printed matter 42 and the printed matter 50, a scanner profile for target printed matter reading image conversion is selected and/or corrected from a relationship of target printed matter reading image signals and colorimetric values of the target printed matter 42, and a scanner profile for printed matter reading image conversion is selected and/or corrected from a relationship of printed matter read image signals and colorimetric values of the printed matter 50.

That is, different scanner profiles are used in color conversion of a target printed matter read image and color conversion of a printed matter read image in the first color conversion unit 64.

<Third Example of Method of Using Colorimetric Values>

Figure 21:
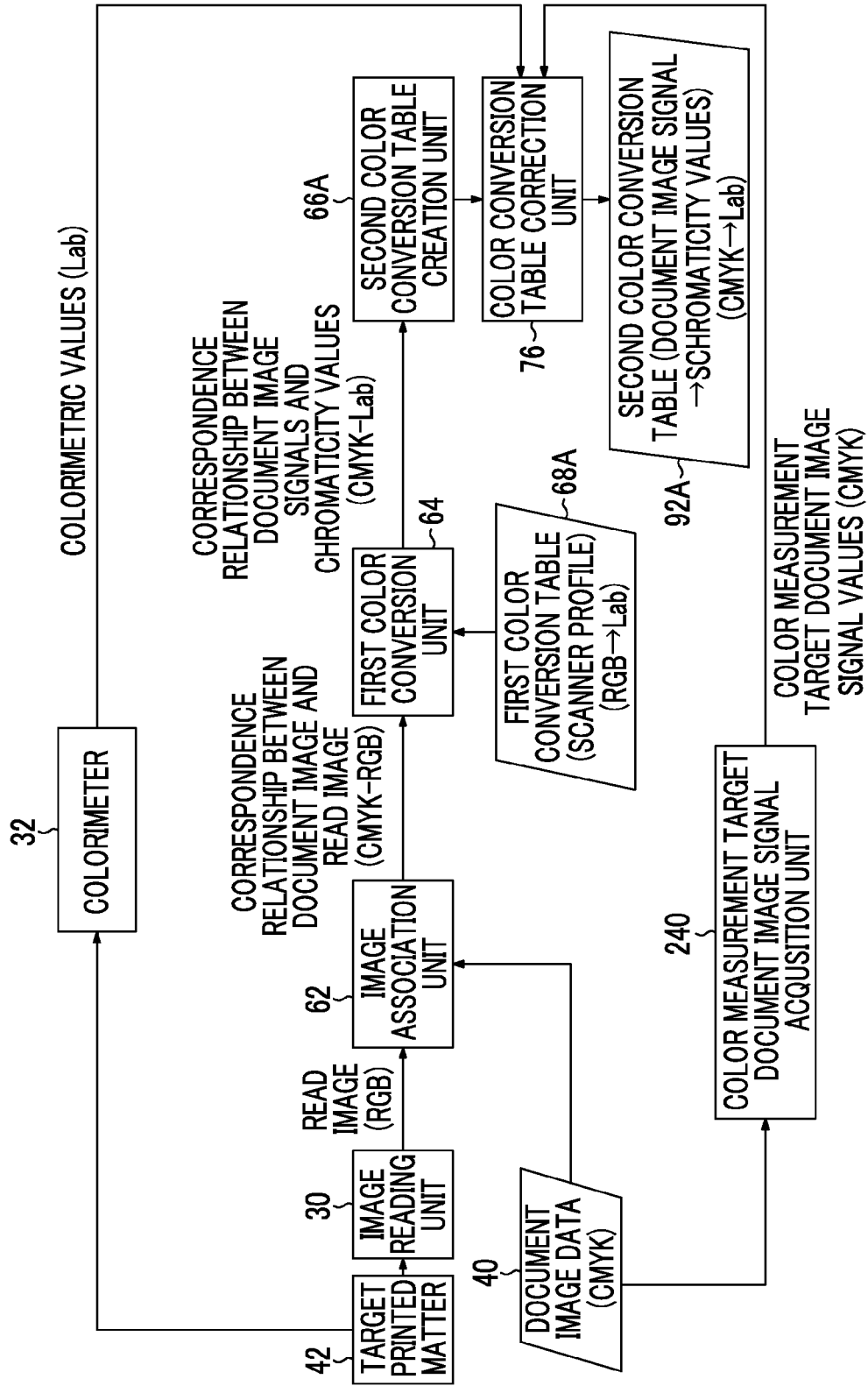
FIG. 21 is a block diagram showing a modification example of the configuration shown in FIG. 17.

FIG. 21 is a block diagram showing a modification example of the configuration shown in FIG. 17. In the configuration shown in FIG. 21, the same reference numerals are given to the same or similar components as in the configuration shown in FIG. 17, and description thereof will not be repeated.

In the configuration example shown in FIG. 21, the color conversion table correction unit 76 is provided, instead of the chromaticity value replacement unit 74 in FIG. 17. In the case of the configuration example shown in FIG. 21, the second color conversion table creation unit 66A once creates a provisional color conversion table based on "correspondence relationship data of document image signals and chromaticity values" generated through the processes in the image association unit 62 and the first color conversion unit 64. The color conversion table correction unit 76 performs a correction process of replacing chromaticity values in the provisional color conversion table with colorimetric values acquired by the colorimeter 32 based on the provisional color conversion table created by the second color conversion table creation unit 66A, the colorimetric values (here, Lab values) acquired by the colorimeter 32, and color measurement target document image signal values (CMYK values) acquired by the color measurement target document image signal acquisition unit 240. The second color conversion table 92A is generated through the correction process in the color conversion table correction unit 76.

According to the configuration example shown in FIG. 21, since a profile which is the color conversion table that is provisionally created by the second color conversion table creation unit 66A is directly corrected using the colorimetric values of the colorimeter 32, the colorimetric values of the colorimeter 32 are reflected in the color conversion table with high accuracy.

Figure 22:
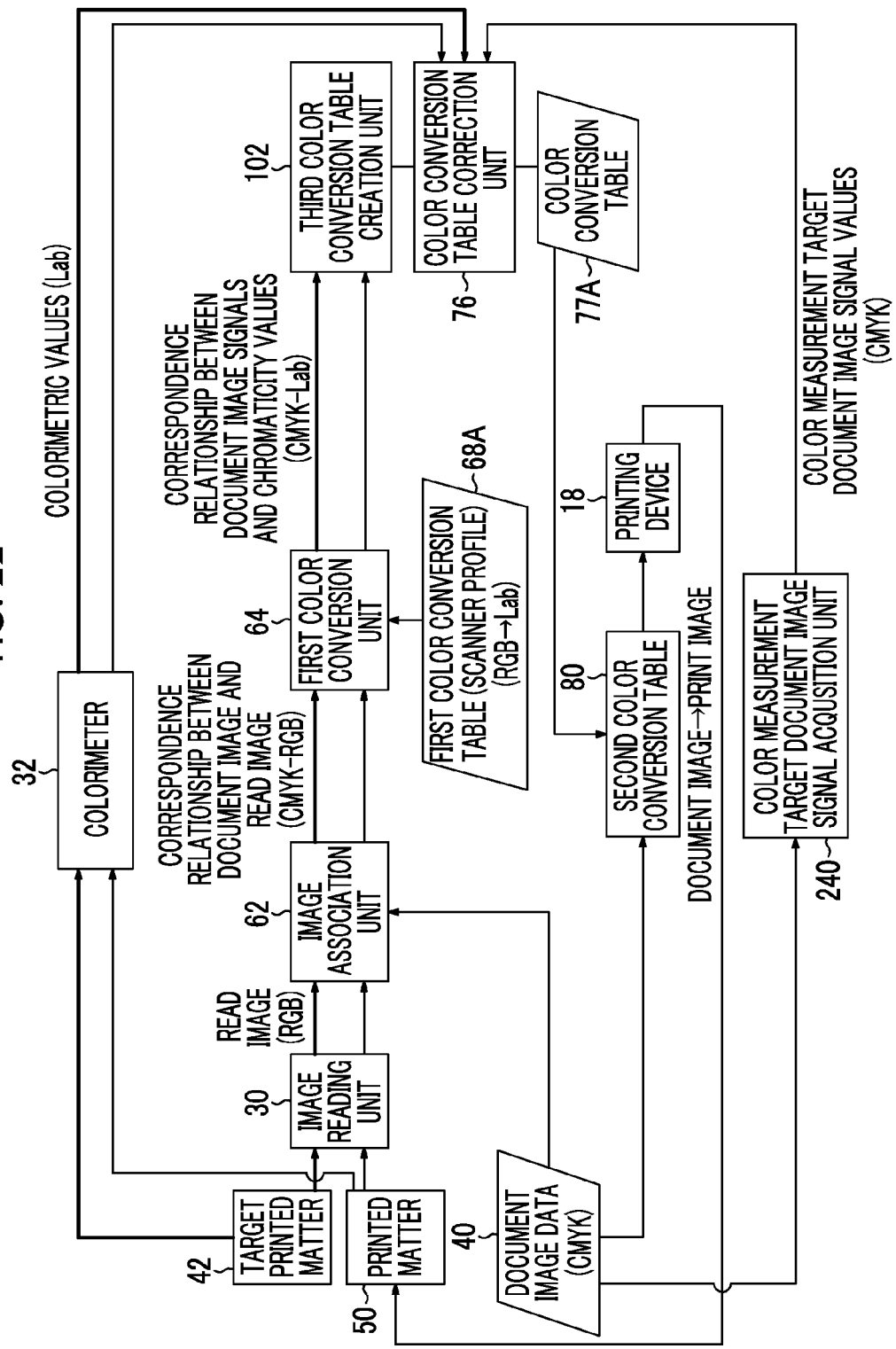
FIG. 22 is a block diagram showing a modification example of the configuration shown in FIG. 18.

FIG. 22 is a block diagram showing a modification example of the configuration shown in FIG. 18. In the configuration shown in FIG. 22, the same reference numerals are given to the same or similar components as in the configuration shown in FIG. 18, and description thereof will not be repeated.

In the configuration example shown in FIG. 22, the color conversion table correction unit 76 is provided, instead of the chromaticity value replacement unit 74 in FIG. 18. In the case of the configuration example shown in FIG. 22, the third color conversion table creation unit 102 once creates a provisional color conversion table based on "correspondence relationship data of document image signals and chromaticity values of target printed matter" and "correspondence relationship data of document image data and chromaticity values of printed matter" generated through the processes in the image association unit 62 and the first color conversion unit 64. The color conversion table correction unit 76 performs a correction process of replacing chromaticity values in the provisional color conversion table with colorimetric values acquired by the colorimeter 32 based on the provisional color conversion table created by the third color conversion table creation unit 102, the colorimetric values (here, Lab values) acquired by the colorimeter 32, and color measurement target document image signal values (CMYK values) acquired by the color measurement target document image signal acquisition unit 240. A color conversion table 77A is generated through the correction process in the color conversion table correction unit 76. The obtained color conversion table 77A is used in the second color conversion unit 80.

According to the configuration example shown in FIG. 22, since the color conversion table that is provisionally created by the third color conversion table creation unit 102 is directly corrected using the colorimetric values of the colorimeter 32, the colorimetric values of the colorimeter 32 are reflected in the color conversion table with high accuracy.

<Specific Example of Color Extraction Method after Positioning>

Here, a specific example of a color extraction method after positioning of document image data and read image data will be described.

The image association unit 62 shown in FIG. 2 performs a process of positioning document image data and read image data, and then extracting color information from each piece of the data (referred to as a "color extraction process").

As the color extraction method after positioning, a configuration in which image signal values which represent color information are acquired in the unit of pixels at corresponding positions of the document image data and the read image data, that is, in a pixel-by-pixel manner may be employed, but the extraction process is not limited to the pixel unit, and a configuration in which color information is acquired from a unit region which is an area larger than a pixel area may be employed. The number of pixels that form the unit region for color extraction may be set to an arbitrary number of 2 or greater. The shape or size of the unit region for color extraction may employ various designs.

In color extraction, a configuration in which a region-of-interest of having the size of the unit region is set on document image data and color information is extracted from the region-of-interest that satisfies an extraction condition may be used. Hereinafter, specific examples will be described.

Figure 23:
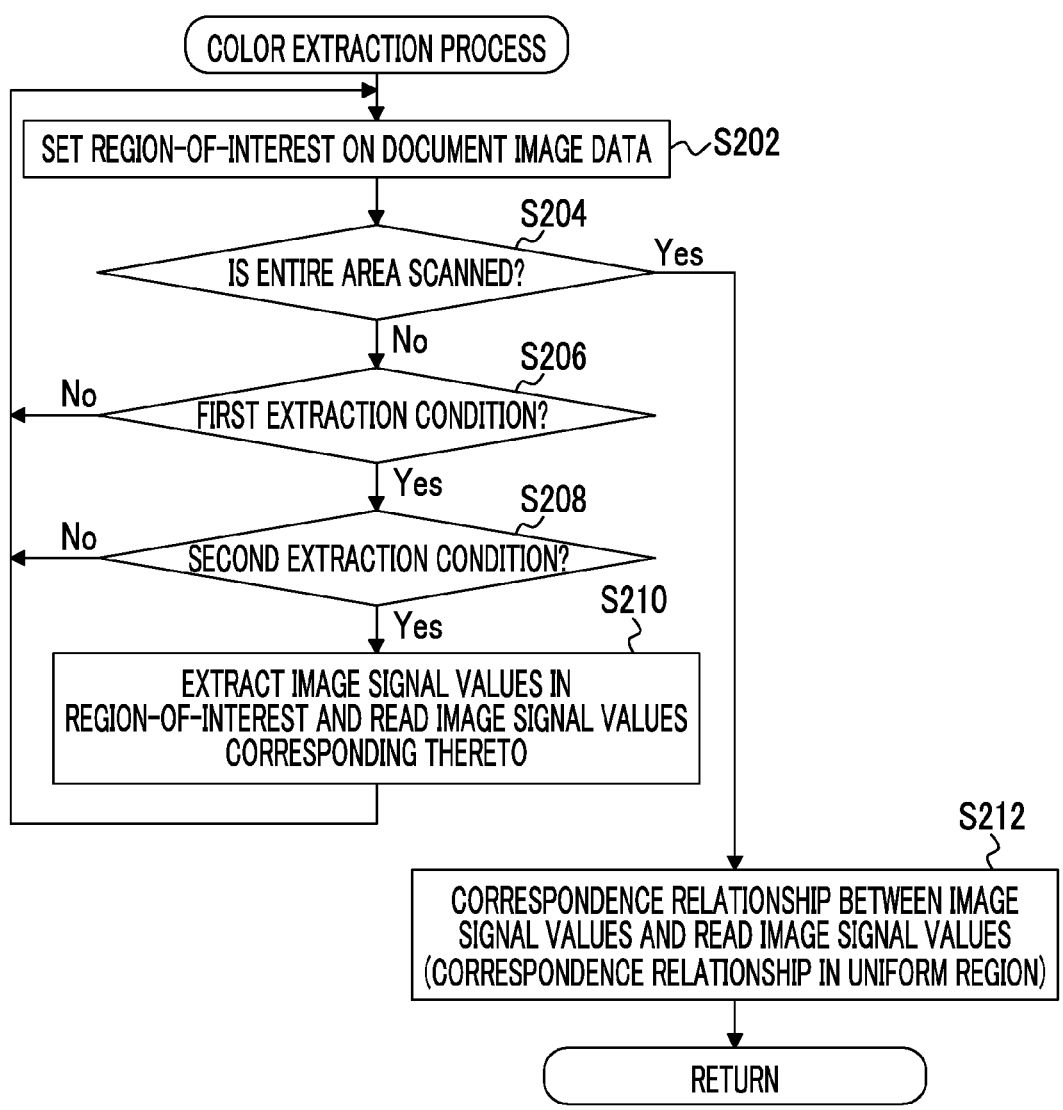
FIG. 23 is a flowchart showing an example of a color extraction method.

FIG. 23 is a flowchart showing an example of a color extraction method executed after positioning of document image data and read image data is performed. FIG. 23 shows a flowchart of a process capable of being added between step S122 and step S124 in the flowchart described in FIG. 6. After step S122 in FIG. 6, the procedure proceeds to step S202 in FIG. 23.

First, a process of setting a region-of-interest on document image data is performed (step S202). The region-of-interest refers to an image region of a regulated size to be considered as an operation target of a color extraction process.

The region-of-interest may be set as a square region having one side of 1 millimeter (mm) on a printed matter, for example. The size or shape of the region-of-interest may be variously set. Here, for ease of description, it is assumed that the shape of the region-of-interest is a square shape.

It is preferable that the area of the region-of-interest is larger than the area of one pixel of read image data. The area of one pixel of the read image data is specified from a reading resolution of the image reading unit 30. Further, it is preferable that an upper limit of the area of the region-of-interest is set to be equal to or slightly larger than the area of the aperture of the colorimeter 32.

The setting of the region-of-interest also includes position designation in an image. A position of the region-of-interest is sequentially moved on the document image data, and processes (step S204 to step S210) are performed with respect to a region-of-interest at each position.

In step S204, it is determined whether or not scanning based on the movement of the region-of-interest is completed with respect to the entire area on the document image data (step S204). If the determination in step S204 is negative, the procedure proceeds to step S206 to determine whether or not the region-of-interest satisfies a first extraction condition. The process of step S206 corresponds to a "process of determining whether or not a region-of-interest satisfies a first extraction condition".

It is preferable that the first extraction condition includes a condition that a difference between colors in the regionof-interest is equal to or smaller than a threshold value. In the case of this example, the first extraction condition demands that both of two element conditions that an edge is not included in a region-of-interest of an image and that a difference between colors in a region-of-interest is equal to or smaller than a threshold value are satisfied.

The "edge is not included in a region-of-interest" corresponds to an "edge is not present in a region-of-interest". The "difference between colors in the region-of-interest is equal to or smaller than a threshold value" corresponds to "difference between colors in the region-of-interest is equal to or smaller than a first extraction threshold value regulated for an allowable range".

The edge means a portion where shade (brightness) or color in an image rapidly changes. Generally, since brightness or color rapidly changes in an outline or a line, a boundary portion between different colors, or the like in an image, such a portion corresponds to the edge.

The first extraction condition corresponds to a definition of a "uniform region". That is, the first extraction condition corresponds to a condition for extracting the "uniform region" where an edge is not included in a region-of-interest and a difference between colors in the region-of-interest is equal to or smaller than a threshold value". The "uniform region" means a region where color in a region is uniform. The term "uniform" is not limited to a case where the color is strictly uniform, and includes an allowable variation or error.

As a first extraction threshold value determined as an allowable range with respect to a difference between colors in a region-of-interest, ΔCMYK values may be determined as a variation allowable range of CMYK values, for example. Further, as the first extraction threshold value, each of ΔC value, ΔM value, ΔY value, and AK value may be determined as a variation allowable range for each color of C, M, Y, and K.

In a case where the region-of-interest satisfies the first extraction condition, the determination in step S206 becomes affirmative, and then, the procedure proceeds to step S208.

In step S208, it is determined whether or not the region-of-interest satisfies a second extraction condition.

The second extraction condition demands that both of two element conditions that read image data is present in the region-of-interest in read image data at a position corresponding to the region-of-interest that satisfies the first extraction condition and that an image defect of a read image is not present in the region-of-interest in the read image data at the position are satisfied.

The image defect corresponds to a defect of a reading target printed matter, a contaminant attached in reading, or the like. The "image defect is not present" corresponds to "an image defect is absent". As a specific example, the "image defect is not present" corresponds to "a defect and a contaminant are not present", that is, "a defect and a contaminant are absent". The defect or contaminant which corresponds to the image defect of the read image may be determined according to whether a variance in luminance in the read image data is equal to or smaller than a threshold value. That is, if the defect or contaminant is present in the region-of-interest, the variance in luminance becomes large due to the influence of the defect or contaminant. A second extraction threshold value may be regulated for an allowable range with respect to the variance in luminance, and in a case where the variance in luminance is equal to or smaller than the second extraction threshold value with respect to the region-of-interest, it may be determined that the region-of-interest is a "uniform region" without the influence of the defect or contaminant. On the other hand, in a case where the variance in luminance is larger than the second extraction threshold value, since the presence of the defect, contaminant or the like is suspected, this case is excluded from the extraction process as a region out of the target of the "uniform region".

In this example, the region-of-interest that satisfies the first extraction condition and the second extraction condition is extracted as the "uniform region".

If the determination in step S208 is affirmative, the procedure proceeds to step S210. In step S210, a process of extracting image signal values in the region-of-interest determined as the "uniform region" and read image signal values corresponding thereto is performed. That is, a uniform color is extracted in the size of the region-of-interest.

After step S210, the procedure returns to step S202 to move the position of the region-of-interest, and then, the processes of steps S202 to S210 are repeated. Further, in a case where determination in step S206 is negative, or in a case where the determination in step S208 is negative, the procedure returns to step S202 in any case.

If the position of the region-of-interest is changed and the scanning is completed with respect to the entire area in the image, the determination in step S204 is affirmative, and then, the procedure returns to step S212.

In step S212, correspondence relationship data of image signal values and read image signal values extracted in step S210 is generated. When document image signal values are represented as CMYK values and read image signal values are represented as RGB values, in step S212, a correspondence relationship of color information of CMYK-RGB is obtained with respect to a uniform region that satisfies the first extraction condition and the second extraction condition. The process of step S212 corresponds to a "correspondence relationship color information extraction process".

After step S212, the procedure proceeds to step S124 described in FIG. 6 from the flowchart in FIG. 23.

A configuration in which the determination process of the second extraction condition described in step S208 in FIG. 23 is not provided may be used. A configuration in which in a case where the first extraction condition is satisfied in step S206 (the determination in step S206 is affirmative), the procedure proceeds to step S210 without consideration of the influence due to defects or contaminants may also be used.

[Setting of Region-of-Interest]

In setting of a region-of-interest, plural types of regions-of-interest having different sizes may be determined. As regulated sizes of the regions-of-interest, two or more types of sizes having different areas may be set, and the regions-of-interest may be set in stages in the order of areas (in the order of sizes). Thus, it is possible to extract each uniform region in the order of areas from an image.

For example, as the area sizes of the regions-of-interest, small, intermediate and large regions-of-interest, that is, three types of regions-of-interest may be prepared, and the small area, the intermediate area, and the large area may be set as a first size, a second size, and a third size, respectively. Then, the flowchart shown in FIG. 23 may be sequentially performed in the respective sizes to perform a color information extraction process at the regions-of-interest of the respective sizes.

In a case where the size of the region-of-interest is large, a color that occupies a relatively large area in an image is extracted. Further, in a case where the size of the region-of-interest is small, a color that occupies a relatively small area in the image is extracted. As the area that occupies in the image becomes larger, the color may be considered as a color having a higher degree of importance. Thus, a "weight" indicating the degree of importance of a color may be set according to the size of a region-of-interest. If color extraction is performed in the order of areas, it is possible to simply perform a weighting process with respect to the extracted colors. Here, the "weight" represents a value indicating the priority (the degree of importance) of color matching when creating a profile which is a color conversion table. In a profile creation process, the profile is created so that a color having a large weight is preferentially handled and the estimation accuracy of the color becomes higher.

Further, in the setting of the region-of-interest, in a case where the positioning accuracy of document image data and read image data is low, it is preferable to set the region-of-interest to be a large area. For example, in a case where the positioning accuracy is low, the region-of-interest is set in a square shape having a side of 4 millimeter [mm], and only a uniform region is extracted in a relatively large region-of-interest.

As means for determining the positioning accuracy, a configuration in which a document image and a read image which are results of the positioning process are displayed on a screen of the display unit 34 (see FIG. 1) in an overlapping manner may be employed. As an overlapping display method, a method of performing an overlapping display using one image among the document image and the read image as a transmissive image may be used. With such an overlapping display, a user can confirm the positioning accuracy of the document image and the read image by visual observation. In a case where the positioning accuracy is low, it is possible to achieve a user's selection indicating setting the area of the region-of-interest to be a large value.

[Application of Color Extraction Process]

The color extraction method described in FIG. 23 may be applied as the color extraction method in the image association unit 62 in the configuration shown in FIG. 3. Further, the color extraction method described in FIG. 23 may be added between step S132 and step S134 in the flowchart shown in FIG. 6. After step S132 in FIG. 6, the procedure may proceed to step S202 in FIG. 23.

Furthermore, the color extraction method described in FIG. 23 may also be applied as the method of the color extraction process in the image association unit 62 in the configuration described in FIG. 4. That is, as described in FIG. 4, the same color extraction method as in FIG. 23 may be applied to a color conversion method after positioning of document image data and read chromaticity value image data is performed using read chromaticity value image data converted into chromaticity values by performing a color conversion process in the first color conversion unit 64 with respect to the read image data. In this case, it may be understood that the read image data is replaced with "read chromaticity value image data" and RGB signal values are replaced with "chromaticity values" (Lab values).

[Description Using Specific Example of Printed Matter]

Next, a specific example of the color extraction process described in FIG. 23 will be described with reference to FIG. 24 to FIG. 27.

Figure 24:
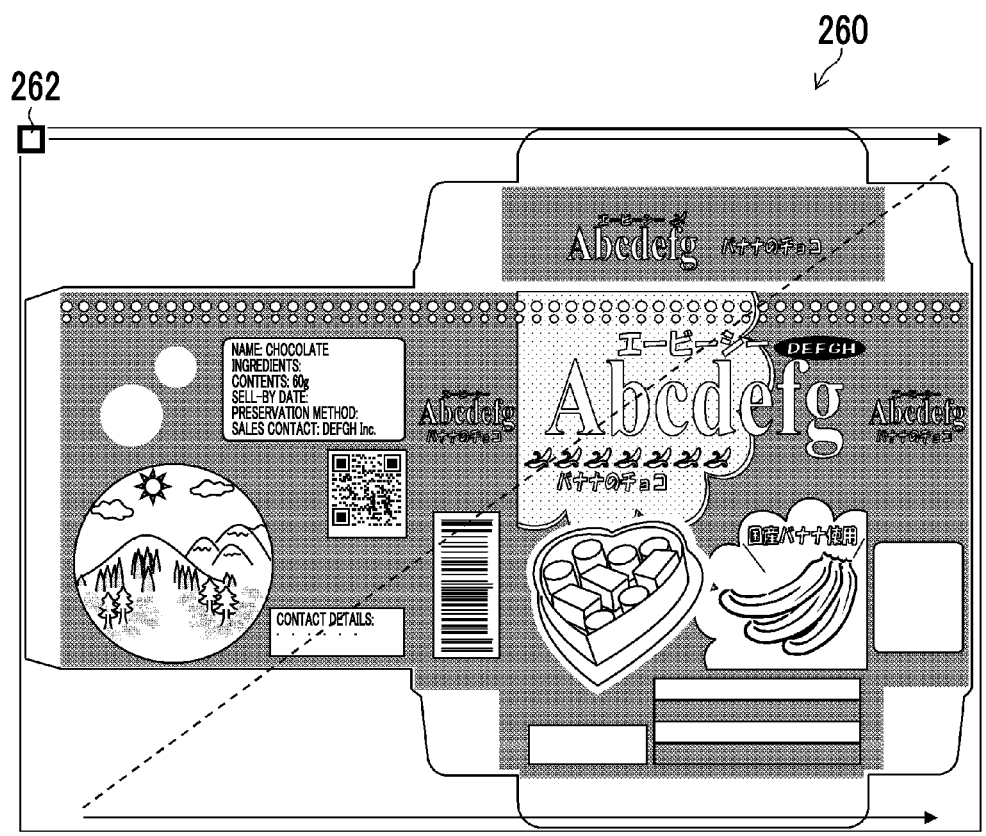
FIG. 24 is a conceptual diagram showing an example of a process of setting a region-of-interest in document image data.

FIG. 24 is a conceptual diagram showing an example of a process of setting a region-of-interest 262 in document image data 260. Although color or brightness of an image cannot be expressed in FIG. 24 due to restrictions in figure disclosure, actually, image content has variation in brightness based on various colors. This is similarly applied to FIG. 25.

The document image data 260 corresponds to a specific example of the document image data 40 shown in FIG. 1. In FIG. 24, for clear illustration, a region having a large size is drawn as the region-of-interest 262. As an example of the size of the region-of-interest 262, a square shape having a side of 1 millimeter may be used. In FIG. 24, an initial position of the region-of-interest 262 is set at an upper right corner of the document image data 260. The process of FIG. 23 is performed at each position while sequentially moving the position of the region-of-interest 262 on the document image data 260 from the initial position, to thereby scan the entire area of the document image data 260.

Arrows and a broken line in FIG. 24 conceptually represent a state where the entire area is scanned while sequentially moving the position of the region-of-interest 262. It is preferable that each position where the region-of-interest 262 is set may be set as a non-overlapping position where the regions-of-interest do not overlap each other.

Figure 25:
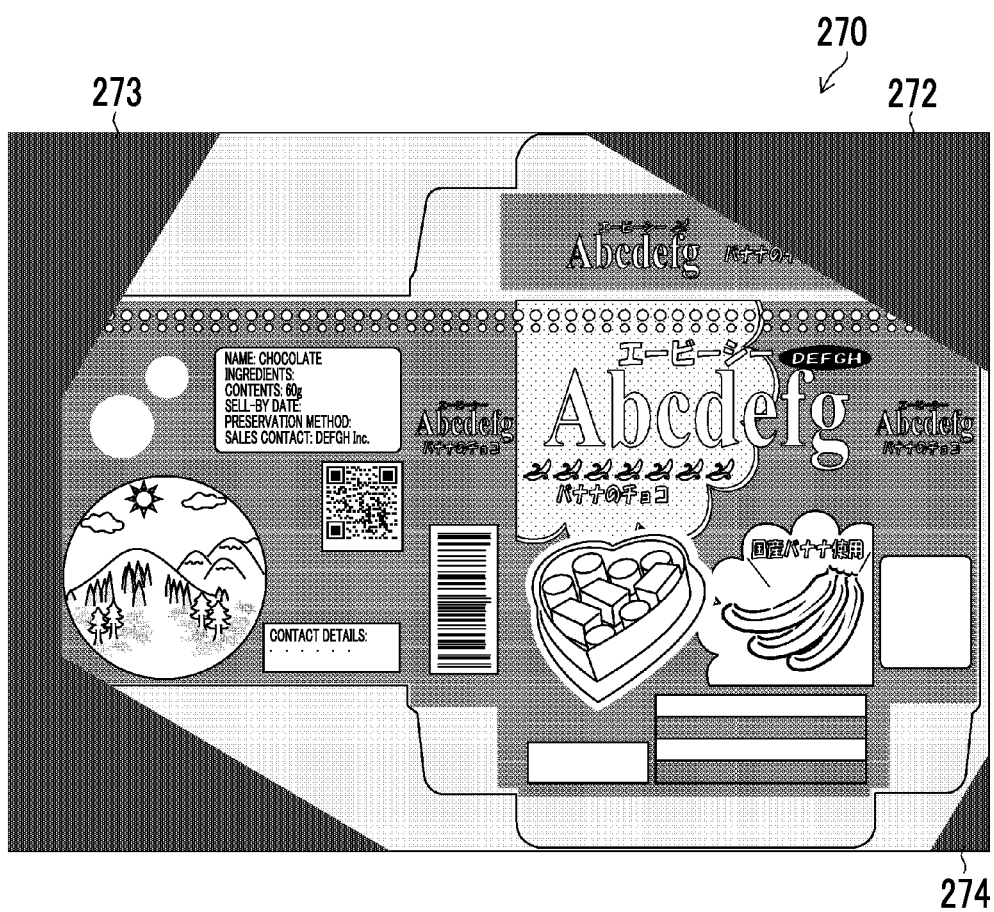
FIG. 25 is a diagram showing an example of read image data acquired by an image reading unit.

FIG. 25 shows an example of read image data obtained by the image reading unit 30 (see FIG. 2). Read image data 270 shown in FIG. 25 is read image data in which a positioning process with respect to the document image data 260 (see FIG. 24) is terminated. The read image data 270 is data obtained through an association process for a positional relationship with the document image data 260 in the image association unit 62 shown in FIG. 2. The read image data 270 corresponds to a specific example of the "read image data 122 after association" described in FIG. 7.

Black regions indicated by reference numerals 272, 273, and 274 in the read image data 270 shown in FIG. 25 represent regions where read image data is not present. The read image data 270 shown in FIG. 25 is data obtained, in reading of a printed matter by the image reading unit 30 (see FIG. 1), by performing reading the printed matter with the printed matter being obliquely arranged with respect to an image reading frame of the image reading unit 30. The black regions 272, 273, and 274 correspond to regions deviated from the image reading frame due to such an oblique arrangement of the printed matter.

For example, in a case where the printed matter is obliquely arranged with respect to the image reading frame of the image reading unit 30, or in a case where the printed matter is larger than the size of the image reading frame, a region where read image data is not present is generated.

Figure 26:
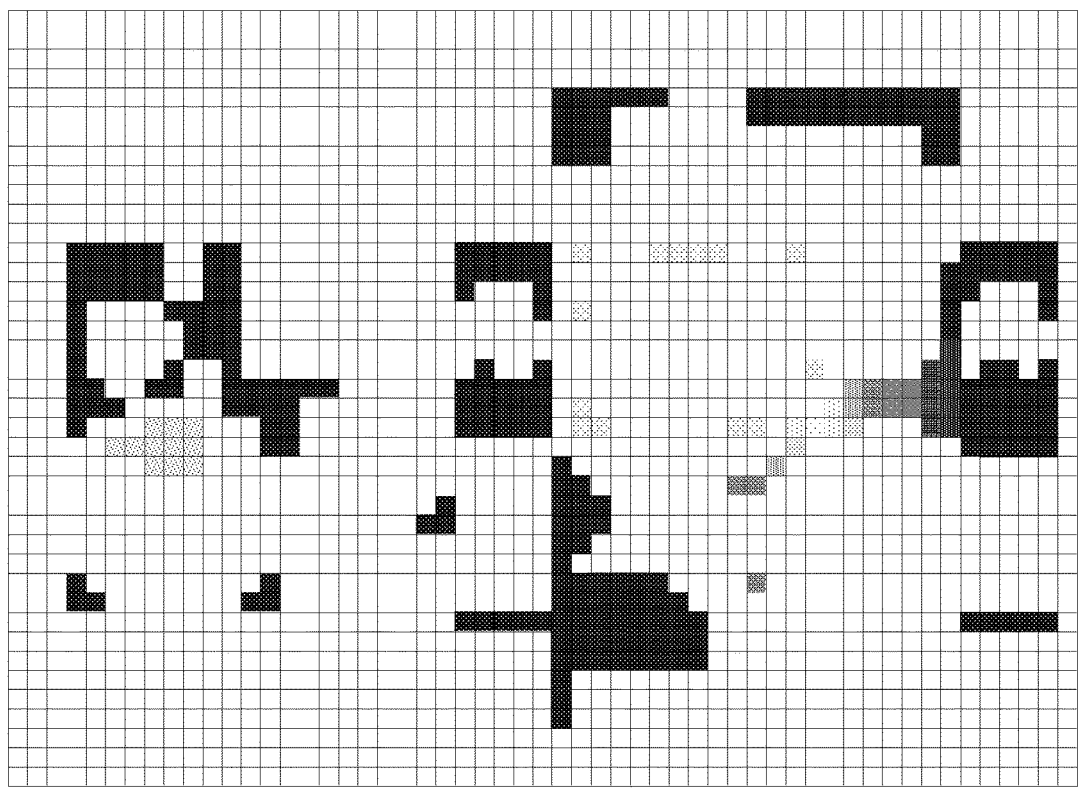
FIG. 26 is a diagram showing an example of a region extracted as a region that satisfies a first extraction condition from the document image data shown in FIG. 24.

FIG. 26 shows an example of a region extracted as a region that satisfies the first extraction condition from the document image data 260 shown in FIG. 24 and a color thereof. Each square cell shown in FIG. 26 corresponds to each set position of the region-of-interest 262 shown in FIG. 24. A uniform color region is extracted in the unit of the area of the region-of-interest 262, as shown in FIG. 26, in step S206 described in FIG. 23. In FIG. 26, the color extracted from the region-of-interest corresponds to the color of the document image data 260 in FIG. 24, but a color correspondence relationship cannot be expressed due to restrictions in figure disclosure.

Figure 27:
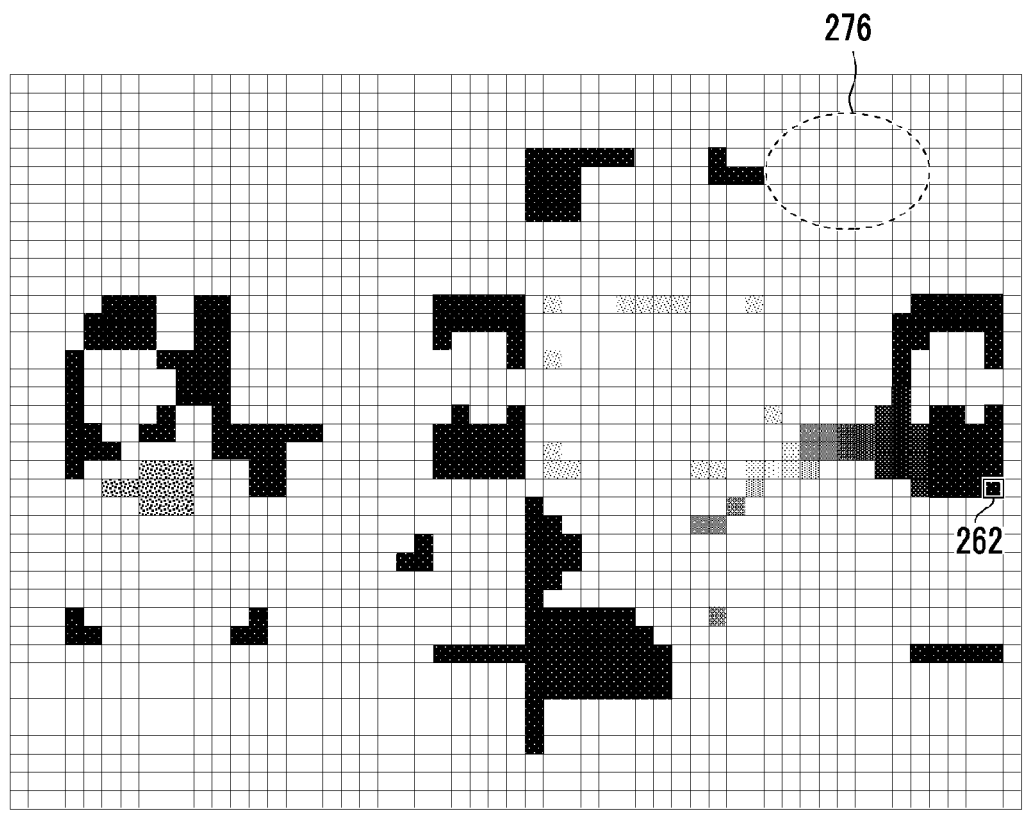
FIG. 27 is a diagram showing an example of a region extracted as a region that satisfies a second extraction condition from the read image data shown in FIG. 25.

FIG. 27 shows an example of a region extracted from a region in read image data at a position corresponding to a region-of-interest extracted as a region that satisfies the first extraction condition and the second extraction condition from the document image data 260 shown in FIG. 24, and a color thereof. In FIG. 27, the color extracted from the region corresponding to the position of the region-of-interest corresponds to the color of the read image data 270 in FIG. 25, but a color correspondence relationship cannot be expressed due to restrictions in figure disclosure.

The second extraction condition described in step S208 in FIG. 23 includes a condition that "corresponding read image data is present". The read image data is not present in the black regions indicated by reference numerals 272, 273, and 274 in FIG. 25. Accordingly, as in a region indicated by reference numeral 276 in FIG. 27, for example, a region where the read image data is not present does not satisfies the second extraction condition, and thus, the color extraction is not performed.

As shown in FIG. 24 to FIG. 27, from the document image data 260 and the read image data 270, color information in a region-of-interest at each position corresponding thereto is extracted, and correspondence relationship data of CMYK-RGB is obtained.

[Additional Condition Capable of being Added to First Extraction Condition or Second Extraction Condition]

A configuration in which an additional condition that "the periphery of a region-of-interest has the same color as the color of the region-of-interest" is added to the first extraction condition or the second extraction condition described in FIG. 23 may also be used.

Figure 28:
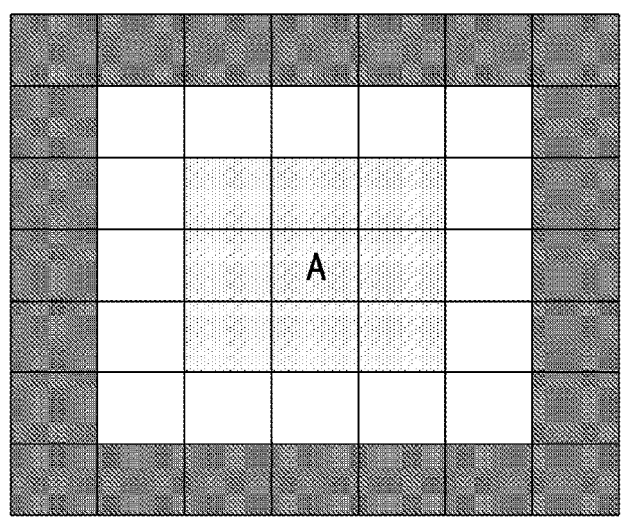
FIG. 28 is a diagram for explaining a peripheral region of the region-of-interest.

FIG. 28 is a diagram for explaining a peripheral region of a region-of-interest. FIG. 28 is an enlarged view of a part of document image data. In FIG. 28, a range of 7×7 regions-of-interest is shown.

Each lattice region divided to have the area size of each region-of-interest is referred to as a "cell". The condition that the peripheral region of the region-of-interest has the same color as the color of the region-of-interest is equivalent to a condition that "a region (lattice region) including an edge is not present in the peripheral region".

Here, it is assumed that regions of 9 cells including an "A" cell shown at the center of FIG. 28 and peripheral 8 cells adjacent to the A cell have the same color. Further, it is assumed that a range of the peripheral 8 cells adjacent to the region-of-interest is used as the "peripheral region". In this case, in the example of FIG. 28, in a case where the cell indicated by "A" is a "region-of-interest", since the peripheral 8 cells adjacent to the A cell have the same color as that of the A cell, the A cell is extracted as a region that satisfies the condition that "the periphery of a region-of-interest has the same color as the color of the region-of-interest".

A method of determining the "peripheral region" is not limited to the example shown in FIG. 28, and only a part of the peripheral 8 cells that surround the A cell may be determined as the "peripheral region", or a part or all of outside 16 cells adjacent to the 8 cells may be added to the "peripheral region".

[Example of Weighting of Extracted Color]

Instead of the configuration in which a weight is set according to the size of a region-of-interest, or in combination therewith, the following weight setting method may be employed.

Example 1

As described in FIG. 28, a configuration in which in a case where a peripheral region of a region-of-interest has the same color as the color of the region-of-interest, a weight of a color extracted from the region-of-interest is set to a large value may be used. In the example shown in FIG. 28, a weight of a color extracted from the central A cell is set to a large value.

Example 2

A configuration in which a weight is set according to an area occupied by an extracted color in an image may be used. As the area occupied in the image becomes larger, the weight may be set to a larger value.

Example 3

A configuration in which a weight is set according to the appearance frequency of a color extracted according to the flowchart shown in FIG. 23 may be used. As the appearance frequency of the extracted color becomes higher, the weight may be set to a larger value. The appearance frequency may be expressed by the number (the number of points) of regions-of-interest from which the same color is extracted.

Example 4

A configuration in which a weight is set according to the degree of importance of a color may be used. The degree of importance of a color may be set in advance. For example, with respect to an important color such as a memory color which is stored in advance as an important color, a special color, or a cooperate color, a weight may be determined according to the degree of importance of each color.

The memory color may be designated as an arbitrary color. For example, the memory color may be designated as at least one color among pearl orange, green and blue. A user may designate an importance color through an appropriate user interface, and may designate a weight with respect to each important color. The user may directly designate a value of the "weight", or may designate a "priority" relating to the "weight". In a case where the priority is designated, a correspondence relationship between the weight and the priority is determined, and the value of the "weight" is specified according to the designated priority. Furthermore, the degree of importance may be registered in a database.

Example 5

A configuration in which a weight of a color measured by the colorimeter 32 is set to a large value may be used. The color measured by the colorimeter 32 is considered as an important color, and the reliability of colorimetric values obtained by the colorimeter 32 is also high.

Example 6

As an example in which a weight is lowered, a configuration in which a weight of a color which is present in a busy image region is lowered may be considered. As a method of determining whether a region is the "busy image region", for example, a method of determining that the region is the busy image region in a case where an edge is included in an adjacent unit region may be used.

Example 7

As another example in which a weight is lowered, a configuration in which a weight in a shadow region in image concentration is lowered may be considered. In the shadow region, generally, the reading accuracy of a scanner is low. That is, in the shadow region, gradation is easily broken in a read image. The broken gradation means that the gradation cannot be sufficiently reproduced. Accordingly, by employing a configuration in which a color extracted from the shadow region has a low weight, it is possible to enhance color conversion accuracy.

The "shadow region" may be specified based on a characteristic of the image reading unit 30 to be used. That is, it is possible to regulate the shadow region where the gradation is broken according to the characteristic of the image reading unit 30 to be used.

Further, a configuration in which a condition that a color of a shadow region is not extracted since the accuracy of a read image signal in the shadow region is low is added to the first extraction condition or the second extraction condition as an additional condition may also be used. Alternatively, a process of excluding the color extracted from the shadow region from extraction results may also be employed.

Example 8

As still another example in which a weight is lowered, a configuration in which a weight of a color extracted from a region where the scanner reading reliability is low is lowered, or a configuration in which a color is not extracted from the region where the scanner reading reliability is low may be used. The "region where the scanner reading reliability is low" means a region where the accuracy of a read image signal is low. Specifically, the region where the reliability is low is a region where widths of peripheral four sides of a scanning surface of a scanner used in the image reading unit 30 are about 1 centimeter [cm] to several centimeters [cm], for example.

Figures 29, 30, 31:
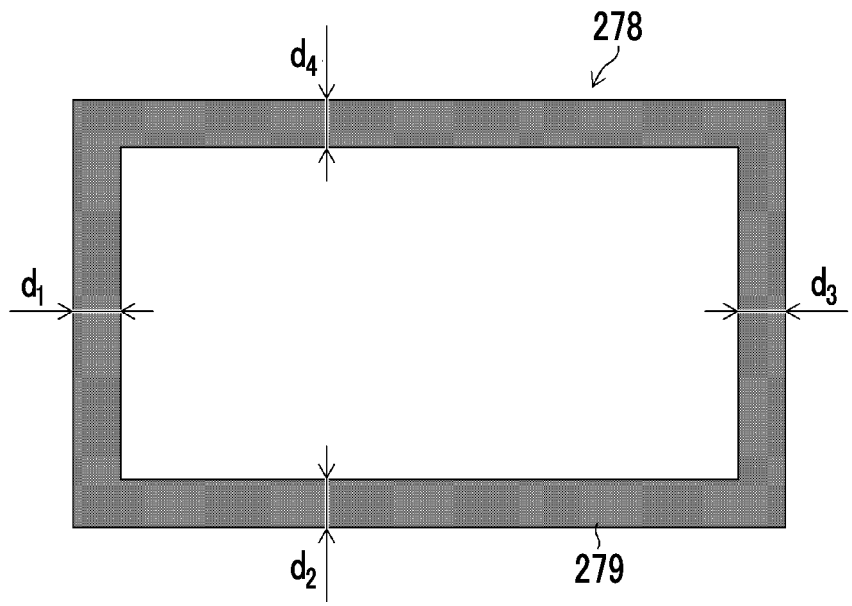
FIG. 29 is a plan view of the entirety of a scanning surface, for explaining a region with a low reliability in a scanner used in the image reading unit.
FIG. 30 is a table in which exemplary "weights" indicating importance degrees of colors are additionally provided in the correspondence data shown in FIG. 10.
FIG. 31 is a table in which exemplary "weights" indicating importance degrees of colors are additionally provided in the correspondence data shown in FIG. 14.

FIG. 29 is a diagram for explaining a specific example of a region where the reading reliability in a scanner is low. Outermost edges of a rectangle indicated by reference numeral 278 in FIG. 29 represent outer edges of a scanner surface in a scanner, and a region 279 where widths from the respective outer edges of peripheral four sides of the scanner surface toward the inside are dimensions $d_1$, $d_2$, $d_3$, and $d_4$ is formed as the "region where the reliability is low". In the simplest example, the region 279 where the reliability is low is formed as a region where the widths of the peripheral four sides of the scanner surface are constant, that is, $d_1=d_2=d_3=d_4$. Furthermore, as another example, widths of regions along longitudinal sides and widths of regions along transverse sides in FIG. 29 may be different from each other. That is, $d_1$ and $d_3$ which are the widths of the regions along the longitudinal sides may be set to be the same value ($d_1=d_3$), and $d_2$ and $d_4$ which are the widths of the regions along the transverse sides may be set to be the same value ($d_2=d_4$), in which the widths of the regions along the longitudinal sides and the widths of the regions along the transverse sides may be set to be different values ($d_1 \neq d_2$).

Since the region where the reliability is low varies according to a machine type of the scanner, the respective dimensions $d_1$, $d_2$, $d_3$, and $d_4$ that regulate the widths of the region 279 may be appropriately set according to performance of the scanner.

[Weight Reflection Method]

Next, an example of a method of reflecting "weights" in creation of a color conversion table will be described. As described in FIG. 10 and FIG. 11, when creating a color conversion table from a correspondence relationship (CMYK→Lab), there is a case where lattice points are scrambled. The "lattice points are scrambled" means a case where plural chromaticity values correspond to the same lattice point in ID=3 and ID=4 in FIG. 10, for example. In the embodiment described in FIG. 10 and FIG. 11, in a case where plural sets of chromaticity values correspond to one lattice point, since the chromaticity values of the lattice point become a simple average of the plural sets of chromaticity values, even in a case where an important color is present in a pattern, for example, the chromaticity values of the lattice point are reflected as the simple average in the color conversion table. That is, whether a color is important is not distinguished.

Thus, a configuration in which a viewpoint of a "important color" is considered in creation (correction) of the color conversion table, a "weight" according to the degree of importance is set with respect to a color extracted in a color extraction process, and the "weight" is reflected in setting or correction of Lab values of the color conversion table, may be used.

An example in which a "weight" is reflected with respect to the example described in FIG. 10 and FIG. 11 is shown in FIG. 30. In the case of the simple average Lab values in ID=3 and ID=4, Lab=(7.15, 2.5, −23).

On the other hand, if weighted average Lab values in ID=3 and ID=4 are calculated using the weight setting shown in FIG. 30, the weighted average Lab=$(w_3 \times Lab_3 + w_4 \times Lab_4)/(w_3+w_4)$=(7.11, 7.8, −20.5). Here, $w_3$ represents a weighting factor of ID=3, and $Lab_3$ represents Lab values of ID=3. $w_4$ represents a weighting factor of ID=4, and $Lab_4$ represents Lab values of ID=4.

In the weighted average Lab=(7.11, 7.8, −20.5), compared with the simple average Lab=(7.15, 2.5, −23), Lab values of ID=3 are preferentially used.

Furthermore, in a case where a color conversion table of an input profile is corrected by differential Lab values described in FIG. 14, similarly, weighted average Lab values of differences may be used.

FIG. 31 shows an example in which a "weight" is reflected with respect to the example described in FIG. 14. If simple average differential Lab values which are simple average values of differential Lab values of ID=3 and ID=4 are calculated based on the differential Lab values of each of ID=3 and ID=4, the simple average differential Lab values= (−0.5, 0, −1) as described above.

On the other hand, if weighted average differential Lab values which are weighted average values of the differential Lab values of ID=3 and ID=4 are calculated based on the differential Lab values of each of ID=3 and ID=4 using the weight setting shown in FIG. 31, weighted averaged differential Lab=$(w_3 \times \Delta Lab_3 + w_4 \times \Delta Lab_4)/(w_3+w_4)$=(−0.1, −2.5, 2.3). Here, $w_3$ represents a weighting factor of ID=3, and $\Delta Lab_3$ represents differential Lab values of ID=3. $w_4$ represents a weighting factor of ID=4, and $\Delta Lab_4$ represents differential Lab values of ID=4.

In the weighted average differential Lab=(−0.1, −2.5, 2.3), compared with the simple average differential Lab=(−0.5, 0, −1), the differential Lab values of ID=3 are reflected with a high degree of importance.

[Extraction of White Point]

When the target printed matter 42 or the printed matter 50 is read by the image reading unit 30, there is a case where coloring occurs in a region of a white sheet where printing is not performed in a read image due to the influence of peripheral colors in a printed image. Thus, it is preferable to extract a white color in a specific region where peripheral colors are not adjacent thereto as a "margin". Information about the margin extracted from the specific region is used for a white point "wtpt" which represents profile tag information.

As a method of acquiring the information about the white point from the region where colors are not adjacent thereto, similar to the case of the weighting of the region-of-interest described in FIG. 28, a value of a central cell "A" in a case where adjacent cells (lattice regions) having the same size as that of the region-of-interest may be used as the white point.

Here, it is preferable that the region-of-interest when the white point is extracted has a sufficiently large size compared with the region-of-interest used in the color extraction process and the weighting process described in FIG. 23 to FIG. 31. While the size of the region-of-interest used in the color extraction process and the weighting process described in FIG. 23 to FIG. 31 is set so that the size of a side thereof is several millimeters [mm], but it is preferable that the size of the region-of-interest used for extraction of the white point is set so that the size of a side thereof is several centimeters [cm].

As another method of acquiring information about a white point from a region where peripheral colors are not adjacent thereto, an average value in lattice regions close to the center of a white region having a maximum area or a white region having a maximum peripheral length, among plural white regions included in document image data, may be used as the white point. The "lattice regions close to the center" may be replaced with a lattice region which is closest to the center.

Figure 32:
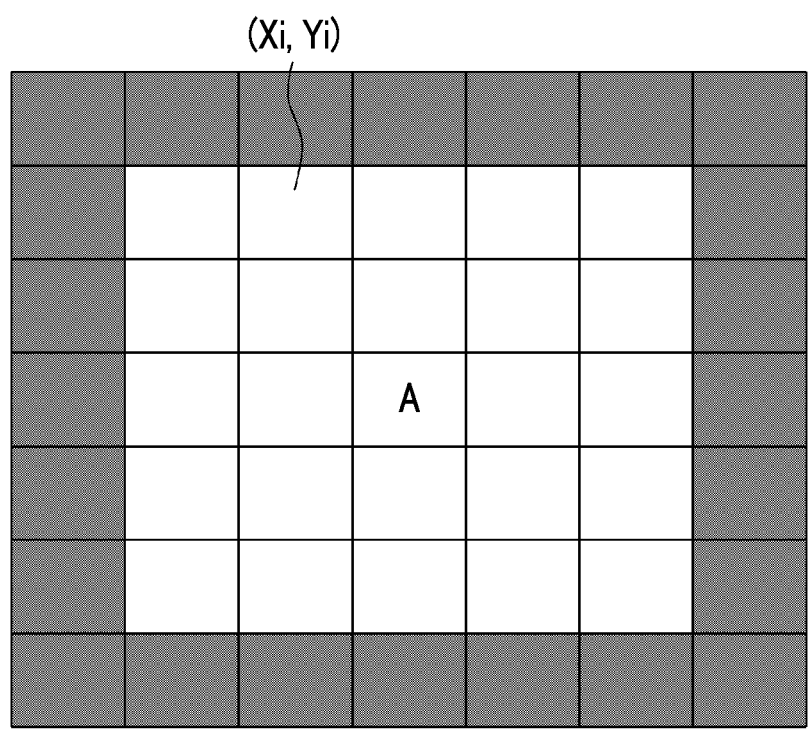
FIG. 32 is a diagram for explaining a method of calculating the center of a white region.

A method of calculating the center of a white region will be described with reference to FIG. 32. In FIG. 32, a range of 7×7 lattice regions (pixels) is shown, in which white regions correspond to a range of 5×5 lattice regions (pixels).

In a case where the white regions are configured by only total n pixels, when a pixel position of each white pixel is represented as $(X_i, Y_i)$, a central position of the white regions may be calculated according to the following expression.

$$\left( \frac{1}{n}\sum_{i=0}^{n-1} X_i, \frac{1}{n}\sum_{i=0}^{n-1} Y_i \right)$$

As another example relating to the white point extraction method, the following methods may be employed.

Modified Example 1

As a method for a case where a portion corresponding to a margin is not present on the entire surface of a printed matter which is a scanning target, a configuration in which margin colorimetric values for each representative sheet category or each individual sheet brand are stored in advance or are measured to become a database in advance and a user selects margin colorimetric values of the same sheet category or the same sheet brand as a target printed matter may be used. The representative sheet category includes gloss coated paper, matt coated paper, pure paper, or the like, for example. The margin colorimetric values may be determined in advance with respect to each of the plural sheet categories.

Modified Example 2

In a case where a margin portion is present in a printed matter, it is possible to color-measure the margin from the printed matter. That is, by color-measuring the margin portion of the printed matter by the colorimeter 32, margin colorimetric values may be acquired. Alternatively, if the same sheet as the printed matter is present at hand, the sheet may be color-measured to acquire margin colorimetric values.

Modified Example 3

A configuration in which a margin is automatically extracted from the entirety of a read image (not from the specific region where peripheral colors are not adjacent thereto) may be used. For example, read image signal values of a read image after positioning, corresponding to all pixels where (C, M, Y, K)=(0, 0, 0, 0) on a document image or a region-of-interest are extracted, and a central value of the extracted read image signal values for each channel is employed as margin information.

In a case where the read image signal values are RGB values, a central value for each channel is calculated with respect to each channel of R, G and B. Further, if the RGB values as the read image signal values are completely converted into Lab values using a scanner profile, a central value for each channel is calculated with respect to each channel of L, a and b. The obtained central value of the read image signal values for each channel may be employed as margin information. Instead of the "central value" for each channel, an "average value" for each channel may be used.

XYZ values of a margin are used in a white point "wtpt" which indicates profile tag information. That is, the acquired margin information or margin colorimetric values are converted into XYZ values to be used.

[Feedback Adjustment in Third Color Conversion Table Creation Unit 102]

The third color conversion table creation unit 102 shown in FIG. 5 corrects a color conversion table in the second color conversion table 80 based on CMYK-Lab correspondence relationship data (referred to as "first CMYK-Lab data") created from the document image data 40 and a read image of the target printed matter 42 and CMYK-Lab correspondence relationship data (referred to as "second CMYK-Lab data") created from a read image of an actual printed matter 50 and the document image data 40. Such a correction process is referred to as "feedback adjustment".

In the case of the configuration described in FIG. 5, a process of creating the first CMYK-Lab data and a process of creating the second CMYK-Lab data are independently performed, and a color extraction process is also independently performed in the respective processes. Accordingly, there may be a case where the first CMYK-Lab data does not necessarily correspond to the second CMYK-Lab data.

Thus, it is also preferable that a configuration in which a process of confirming whether the CMYK-Lab data corresponds to the second CMYK-Lab data is added and only data of which CMYK values match each other among both of the first CMYK-Lab data and the second CMYK-Lab data is used in the feedback adjustment is used.

That is, a configuration in which an "extraction data association process" of extracting only the data of which the CMYK values match each other among a CMYK-Lab extraction data group extracted in the creation of the first CMYK-Lab data and a CMYK-Lab extraction data group extracted in the creation of the second CMYK-Lab data is performed may be used.

An extraction data association processing unit which is a processing unit that performs the extraction data association process may be provided between the first color conversion unit 64 and the third color conversion table creation unit 102 shown in FIG. 5, that is, between an output end of the first color conversion unit 64 and an input end of the third color conversion table creation unit 102. Alternatively, the extraction data association processing unit may be mounted as a part of the functions of the third color conversion table creation unit 102.

The process of the extraction data association may be added as preprocessing of step S146 in FIG. 6.

[Method of Reducing Calculation Load for Positioning]

A large size image or a high resolution image demands a large calculation load when performing a positioning process and a large capacity memory area. Accordingly, in order to reduce the calculation load, when performing a positioning process of a document image and a read image, a configuration in which two processes of a positioning process using a minified picture and a positioning process using a segment image are dividedly performed to perform the positioning process may be used. The minified picture may be generated by reducing the size of document image data at a uniform rate. The segment image refers to a partial image obtained by extracting a part of an original image.

Since the positioning process using the minified picture has low positioning accuracy, a positioning process with high accuracy is performed using the segment image which is the partial image of the original image after the positioning process using the minified picture. By performing the positioning processes in stages, it is possible to reduce the calculation load.

Alternatively, a configuration in which, an original image is divided into plural image regions, a positioning process and a color extraction process are performed with respect to each of the divided images, and results obtained for the respective divided images are combined to obtain information about the entire image may also be used.

[Countermeasure for Surface Treatment]

For example, document image data for package printing used in a package, a container or the like includes a color data layer indicating image content for printing, a cutting line layer indicating a cutting line after printing, and a surface treatment layer indicating content of surface treatment of a printing surface. As an example, in an ai format of ADOBE ILLUSTRATOR (registered trademark) of Adobe Systems Incorporated, a color data layer, a cutting line layer, and a surface treatment layer are retained as layers in a single file.

The surface treatment includes processing for forming a protective film on a printing surface by application of clear ink and/or varnish or the like. Even though CMYK values specified in the color data layer are the same, colors may differently appear according to the presence or absence of the surface treatment. That is, even in a case where reading is performed by the image reading unit 30 such as a scanner, different RGB values may be obtained according to the presence or absence of the surface treatment.

Accordingly, when acquiring color information from a read image of the target printed matter 42 or the printed matter 50, it is preferable to perform color extraction using information relating to surface treatment.

The information relating to the surface treatment at least includes information for specifying the presence or absence of the surface treatment. Color extraction is performed using any information of "surface treatment" information or "non-surface treatment" information.

Specifically, the following correspondence may be used.

[1] In a case where the entire surface of a printing surface is surface-treated, it is possible to use a color data layer of document image data as it is.

[2] In a case where the printing surface is partially surface-treated, the following two correspondences may be used.

[2-1] Color extraction is performed using color data in a region where surface treatment is not present. That is, the color extraction is performed using color data obtained by excluding a region where a surface treatment layer and a color data layer overlap each other from a color data layer.

[2-2] Color extraction is performed using color data in a region where surface treatment is present. That is, the color extraction is performed using color data in a region where a color data layer and a surface treatment layer overlap each other.

Even in any case of the above-described [2-1] and [2-2], a positioning process of document image data and read image data is performed using the entire color data layer.

Figure 33:
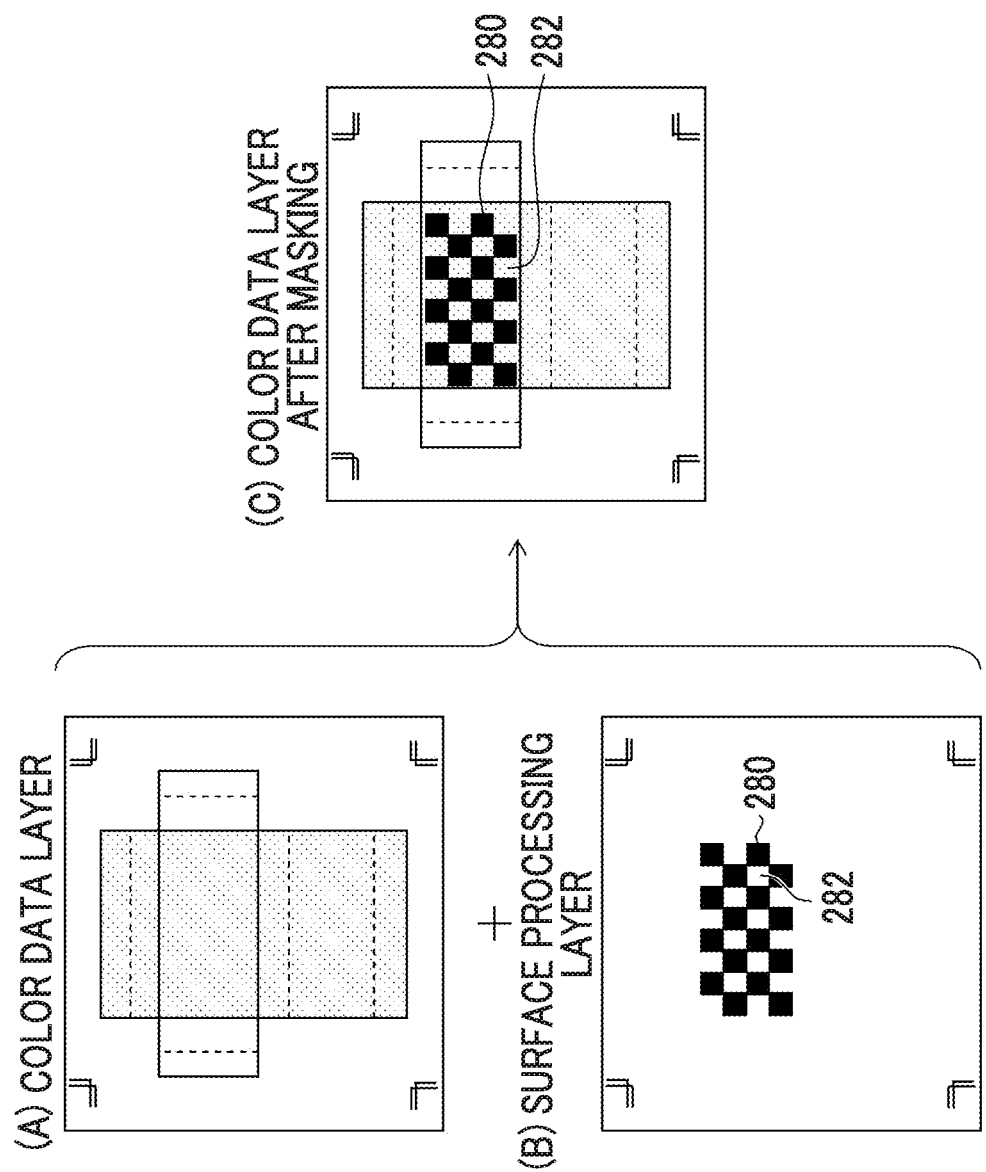
FIG. 33 is a schematic diagram showing an example of document image data for package printing.

FIG. 33 is a schematic diagram showing an example of document image data for package printing. FIG. 33(A) is a diagram showing a data example of a color data layer, and FIG. 33(B) is a diagram showing a data example of a surface treatment layer. FIG. 33(C) is a diagram showing a state where the color data layer and the surface treatment layer overlap each other.

Here, for ease of description, a cutting line layer is not shown. With respect to FIG. 33(C), it may be interpreted that a mask of the surface treatment layer overlaps color data, FIG. 33(C) is expressed as a "color data layer after masking".

In FIG. 33(B), a black region (reference numeral 280) colored in black represents a region where surface treatment is performed (corresponding to a "surface treatment region where surface treatment is present"), and represents a region where clear ink is applied for surface treatment in this example. A non-black region (reference numeral 282) which is not colored in black of FIG. 33(B) represents a region where the surface treatment is not performed (corresponding to a "non-surface treatment region where surface treatment is not present"), and represents a region (non-application region) where clear ink is not applied for surface treatment in this example.

Figure 34:
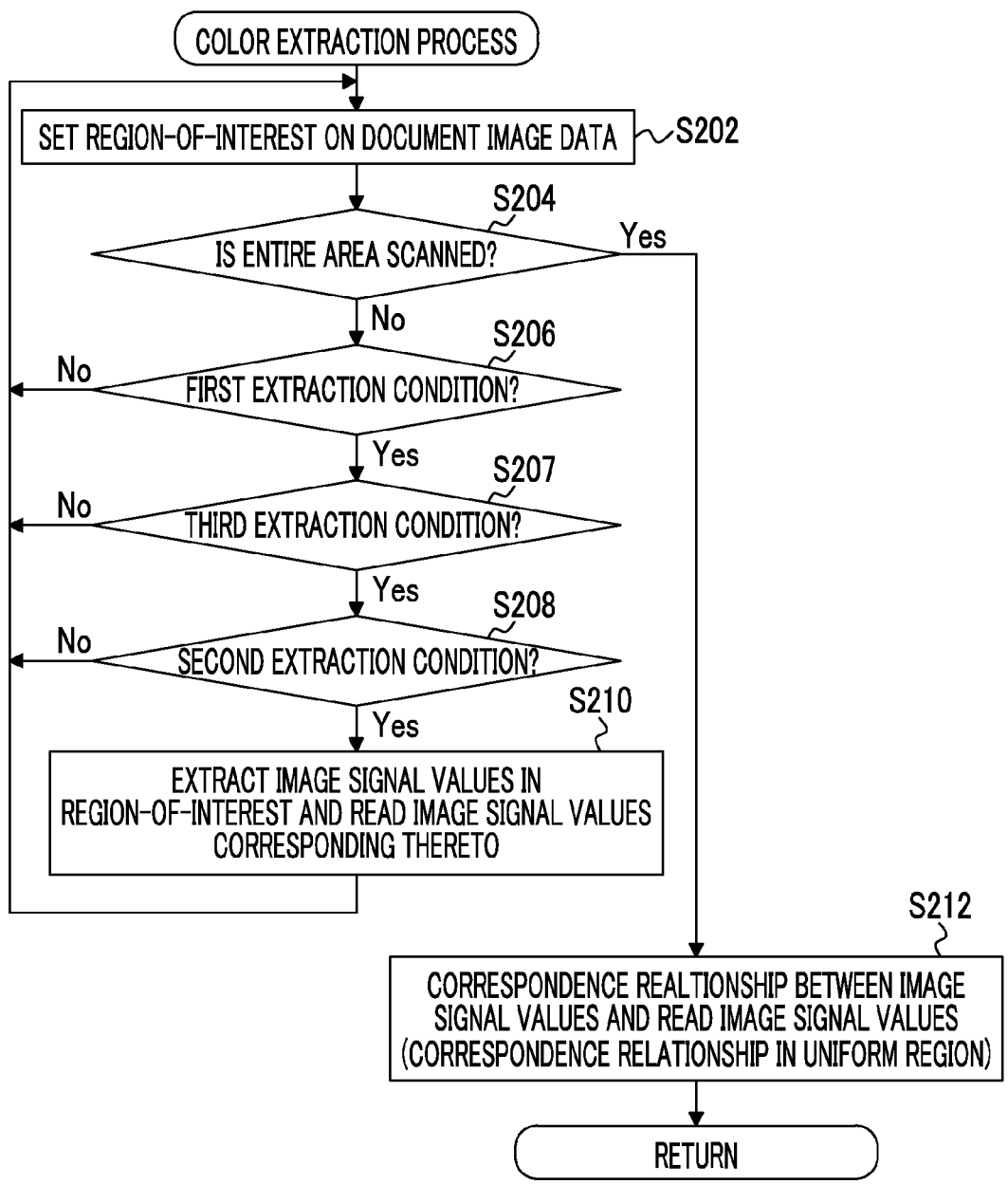
FIG. 34 is a flowchart of a color extraction process in which the presence or absence of surface treatment is added to a color extraction condition.

FIG. 34 is a flowchart of a color extraction process in which the presence or absence of surface treatment is added to a color extraction condition. In the flowchart shown in FIG. 34, the same step numbers are given to the same or similar processes as the processes described in the flowchart described in FIG. 23, and description thereof will not be repeated. Instead of the color extraction process described in FIG. 23, a color conversion process shown in FIG. 34 may be employed.

In the flowchart of the color extraction process shown in FIG. 34, a process (step S207) of determining whether the third extraction condition is satisfied is added between step S206 and step S208 described in FIG. 23.

The third extraction condition may perform two following condition settings (condition setting 1 and condition setting 2) according to whether a color is extracted from a region where surface treatment is not present or is extracted from a region where the surface treatment is present.

That is, a condition of there being a "non-surface treatment region where surface treatment is not present" may be determined as the condition setting 1 of the third extraction condition. Further, a condition of there being a "surface treatment region where surface treatment is present" may be determined as the condition setting 2 of the third extraction condition.

The condition setting 1 and the condition setting 2 are set by exclusive selection. A configuration in which a user designates selection of whether to employ the condition setting 1 or the condition setting 2 through a user interface may be used. Further, with respect to the selection of whether to employ the condition setting 1 or the condition setting 2, a configuration in which an automatic selection process of selecting the condition setting 1 or the condition setting 2 is performed to extract a color from a larger area among the area of color data including surface treatment and the area of color data that does not include surface treatment based on analysis of document image data may be used. A function of the automatic selection process may be mounted as the function of the image processing unit 24 and/or the control unit 26 shown in FIG. 1.

In a case where the third extraction condition is determined as the condition setting 1, a region where surface treatment is not present becomes a color extraction target. In the example shown in FIG. 33(C), a region (non-black region 282) other than the black region 280 becomes the color extraction target.

On the other hand, in a case where the third extraction condition is determined as the condition setting 2, a region where surface treatment is present becomes a color extraction target. In the example shown in FIG. 33(C), the black region 280 becomes the color extraction target.

According to a flowchart shown in FIG. 34, color information is acquired from a region-of-interest that satisfies all of the first extraction condition, the third extraction condition and the second extraction condition.

An embodiment in which the process of step S208 in the flowchart in FIG. 34 is omitted may be used.

[In a Case where Camera is Used in Image Reading Unit]

In a case where a camera is used in image reading, there is a possibility that irregularity occurs in a read image due to irregularity of light that reaches a printed matter. As the light that reaches the printed matter, ambient light, illumination light, or a combination thereof may be present. In order to solve a problem that there is a possibility that irregularity occurs in a read image acquired by the camera due to irregularity of such light that reaches the printed matter, in a case where the camera is used in the image reading unit 30 (see FIG. 1), it is preferable to perform shading correction together.

A captured image obtained by the camera corresponds to a "read image". The term "captured" may be understood as a synonym of "imaged". The camera includes a two-dimensional image sensor which is an imaging element, and converts a captured optical image into electronic image data to generate captured image data which corresponds to a color image indicating a captured image. A specific form of the camera is not particularly limited. The camera may be an imaging device of a single plate type in which color filters of R, G, and B are arranged in a mosaic form corresponding to respective photosensitive pixels of a light receiving surface of a two-dimensional image sensor, or may be an imaging device of a three-plate type that comprises a two-dimensional image sensor for each channel of R, G, and B with respect to a color separation optical system that separates incident ray into color components of R, G, and B and each channel of R, G, and B.

As an example of the shading correction, for example, the following correction method may be used. The shading correction method is not limited to the following methods, and may employ other known shading correction methods.

The example of the shading correction method includes a process of preparing shading data and a process of performing shading correction using the shading data.

(1) Shading Data Preparation Process

In a shading data preparation process, first, a non-printed sheet is placed at an "installation position of an imaging target" which is a position where a target printed matter is to be placed when imaging the printed matter using a camera, and then, the non-printed sheet is imaged by the camera. From non-printed sheet capturing image data which is image data obtained by imaging the non-printed sheet by the camera, a maximum luminance value Lmax in the non-printed sheet capturing image data is calculated. Thus, shading data SHD (x, y) is calculated using the following expression.

$$SHD(x,y) = L\max / L(x,y)$$

Here, x and y represent the positions of a pixel, and L (x, y) represents a luminance value in a pixel at a position (x, y).

(2) Shading Correction Execution Process

In the shading correction execution process, the shading data SHD (x, y) is applied to camera-captured image data which is image data obtained by capturing a printed matter using the camera, and shading correction is performed according to the following expression.

$$Dout(x,y) = SHD(x,y) \times Din(x,y)$$

Here, Din (x, y) represents input image data, and represents the camera-captured image data obtained by capturing the printed matter using the camera.

Dout (x, y) represents output image data of the shading correction, and represents image data after the shading correction with respect to the camera-captured image data.

A function of generating shading data from the non-printed sheet captured image data and a function of performing the shading correction of the camera-captured image data using the shading data may be provided in the image processing unit 24 (see FIG. 1). That is, the image processing unit 24 may be configured to include a shading data generation unit and a shading correction unit. Further, the shading data generation function and the shading correction function may also be provided in an image processing circuit in the camera.

In the case of a scanner, generally, since shading correction is performed on a body side of the scanner, it is considered that it is not necessary to perform separate shading correction with respect to image data obtained by scanning.

[Configuration in which Inline Sensor is Used in Image Reading Unit]

Figure 35:
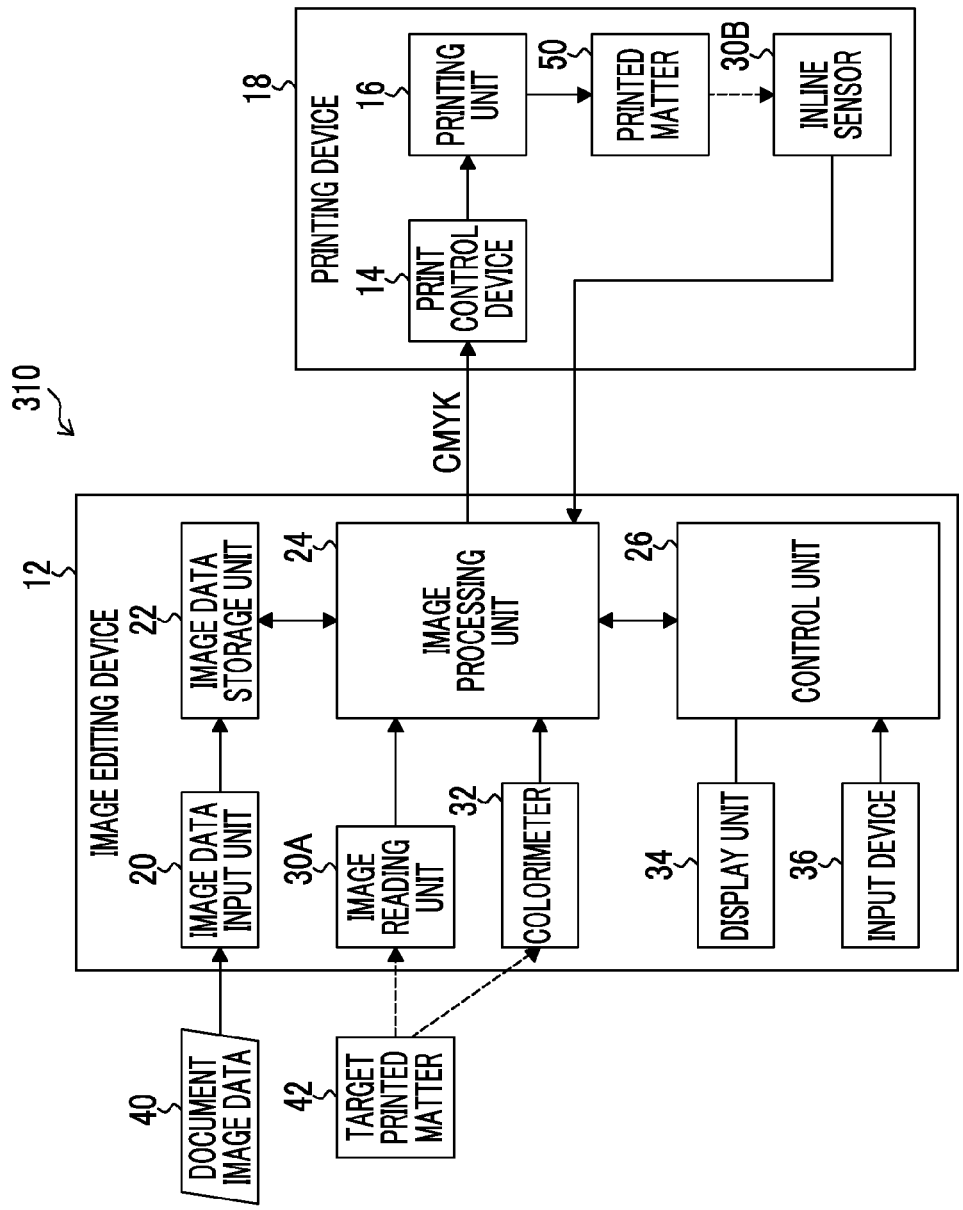
FIG. 35 is a block diagram showing a system configuration of a printing system according to another embodiment of the invention.

FIG. 35 is a block diagram showing a configuration of a printing system according to another embodiment of the invention. In the configuration shown in FIG. 35, the same reference numerals are given to the same or similar components as in the configuration described in FIG. 1, and description thereof will not be repeated.

A printing system 310 shown in FIG. 35 comprises an image reading unit 30A which is a first image reading unit that reads a target printed matter 42. The image reading unit 30A has the same configuration as that of the image reading unit 30 described in FIG. 1. The image reading unit 30A may employ a scanner (for example, a so-called online scanner which is usable online, such as a flat-head type scanner) or a camera which is provided separately from the printing device 18.

Further, the printing device 18 in the printing system 310 shown in FIG. 35 comprises an inline sensor 30B which is a second image reading unit that reads a printed matter 50. The inline sensor 30B that functions as the second image reading unit is an image reading device of a printer-built-in type, incorporated in the printing device 18. For example, the printing device 18 has a configuration in which a line sensor which is an imaging unit for image reading is provided on a sheet transportation path and a printed image is read by the line sensor while transporting a printed matter where an image is formed. The inline sensor 30B in this example is a line sensor for image reading provided on the sheet transportation path of the printing device 18. That is, the inline sensor 30B includes a photoelectric conversion element array (reading pixel array) capable of reading an image corresponding to a sheet width on a sheet in a batch (by one-time paper feeding) in a sheet width direction that is orthogonal to a sheet transportation direction, and is provided on the sheet transportation path. The term "inline sensor" may be referred to as an "inline scanner".

As the inline sensor 30B, an imaging device capable of performing color separation, such as a 3CCD color line sensor in which charge-coupled-device (CCD) line sensors having channels of respective RGB colors are arranged may be used, for example. By using the color imaging device, it is possible to read color information from the printed matter 50 of the printing device 18.

An image on the printed matter 50 is read by the inline sensor 30B while transporting the printed matter 50 printed by the printing unit 16 of the printing device 18 in one direction, and is then converted into an image signal. Thus, electronic image data of the read image read by the inline sensor 30B is generated.

In a case where the inline sensor 30B is built into the printing device 18, the inline sensor 30B of the printing device 18 may be used for reading of the printed matter 50 printed by the printing device 18. In this case, in order to convert RGB signal values acquired by the inline sensor 30B into device-independent signal values (for example, Lab values), it is necessary that a profile of the inline sensor 30B is separately prepared. Information acquired by the inline sensor 30B is transmitted to the image processing unit 24.

Figure 36:
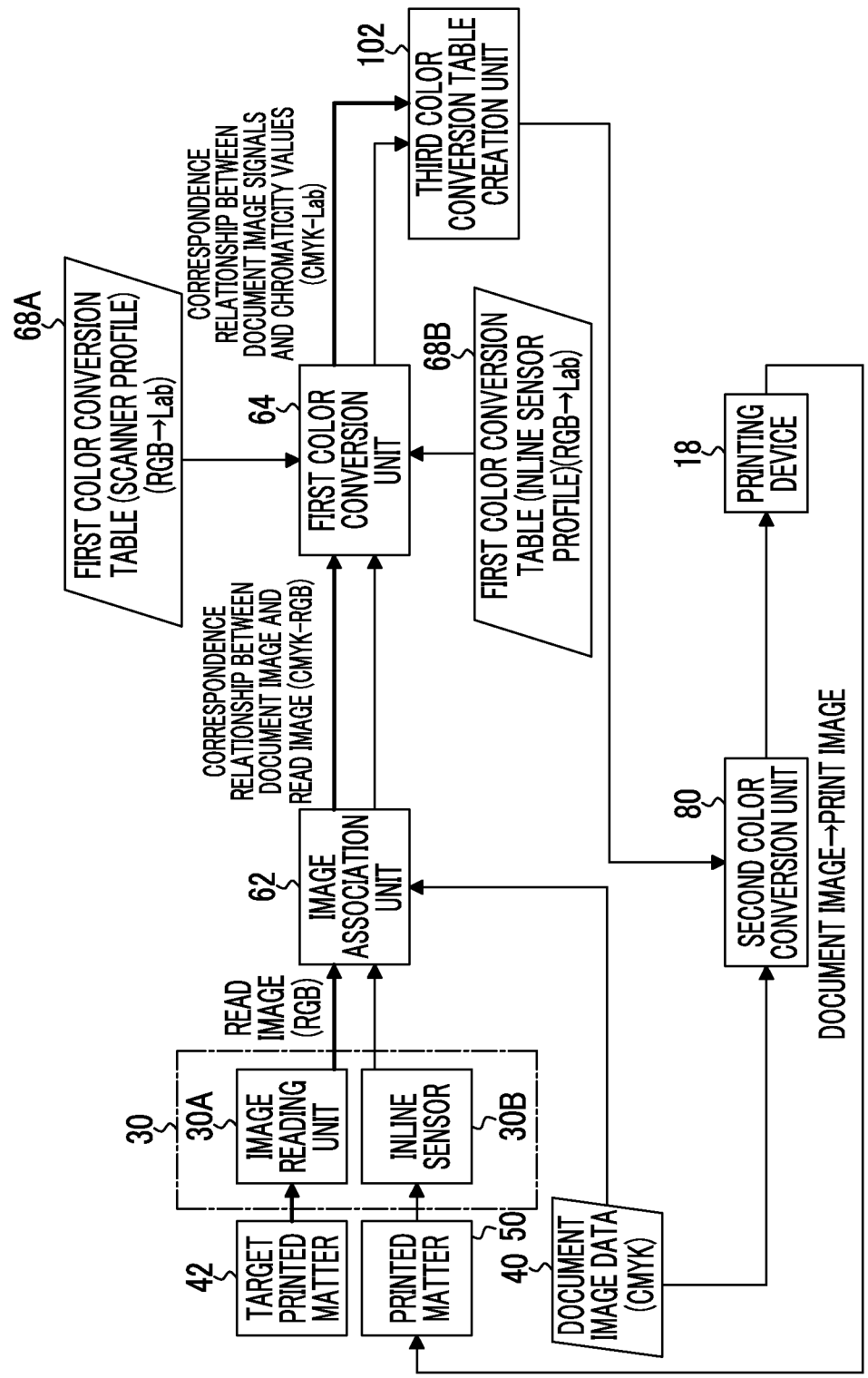
FIG. 36 is a block diagram showing a second main configuration in the printing system shown in FIG. 35.

FIG. 36 is a replaced block diagram corresponding to FIG. 5. In the case of the printing system 310 described in FIG. 35, the block diagram shown in FIG. 36 instead of the block diagram shown in FIG. 5 is used. In FIG. 36, the same reference numerals are given to the same or similar configuration as in the configuration described in FIG. 5, and description thereof will not be repeated.

As shown in FIG. 36, the target printed matter 42 is read by the image reading unit 30A. On the other hand, the printed matter 50 printed by the printing device 18 is read by the inline sensor 30B. RGB values of a read image obtained by the inline sensor 30B are converted into Lab values using the first color conversion table 68B which is a profile of the inline sensor 30B in the first color conversion unit 64. Other configurations are similar to the example described in FIG. 5.

As shown in FIG. 35 and FIG. 36, different image reading devices may be used for reading the target printed matter 42 and the printed matter 50 from the printing device 18, respectively. That is, it may be understood that a combination of the image reading unit 30A that reads the target printed matter 42 and the inline sensor 30B that reads the printed matter 50 from the printing device 18 corresponds to an "image reading unit" as a whole.

In the image reading unit 30 in the configuration described in FIG. 18, FIG. 20 and FIG. 22, a combination of the image reading unit 30A that reads the target printed matter 42 and the inline sensor 30B that reads the printed matter 50 may be employed, similar to the configuration described in FIG. 36.

Further, the second image reading unit used for reading of the printed matter 50 of the printing device 18 is not limited to the inline sensor 30B, and may employ an online scanner or a camera, similar to the first image reading unit used for reading of the target printed matter 42. That is, the first reading unit used for reading the target printed matter 42 and the second image reading unit used for reading the printed matter from the printing device 18 may be configured to have separate device configurations, or may be configured to have a single device configuration to be used together in both of the first image reading unit and the second image reading unit.

<Program that Causes Computer to Function as Color Conversion Table Creation Device>

A configuration in which a program for causing a computer to function as the color conversion table creation device described in the above-described embodiments is recorded on a compact disc read-only memory (CD-ROM), a magnetic disc, or another computer-readable medium (a non-transitory information storage medium which is a tangible object) and the program is provided through the information storage medium may be used. Instead of the configuration in which the program is stored in the information storage medium is provided therethrough, a configuration in which a program signal is provided as download service using a communication network such as the Internet may be used.

Further, by incorporating the program into the computer, it is possible to cause the computer to realize respective functions of the color conversion table creation device, to thereby perform the color conversion table creation process, the color conversion process, or the like, described in the above-described embodiments.

Modification Example of Embodiments

The configuration examples relating to the first main configuration and the additional configuration described in FIG. 3, FIG. 4, FIG. 17, FIG. 19, and FIG. 21 and the configuration examples relating to the second main configuration and the additional configuration described in FIG. 5, FIG. 13, FIG. 18, FIG. 10, FIG. 22, and FIG. 36 may be appropriately combined.

Advantages of Embodiments (1) According to the first main configuration, it is possible to read the target printed matter 42 by the image reading unit 30 to acquire chromaticity values, and to create a color conversion table (second color conversion table 92A) of a target profile from the target printed matter 42. That is, without performing printing of the printed matter 50 and reading of the printed matter 50, it is possible to create a color conversion table of the target profile based on the document image data 40 and read image data of the target printed matter 42.

According to the first main configuration, when creating the target profile, it is possible to reduce a work load for printing or reading of a printed matter in the printing device 18.

(2) According to the second main configuration, it is possible to correct a provisional input color conversion table, to correct an output color conversion table, or to create a color correction table, based on chromaticity values of a target printed matter acquired by reading the target printed matter 42 by the image reading unit 30 and chromaticity values of a printed matter obtained by reading a printed matter printed through color-conversion using a temporary input color conversion table by the image reading unit 30. Thus, it is possible to optimize a color conversion table to be applied to the second color conversion unit 80, to thereby enhance the accuracy of color conversion.

In addition, by repeating these processes, it is possible to make a color of a printed matter closer to a color of the target printed matter 42.

Furthermore, according to the second main configuration shown in FIG. 36, it is possible to correct a provisional input color conversion table, to correct an output color conversion table, or to create a color correction table, based on chromaticity values of a target printed matter acquired by reading the target printed matter 42 by the image reading unit 30A and chromaticity values of a printed matter obtained by reading a printed matter printed through color-conversion using a temporary input color conversion table by the inline sensor 30B. Thus, it is possible to optimize a color conversion table to be applied to the second color conversion unit 80, to thereby enhance the accuracy of color conversion.

Further, by repeating these processes, it is possible to make a color of a printed matter closer to a color of the target printed matter 42.

(3) By using the second color conversion table 92A created by the first main configuration as a first input color conversion table in the second main configuration, it is possible to optimize the accuracy of color reproduction in first printing, and to thereby increase the speed of convergence of color matching.

(4) According to these embodiments, since a color conversion table indicating a multi-dimensional correspondence relationship of chromaticity values corresponding to the document image data 40 is created to perform color matching of a target printed matter and a printed matter, it is possible to enhance the degree of freedom in color correction to secure color correction (color matching) with higher accuracy, compared with a related art method. According to these embodiments, even in a case where color reproduction characteristics of a printer that outputs the target printed matter and color reproduction characteristics of the printing device 18 used for printing of the printed matter 50 are very different from each other, it is possible to obtain sufficient color matching accuracy.

(5) By employing the image association unit 62 including the document correspondence extraction unit 130 described in FIG. 9, it is possible to perform color matching even in a case where there is not a one-to-one correspondence in the document image data 40 and a print image of the target printed matter 42.

(6) By employing a configuration in which the colorimeter 32 is used together, it is possible to reduce an estimation error in chromaticity values acquired by the image reading unit 30, to thereby enhance color matching accuracy.

(7) According to these embodiments, even in a case where a color reproduction target is designated as an actual printed matter (target printed matter), it is possible to create an appropriate color conversion table, and to achieve color management using an ICC profile. Furthermore, it is possible to enhance the efficiency of a color matching process with respect to the target printed matter.

The above-described embodiments of the invention may include appropriate changes, additions, or deletions of components in a range without departing from the spirit of the invention. The invention is not limited to the above-described embodiments, and may be variously modified by those skilled in the art in a technical scope of the invention.

EXPLANATION OF REFERENCES

10: printing system
12: image editing device
18: printing device
20: image data input unit
24: image processing unit
26: control unit
30: image reading unit
30A: image reading unit
30B: inline sensor
32: colorimeter
34: display unit
36: input device
40: document image data
42: target printed matter
50: printed matter
62: image association unit
64: first color conversion unit
66: target profile creation unit
66A: second color conversion table creation unit
68A, 68B: first color conversion table
70: color measurement position association u nit
72: first profile correction unit
74: chromaticity value replacement unit
80: second color conversion unit
82: second profile correction unit
84: differential colorimetric value calculation unit
102: third color conversion table creation unit
120: read image data
130: document correspondence image extraction unit
140: read document image data
160: color conversion table database
162: input color conversion table selection unit
166: input profile color conversion table
168: output profile color conversion table
170: printing image data
240: color measurement target document image signal acquisition unit
242: color measurement target read image signal acquisition unit
250: color conversion table database
252: first color conversion table selection unit
254: first color conversion table correction unit
310: printing system

What is claimed is:

1. A color conversion table creation device comprising:
an image reading unit that reads a target printed matter and a printed matter printed by a printing device to acquire read image data indicating a read image of each of the target printed matter and the printed matter;
a first color conversion unit that converts, using a first color conversion table indicating a correspondence relationship between a signal value in a first color space acquired by the image reading unit and a chromaticity value in a second color space which is a device-independent color space, the signal value in the first color space into the chromaticity value in the second color space;
a second color conversion unit that color-converts document image data into print image data using an input color conversion table and an output color conversion table;
an image association unit that performs an association process for a positional relationship between printed matter read image data indicated by the signal value in the first color space obtained by reading the printed matter printed by the printing device according to the print image data by the image reading unit and the document image data and an association process for a positional relationship between target printed matter read image data indicated by the signal value in the first color space obtained by reading the target printed matter by the image reading unit and the document image data, or performs an association process for a positional relationship between printed matter read chromaticity value image data obtained by converting a signal value of the printed matter read image data into a chromaticity value in the second color space by the first color conversion unit and the document image data and an association process for a positional relationship between target printed matter read chromaticity value image data obtained by converting a signal value of the target printed matter read image data into a chromaticity value in the second color space by the first color conversion unit and the document image data; and a color conversion table creation unit that creates a color conversion table used in the second color conversion unit from a correspondence relationship between the document image data indicated by a signal value in a third color space which is a device-dependent color space, and a chromaticity value of the target printed matter and a chromaticity value of the printed matter obtained through processes in the image association unit and the first color conversion unit, based on a difference between the chromaticity value of the target printed matter and the chromaticity value of the printed matter.

2. The color conversion table creation device according to claim 1, wherein the color conversion table creation unit creates the color conversion table used in the second color conversion unit by correcting the input color conversion table or the output color conversion table based on the correspondence relationship between the document image data, the chromaticity value of the target printed matter, and the chromaticity value of the printed matter.

3. The color conversion table creation device according to claim 1, wherein the color conversion table creation unit creates a color correction table for correcting an output value of the input color conversion table based on the correspondence relationship between the document image data, the chromaticity value of the target printed matter, and the chromaticity value of the printed matter.

4. The color conversion table creation device according to claim 1, further comprising:

an input color conversion table database in which a plurality of input color conversion tables having different color reproduction characteristics is stored; and an input color conversion table selection unit that performs a process of selecting one input color conversion table to be applied to the second color conversion unit from the plurality of input color conversion tables stored in the input color conversion table database based on the correspondence relationship between the document image data and the chromaticity value of the target printed matter.

5. The color conversion table creation device according to claim 1, further comprising:

a color measurement unit that performs color measurement with respect to a color measurement target which is at least one of the target printed matter, the printed matter, or a color sample which is different from the target printed matter and the printed matter to acquire a colorimetric value of the color measurement target; and a color measurement target image signal acquisition unit that includes at least one of a color measurement target document image signal acquisition unit that acquires a document image signal corresponding to a position on the document image data of which a colorimetric value is acquired by the color measurement unit or a color measurement target read image signal acquisition unit that acquires a read image signal corresponding to the position on the read image data of which the colorimetric value is acquired by the color measurement unit.

6. The color conversion table creation device according to claim 5, further comprising:

a chromaticity value replacement unit that replaces a chromaticity value corresponding to the position on the document image data of which the colorimetric value is acquired by the color measurement unit with the colorimetric value acquired by the color measurement unit, with respect to a color conversion result by the first color conversion unit.

7. The color conversion table creation device according to claim 5, further comprising:

a first color conversion table database in which a plurality of color conversion tables capable of being applied as the first color conversion table is stored; and a first color conversion table selection unit that selects one color conversion table from the plurality of color conversion tables stored in the first color conversion table database, wherein the plurality of color conversion tables includes a color conversion table indicating a correspondence relationship between a reading signal and a chromaticity value of the image reading unit for each combination of types of coloring materials and base materials to be used in creation of a printed matter in the printing device, and wherein the first color conversion table selection unit selects one color conversion table from the plurality of color conversion tables based on a correspondence relationship between the read image signal corresponding to the position on the document image data of which the colorimetric value is acquired by the color measurement unit and the colorimetric value acquired by the color measurement unit.

8. The color conversion table creation device according to claim 5, further comprising:

a first color conversion table correction unit that corrects the first color conversion table based on the correspondence relationship between the read image signal corresponding to the position on the document image data of which the colorimetric value is acquired by the color measurement unit and the colorimetric value acquired by the color measurement unit.

9. The color conversion table creation device according to claim 1, further comprising:

a second color conversion table creation unit that creates a second color conversion table indicating a multi-dimensional correspondence relationship between the third color space and the second color space of the document image data based on the correspondence relationship between the document image data indicated by the signal value in the third color space which is the device-dependent color space and the chromaticity value of the read image of the target printed matter obtained through the processes in the image association unit and the first color conversion unit, wherein the second color conversion table created by the second color conversion table creation unit is used as the input color conversion table of the second color conversion unit.

10. The color conversion table creation device according to claim 1,
wherein the image association unit includes an image extraction unit that performs a process of extracting a partial image corresponding to the document image data from the read image data.

11. The color conversion table creation device according to claim 1,
wherein the image association unit performs a color extraction process of extracting, from each of the document image data and the read image data subjected to the association process for the positional relationship, color information corresponding thereto.

12. The color conversion table creation device according to claim 11,
wherein the color extraction process includes
a process of setting a region-of-interest in the document image data,
a process of determining whether the region-of-interest satisfies a first extraction condition, and
a correspondence relationship color information extraction process of extracting a signal value of the document image data which is the color information from the region-of-interest that satisfies the first extraction condition and extracting a signal value of the read image data which is the color information from a region at a position corresponding to the region-of-interest that satisfies the first extraction condition in the read image data subjected to the association process for the positional relationship.

13. The color conversion table creation device according to claim 12,
wherein the first extraction condition includes a condition that a difference between colors in the region-of-interest is equal to or smaller than a first extraction threshold value which is regulated for an allowable range.

14. The color conversion table creation device according to claim 12,
wherein the color extraction process includes a process of determining whether the region-of-interest satisfies a second extraction condition, and
wherein the color extraction process includes, as the correspondence relation color information extraction process, a process of extracting a signal value of the document image data which is the color information from the region-of-interest that satisfies the first extraction condition and the second extraction condition and extracting a signal value of the read image data which is the color information from a region at a position corresponding to the region-of-interest that satisfies the first extraction condition and the second extraction condition in the read image data subjected to the association process for the positional relationship.

15. The color conversion table creation device according to claim 14,
wherein the second extraction condition includes a condition that the read image data is present in the region at the position corresponding to the region-of-interest that satisfies the first extraction condition and an image defect is not present in a region of the read image data at the position corresponding to the region-of-interest that satisfies the first extraction condition.

16. The color conversion table creation device according to claim 12,
wherein the color extraction process includes a process of determining whether the region-of-interest satisfies a third extraction condition,
wherein a process of extracting the signal value of the document image data which is the color information from the region-of-interest that satisfies the first extraction condition and the third extraction condition and extracting the signal value of the read image data which is the color information from the region at the position corresponding to the region-of-interest that satisfies the first extraction condition in the read image data subjected to the association process for the positional relationship is performed as the correspondence relationship color information extraction process, and
wherein any one of a condition of there being a non-surface treatment region where surface treatment is not present and a condition of there being a surface treatment region where the surface treatment is present is determined as the third extraction condition.

17. The color conversion table creation device according to claim 1,
wherein the image association unit performs a color extraction process of extracting, from each of the document image data and the read chromaticity value image data expressed by the chromaticity value in the second color space, subjected to the association process for the positional relationship, color information corresponding thereto.

18. The color conversion table creation device according to claim 17,
wherein the color extraction process includes
a process of setting a region-of-interest in the document image data,
a process of determining whether the region-of-interest satisfies a first extraction condition, and
a correspondence relationship color information extraction process of extracting a signal value of the document image data which is the color information from the region-of-interest that satisfies the first extraction condition and extracting a chromaticity value of the read chromaticity value image data which is the color information from a region at a position corresponding to the region-of-interest that satisfies the first extraction condition in the read chromaticity value image data subjected to the association process for the positional relationship.

19. The color conversion table creation device according to claim 18,
wherein the first extraction condition includes a condition that a difference between colors in the region-of-interest is equal to or smaller than a first extraction threshold value which is regulated for an allowable range.

20. The color conversion table creation device according to claim 18,
wherein the color extraction process includes a process of determining whether the region-of-interest satisfies a second extraction condition, and
wherein the color extraction process includes, as the correspondence relation color information extraction process, a process of extracting a signal value of the document image data which is the color information from the region-of-interest that satisfies the first extraction condition and the second extraction condition and extracting a chromaticity value of the read chromaticity value image data which is the color information from a region at a position corresponding to the region-of-interest that satisfies the first extraction condition and the second extraction condition in the read chromaticity value image data subjected to the association process for the positional relationship.

21. The color conversion table creation device according to claim 20,
wherein the second extraction condition includes a condition that the read image data is present in the region at the position corresponding to the region-of-interest that satisfies the first extraction condition and an image defect is not present in a region of the read image data at the position corresponding to the region-of-interest that satisfies the first extraction condition.

22. The color conversion table creation device according to claim 18,
wherein the color extraction process includes a process of determining whether the region-of-interest satisfies a third extraction condition,
wherein a process of extracting the signal value of the document image data which is the color information from the region-of-interest that satisfies the first extraction condition and the third extraction condition and extracting the chromaticity value of the read image chromaticity value data which is the color information from a region at a position corresponding to the region-of-interest that satisfies the first extraction condition and the third extraction condition in the read chromaticity value image data subjected to the association process for the positional relationship is performed as the correspondence relationship color information extraction process, and
wherein any one of a condition of there being a non-surface treatment region where surface treatment is not present and a condition of there being a surface treatment region where the surface treatment is present is determined as the third extraction condition.

23. The color conversion table creation device according to claim 1, further comprising:
a first image reading unit that reads the target printed matter and a second image reading unit that reads the printed matter printed by the printing device as the image reading unit.

24. A color conversion table creation method comprising:
a document image color conversion process of color-converting document image data into print image data using an input color conversion table and an output color conversion table;
a printing process of printing a printed matter according to the print image data by a printing device;
a process of acquiring printed matter read image data indicating a read image of the printed matter by reading the printed matter by an image reading unit;
a process of acquiring target printed matter read image data indicating a read image of a target printed matter by reading the target printed matter by the image reading unit;
a read image color conversion process of converting, using a first color conversion table indicating a correspondence relationship between a signal value in a first color space acquired by the image reading unit and a chromaticity value in a second color space which is a device-independent color space, the signal value in the first color space into the chromaticity value in the second color space;
an image association process of performing an association process for a positional relationship between the printed matter read image data indicated by the signal value in the first color space obtained by reading the printed matter by the image reading unit and the document image data and an association process for a positional relationship between the target printed matter read image data indicated by the signal value in the first color space obtained by reading the target printed matter by the image reading unit and the document image data, or performing an association process for a positional relationship between printed matter read chromaticity value image data obtained by converting a signal value of the printed matter read image data into a chromaticity value in the second color space in the read image color conversion process and the document image data and an association process for a positional relationship between target printed matter read chromaticity value image data obtained by converting a signal value of the target printed matter read image data into a chromaticity value in the second color space in the read image color conversion process and the document image data; and
a color conversion table creation process of creating a color conversion table used in the color conversion in the document image color conversion process from a correspondence relationship between the document image data indicated by a signal value in a third color space which is a device-dependent color space, and a chromaticity value of the target printed matter and a chromaticity value of the printed matter obtained through processes in the image association process and the read image color conversion process, based on a difference between the chromaticity value of the target printed matter and the chromaticity value of the printed matter.

25. The color conversion table creation method according to claim 24,
wherein the color conversion table created in the color conversion table creation process is used in the color conversion in the document image color conversion process, and
wherein the document image color conversion process, the printing process, the process of acquiring the printed matter read image data, the read image color conversion process, the image association process, and the color conversion table creation process are repeated again.

26. A non-transitory recording medium on which a computer-readable code of a program that causes a computer to execute:
a function of acquiring, using an image reading unit that reads a target printed matter and a printed matter printed by a printing device, read image data indicating a read image of each of the target printed matter and the printed matter;
a first color conversion function of converting, using a first color conversion table indicating a correspondence relationship between a signal value in a first color space acquired by the image reading function and a chromaticity value in a second color space which is a device-independent color space, the signal value in the first color space into the chromaticity value in the second color space;
a second color conversion function of color-converting document image data into print image data using an input color conversion table and an output color conversion table;
an image association function of performing an association process for a positional relationship between printed matter read image data indicated by the signal value in the first color space obtained by reading the printed matter printed by the printing device according to the print image data by the image reading unit and the document image data and an association process for a positional relationship between target printed matter read image data indicated by the signal value in the first color space obtained by reading the target printed matter by the image reading unit and the document image data, or performing an association process for a positional relationship between printed matter read chromaticity value image data obtained by converting a signal value of the printed matter read image data into a chromaticity value in the second color space by the first color conversion function and the document image data and an association process for a positional relationship between target printed matter read chromaticity value image data obtained by converting a signal value of the target printed matter read image data into a chromaticity value in the second color space by the first color conversion function and the document image data; and a color conversion table creation function of creating a color conversion table used in the second color conversion function from a correspondence relationship between the document image data indicated by a signal value in a third color space which is a device-dependent color space, and a chromaticity value of the target printed matter and a chromaticity value of the printed matter obtained through processes in the image association function and the first color conversion function, based on a difference between the chromaticity value of the target printed matter and the chromaticity value of the printed matter.

27. A color conversion table creation device comprising:
a first image reading unit that reads a target printed matter to acquire read image data indicating a read image of the target printed matter;
a second image reading unit that reads a printed matter printed by a printing device to acquire read image data indicating a read image of the printed matter;
a first color conversion unit that converts, using a first color conversion table indicating a correspondence relationship between a signal value in a first color space acquired by each of the first image reading unit and the second image reading unit and a chromaticity value in a second color space which is a device-independent color space, the signal value in the first color space into the chromaticity value in the second color space;
a second color conversion unit that color-converts document image data into print image data using an input color conversion table and an output color conversion table;
an image association unit that performs an association process for a positional relationship between printed matter read image data indicated by the signal value in the first color space obtained by reading the printed matter printed by the printing device according to the print image data by the second image reading unit and the document image data and an association process for a positional relationship between target printed matter read image data indicated by the signal value in the first color space obtained by reading the target printed matter by the first image reading unit and the document image data, or performs an association process for a positional relationship between printed matter read chromaticity value image data obtained by converting a signal value of the printed matter read image data into a chromaticity value in the second color space by the first color conversion unit and the document image data and an association process for a positional relationship between target printed matter read chromaticity value image data obtained by converting a signal value of the target printed matter read image data into a chromaticity value in the second color space by the first color conversion unit and the document image data; and a color conversion table creation unit that creates a color conversion table used in the second color conversion unit from a correspondence relationship between the document image data indicated by a signal value in a third color space which is a device-dependent color space, and a chromaticity value of the target printed matter and a chromaticity value of the printed matter obtained through processes in the image association unit and the first color conversion unit, based on a difference between the chromaticity value of the target printed matter and the chromaticity value of the printed matter.

28. The color conversion table creation device according to claim 27,
wherein the second image reading unit is an in-line sensor built into the printing device.

29. A color conversion table creation method comprising:
a process of acquiring target printed matter read image data indicating a read image of a target printed matter by reading the target printed matter by a first image reading unit;
a document image color conversion process of color-converting document image data into print image data using an input color conversion table and an output color conversion table;
a printing process of printing a printed matter according to the print image data by a printing device;
a process of acquiring printed matter read image data indicating a read image of a printed matter by reading the printed matter by a second image reading unit;
a read image color conversion process of converting, using a first color conversion table indicating a correspondence relationship between a signal value in a first color space acquired by each of the first image reading unit and the second image reading unit and a chromaticity value in a second color space which is a device-independent color space, the signal value in the first color space into the chromaticity value in the second color space;
an image association process of performing an association process for a positional relationship between the printed matter read image data indicated by the signal value in the first color space obtained by reading the printed matter by the second image reading unit and the document image data and an association process for a positional relationship between the target printed matter read image data indicated by the signal value in the first color space obtained by reading the target printed matter by the first image reading unit and the document image data, or performing an association process for a positional relationship between printed matter read chromaticity value image data obtained by converting a signal value of the printed matter read image data into a chromaticity value in the second color space in the read image color conversion process and the document image data and an association process for a positional relationship between target printed matter read chromaticity value image data obtained by converting a signal value of the target printed matter read image data into a chromaticity value in the second color space in the read image color conversion process and the document image data; and a color conversion table creation process of creating a color conversion table used in the color conversion in the document image color conversion process from a correspondence relationship between the document image data indicated by a signal value in a third color space which is a device-dependent color space, and a chromaticity value of the target printed matter and a chromaticity value of the printed matter obtained through processes in the image association process and the read image color conversion process, based on a difference between the chromaticity value of the target printed matter and the chromaticity value of the printed matter.

30. A non-transitory recording medium on which a computer-readable code of a program that causes a computer to execute:
   a function of acquiring, using a first image reading unit that reads a target printed matter, read image data indicating a read image of the target printed matter;
   a function of acquiring, using a second image reading unit that reads a printed matter printed by a printing device, read image data indicating a read image of the printed matter;
   a first color conversion function of converting, using a first color conversion table indicating a correspondence relationship between a signal value in a first color space acquired by each of the first image reading unit and the second image reading unit and a chromaticity value in a second color space which is a device-independent color space, the signal value in the first color space into the chromaticity value in the second color space;
   a second color conversion function of color-converting document image data into print image data using an input color conversion table and an output color conversion table;
   an image association function of performing an association process for a positional relationship between printed matter read image data indicated by the signal value in the first color space obtained by reading the printed matter printed by the printing device according to the print image data by the second image reading unit and the document image data and an association process for a positional relationship between target printed matter read image data indicated by the signal value in the first color space obtained by reading the target printed matter by the first image reading unit and the document image data, or performing an association process for a positional relationship between printed matter read chromaticity value image data obtained by converting a signal value of the printed matter read image data into a chromaticity value in the second color space by the first color conversion function and the document image data and an association process for a positional relationship between target printed matter read chromaticity value image data obtained by converting a signal value of the target printed matter read image data into a chromaticity value in the second color space by the first color conversion function and the document image data; and
   a color conversion table creation function of creating a color conversion table used in the second color conversion function from a correspondence relationship between the document image data indicated by a signal value in a third color space which is a device-dependent color space, and a chromaticity value of the target printed matter and a chromaticity value of the printed matter obtained through processes in the image association function and the first color conversion function, based on a difference between the chromaticity value of the target printed matter and the chromaticity value of the printed matter.

31. A color conversion table creation device comprising:
   an image reading unit that reads a target printed matter to acquire read image data indicating a read image of the target printed matter;
   a first color conversion unit that converts, using a first color conversion table indicating a correspondence relationship between a signal value in a first color space acquired by the image reading unit and a chromaticity value in a second color space which is a device-independent color space, the signal value in the first color space into the chromaticity value in the second color space;
   an image association unit that performs an association process for a positional relationship between the read image data indicated by the signal value in the first color space and document image data of the target printed matter or performs an association process for a positional relationship between read chromaticity value image data obtained by converting a signal value of the read image data into a chromaticity value in the second color space by the first color conversion unit and the document image data of the target printed matter; and
   a color conversion table creation unit that creates, based on a correspondence relationship between the document image data indicated by a signal value in a third color space which is a device-dependent color space, and a chromaticity value of the read image obtained through processes in the image association unit and the first color conversion unit, a second color conversion table indicating a multi-dimensional correspondence relationship between the third color space and the second color space of the document image data.

32. The color conversion table creation device according to claim 31, further comprising:
   a color measurement unit that performs color measurement with respect to a color measurement target which is at least one of the target printed matter or a color sample which is different from the target printed matter to acquire a colorimetric value of the color measurement target; and
   a color measurement target image signal acquisition unit that includes at least one of a color measurement target document image signal acquisition unit that acquires a document image signal corresponding to a position on the document image data of which a colorimetric value is acquired by the color measurement unit or a color measurement target read image signal acquisition unit that acquires a read image signal corresponding to the position on the read image data of which the colorimetric value is acquired by the color measurement unit.

33. The color conversion table creation device according to claim 32, further comprising:
   a chromaticity value replacement unit that replaces a chromaticity value corresponding to the position on the document image data of which the colorimetric value is acquired by the color measurement unit with the colorimetric value acquired by the color measurement unit, with respect to a color conversion result in the first color conversion unit.

34. The color conversion table creation device according to claim 32, further comprising:
a first color conversion table database in which a plurality of color conversion tables capable of being applied as the first color conversion table is stored; and
a first color conversion table selection unit that selects one color conversion table from the plurality of color conversion tables stored in the first color conversion table database,
wherein the plurality of color conversion tables includes a color conversion table indicating a correspondence relationship between a reading signal and a chromaticity value of the image reading unit for each combination of types of coloring materials and base materials to be used in creation of a printed matter in the printing device, and
wherein the first color conversion table selection unit selects one color conversion table from the plurality of color conversion tables based on a correspondence relationship between the read image signal corresponding to the position on the read image data of which the colorimetric value is acquired by the color measurement unit and the colorimetric value acquired by the color measurement unit.

35. The color conversion table creation device according to claim 32, further comprising:
a first color conversion table correction unit that corrects the first color conversion table based on the correspondence relationship between the read image signal corresponding to the position on the read image data of which the colorimetric value is acquired by the color measurement unit and the colorimetric value acquired by the color measurement unit.

36. The color conversion table creation device according to claim 31,
wherein the image association unit includes an image extraction unit that performs a process of extracting a partial image corresponding to the document image data from the read image data.

37. The color conversion table creation device according to claim 31,
wherein the color conversion table creation unit performs a process of setting a chromaticity value in the second color space associated with a signal value of the document image data with respect to one or a plurality of lattice points of the second color conversion table corresponding to the signal value of the document image data.

38. The color conversion table creation device according to claim 37,
wherein the color conversion table creation unit performs, using an existing color conversion table as a temporary color conversion table, the process of setting the chromaticity value in the second color space associated with the signal value of the document image data with respect to one or the plurality of lattice points of the second color conversion table corresponding to the signal value of the document image data with respect to the temporary color conversion table.

39. The color conversion table creation device according to claim 31,
wherein the color conversion table creation unit performs a process of calculating a chromaticity value of one or a plurality of lattice points of the second color conversion table corresponding to a signal value of the document image data, using a color reproduction model for predicting a color reproduced according to a coloring material used in printing.

40. The color conversion table creation device according to claim 31,
wherein the image association unit performs a color extraction process of extracting, from each of the document image data and the read image data subjected to the association process for the positional relationship, color information corresponding thereto.

41. The color conversion table creation device according to claim 40,
wherein the color extraction process includes
a process of setting a region-of-interest in the document image data,
a process of determining whether the region-of-interest satisfies a first extraction condition, and
a correspondence relationship color information extraction process of extracting a signal value of the document image data which is the color information from the region-of-interest that satisfies the first extraction condition and extracting a signal value of the read image data which is the color information from a region at a position corresponding to the region-of-interest that satisfies the first extraction condition in the read image data subjected to the association process for the positional relationship.

42. The color conversion table creation device according to claim 41,
wherein the first extraction condition includes a condition that a difference between colors in the region-of-interest is equal to or smaller than a first extraction threshold value which is regulated for an allowable range.

43. The color conversion table creation device according to claim 41,
wherein the color extraction process includes a process of determining whether the region-of-interest satisfies a second extraction condition, and
wherein the color extraction process includes, as the correspondence relation color information extraction process, a process of extracting a signal value of the document image data which is the color information from the region-of-interest that satisfies the first extraction condition and the second extraction condition and extracting a signal value of the read image data which is the color information from a region at a position corresponding to the region-of-interest that satisfies the first extraction condition and the second extraction condition in the read image data subjected to the association process for the positional relationship.

44. The color conversion table creation device according to claim 43,
wherein the second extraction condition includes a condition that the read image data is present in the region at the position corresponding to the region-of-interest that satisfies the first extraction condition and an image defect is not present in a region of the read image data at the position corresponding to the region-of-interest that satisfies the first extraction condition.

45. The color conversion table creation device according to claim 41,
wherein the color extraction process includes a process of determining whether the region-of-interest satisfies a third extraction condition,
wherein a process of extracting the signal value of the document image data which is the color information from the region-of-interest that satisfies the first extraction condition and the third extraction condition and extracting the signal value of the read image data which is the color information from the region at the position corresponding to the region-of-interest that satisfies the first extraction condition in the read image data subjected to the association process for the positional relationship is performed as the correspondence relationship color information extraction process, and wherein any one of a condition of there being a non-surface treatment region where surface treatment is not present and a condition of there being a surface treatment region where the surface treatment is present is determined as the third extraction condition.

46. The color conversion table creation device according to claim 31, wherein the image association unit performs a color extraction process of extracting, from each of the document image data and the read chromaticity value image data, subjected to the association process for the positional relationship, color information corresponding thereto.

47. The color conversion table creation device according to claim 46, wherein the color extraction process includes a process of setting a region-of-interest in the document image data, a process of determining whether the region-of-interest satisfies a first extraction condition, and a correspondence relationship color information extraction process of extracting a signal value of the document image data which is the color information from the region-of-interest that satisfies the first extraction condition and extracting a chromaticity value of the read chromaticity value image data which is the color information from a region at a position corresponding to the region-of-interest that satisfies the first extraction condition in the read chromaticity value image data subjected to the association process for the positional relationship.

48. The color conversion table creation device according to claim 47, wherein the first extraction condition includes a condition that a difference between colors in the region-of-interest is equal to or smaller than a first extraction threshold value which is regulated for an allowable range.

49. The color conversion table creation device according to claim 47, wherein the color extraction process includes a process of determining whether the region-of-interest satisfies a second extraction condition, and wherein the color extraction process includes, as the correspondence relation color information extraction process, a process of extracting a signal value of the document image data which is the color information from the region-of-interest that satisfies the first extraction condition and the second extraction condition and extracting a chromaticity value of the read chromaticity value image data which is the color information from a region at a position corresponding to the region-of-interest that satisfies the first extraction condition and the second extraction condition in the read image data subjected to the association process for the positional relationship.

50. The color conversion table creation device according to claim 49, wherein the second extraction condition includes a condition that the read image data is present in the region at the position corresponding to the region-of-interest that satisfies the first extraction condition and an image defect is not present in a region of the read image data at the position corresponding to the region-of-interest that satisfies the first extraction condition.

51. The color conversion table creation device according to claim 47, wherein the color extraction process includes a process of determining whether the region-of-interest satisfies a third extraction condition, wherein a process of extracting the signal value of the document image data which is the color information from the region-of-interest that satisfies the first extraction condition and the third extraction condition and extracting the chromaticity value of the read image data which is the color information from a region at a position corresponding to the region-of-interest that satisfies the first extraction condition and the third extraction condition in the read chromaticity value image data subjected to the association process for the positional relationship is performed as the correspondence relationship color information extraction process, and wherein any one of a condition of there being a non-surface treatment region where surface treatment is not present and a condition of there being a surface treatment region where the surface treatment is present is determined as the third extraction condition.

52. A color conversion table creation method comprising:

an image reading process of reading a target printed matter to acquire read image data indicating a read image of the target printed matter;

a first color conversion process of converting, using a first color conversion table indicating a correspondence relationship between a signal value in a first color space acquired in the image reading process and a chromaticity value in a second color space which is a device-independent color space, the signal value in the first color space into the chromaticity value in the second color space;

an image association process of performing an association process for a positional relationship between the read image data indicated by the signal value in the first color space and document image data of the target printed matter or performing an association process for a positional relationship between read chromaticity value image data obtained by converting a signal value of the read image data into a chromaticity value in the second color space in the first color conversion process and the document image data of the target printed matter; and a color conversion table creation process of creating, based on a correspondence relationship between the document image data indicated by a signal value in a third color space which is a device-dependent color space, and a chromaticity value of the read image obtained through the image association process and the first color conversion process, a second color conversion table indicating a multi-dimensional correspondence relationship between the third color space and the second color space of the document image data.

53. A non-transitory recording medium on which a computer-readable code of a program that causes a computer to execute:

a function of acquiring, using an image reading unit that reads a printed matter, read image data indicating a read image of the printed matter;

a first color conversion function of converting, using a first color conversion table indicating a correspondence relationship between a signal value in a first color space acquired by the image reading unit and a chromaticity value in a second color space which is a device-independent color space, the signal value in the first color space into the chromaticity value in the second color space;

an image association function of performing an association process for a positional relationship between the read image data indicated by the signal value in the first color space and document image data of the target printed matter or performing an association process for a positional relationship between read chromaticity value image data obtained by converting a signal value of the read image data into a chromaticity value in the second color space by the first color conversion function and the document image data of the target printed matter; and a color conversion table creation function of creating, based on a correspondence relationship between the document image data indicated by a signal value in a third color space which is a device-dependent color space, and a chromaticity value of the read image obtained through processes based on the image association function and the first color conversion function, a second color conversion table indicating a multi-dimensional correspondence relationship between the third color space and the second color space of the document image data.

* * * * *